(12) United States Patent
Sugimoto

(10) Patent No.: US 9,963,196 B2
(45) Date of Patent: May 8, 2018

(54) BICYCLE SPROCKET

(71) Applicant: SHIMANO INC., Sakai (JP)

(72) Inventor: Akinobu Sugimoto, Sakai (JP)

(73) Assignee: SHIMANO INC., Sakai (JP)

( * ) Notice: Subject to any disclaimer, the term of this patent is extended or adjusted under 35 U.S.C. 154(b) by 0 days. days.

(21) Appl. No.: 15/182,552

(22) Filed: Jun. 14, 2016

(65) Prior Publication Data

US 2017/0355422 A1 Dec. 14, 2017

(51) Int. Cl.
F16H 55/12 (2006.01)
F16H 55/30 (2006.01)
B62M 9/12 (2006.01)

(52) U.S. Cl.
CPC .............. *B62M 9/12* (2013.01); *F16H 55/303* (2013.01)

(58) Field of Classification Search
CPC .......... B62M 9/10; B62M 9/105; B62M 9/12; F16H 55/30; Y10T 74/2165
USPC .......................................................... 474/160
See application file for complete search history.

(56) References Cited

U.S. PATENT DOCUMENTS

| | | | | |
|---|---|---|---|---|
| 5,192,248 A | * | 3/1993 | Nagano | B62M 9/10 474/140 |
| 5,192,249 A | * | 3/1993 | Nagano | B62M 9/10 474/160 |
| 5,273,495 A | * | 12/1993 | Nagano | B62M 9/00 474/144 |
| 5,413,534 A | * | 5/1995 | Nagano | B62M 9/10 474/160 |
| 5,458,543 A | * | 10/1995 | Kobayashi | B62M 9/10 474/160 |
| 5,464,373 A | * | 11/1995 | Leng | B62M 9/105 474/140 |
| 5,609,536 A | * | 3/1997 | Hsu | B62M 9/10 474/160 |
| 5,738,603 A | * | 4/1998 | Schmidt | B62M 9/10 474/158 |
| 5,876,296 A | * | 3/1999 | Hsu | B62M 9/10 474/140 |
| 5,971,878 A | * | 10/1999 | Leng | B62M 9/10 474/160 |
| 6,007,442 A | * | 12/1999 | Schmidt | B62M 9/10 474/122 |
| 6,572,500 B2 | * | 6/2003 | Tetsuka | B62M 9/10 474/160 |
| 6,805,645 B2 | * | 10/2004 | Mao | B62M 9/10 474/152 |

(Continued)

*Primary Examiner* — Henry Y Liu

(74) *Attorney, Agent, or Firm* — Mori & Ward, LLP

(57) ABSTRACT

A bicycle sprocket comprises a sprocket element, a first shifting facilitation projection, and a second shifting facilitation projection. The sprocket element includes a rotational center axis, a sprocket body, and a plurality of sprocket teeth. The sprocket body includes a radially outer periphery disposed about the rotational center axis. The plurality of sprocket teeth are arranged on the radially outer periphery. The first shifting facilitation projection is coupled to the sprocket element to engage with an inner link plate of a bicycle chain when the bicycle chain is shifted from a smaller sprocket to the bicycle sprocket. The second shifting facilitation projection is coupled to the sprocket element to engage with an outer link plate of the bicycle chain when the bicycle chain is shifted from the smaller sprocket to the bicycle sprocket.

45 Claims, 39 Drawing Sheets

(56) References Cited

U.S. PATENT DOCUMENTS

| | | | | |
|---|---|---|---|---|
| 8,092,329 B2* | 1/2012 | Wickliffe | ............... | B62M 9/105 474/160 |
| 8,235,850 B2* | 8/2012 | Lin | ............... | B62M 9/105 474/160 |
| 8,550,944 B2* | 10/2013 | Esquibel | ............... | B62M 9/10 474/160 |
| 8,617,015 B2* | 12/2013 | Wickliffe | ............... | B62M 9/10 474/140 |
| 8,821,329 B2* | 9/2014 | Wickliffe | ............... | B62M 9/105 474/140 |
| 8,978,514 B2* | 3/2015 | Shiraishi | ............... | B62M 9/105 74/594.2 |
| 9,150,277 B2* | 10/2015 | Emura | ............... | B62M 3/00 |
| 9,457,870 B2* | 10/2016 | Sugimoto | ............... | B62M 9/105 |
| 9,701,364 B2* | 7/2017 | Sugimoto | ............... | B62M 9/10 |
| 2002/0006842 A1* | 1/2002 | Tetsuka | ............... | B62M 9/10 474/160 |
| 2005/0282671 A1* | 12/2005 | Emura | ............... | B62M 9/06 474/160 |
| 2007/0265122 A1* | 11/2007 | Emura | ............... | B62M 9/105 474/152 |
| 2009/0111631 A1* | 4/2009 | Wickliffe | ............... | B62M 9/105 474/152 |
| 2010/0081531 A1* | 4/2010 | Esquibel | ............... | B62M 9/10 474/160 |
| 2010/0137086 A1* | 6/2010 | Lin | ............... | B62M 9/105 474/160 |
| 2014/0338494 A1* | 11/2014 | Sugimoto | ............... | B62M 1/36 74/594.2 |
| 2015/0191214 A1* | 7/2015 | Emura | ............... | B62M 3/00 74/594.2 |

* cited by examiner

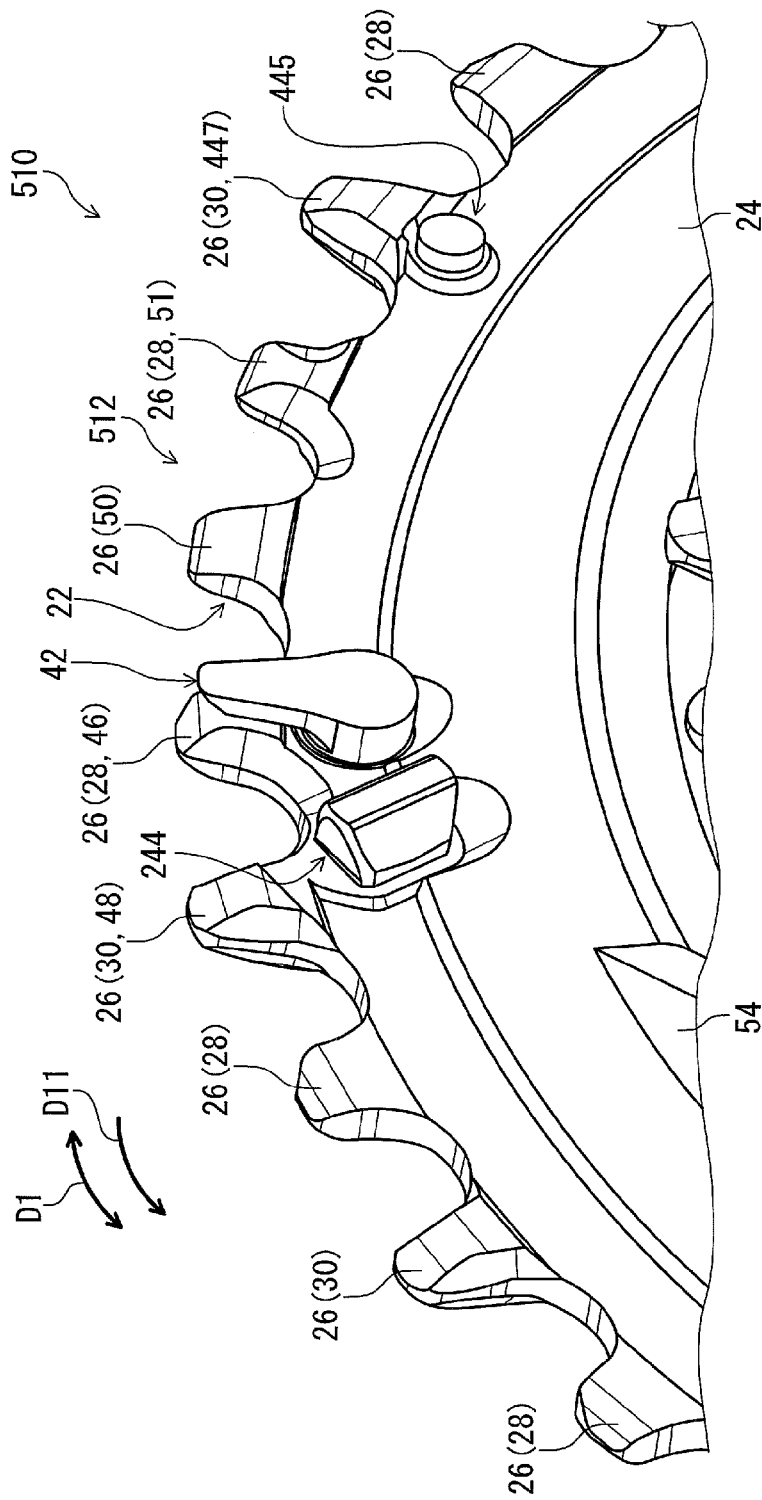

BICYCLE SPROCKET

BACKGROUND OF THE INVENTION

Field of the Invention

The present invention relates to a bicycle sprocket.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket.

SUMMARY OF THE INVENTION

In accordance with a first aspect of the present invention, a bicycle sprocket comprises a sprocket element, a first shifting facilitation projection, and a second shifting facilitation projection. The sprocket element includes a rotational center axis, a sprocket body, and a plurality of sprocket teeth. The sprocket body includes a radially outer periphery disposed about the rotational center axis. The plurality of sprocket teeth are arranged on the radially outer periphery. The first shifting facilitation projection is coupled to the sprocket element to engage with an inner link plate of a bicycle chain when the bicycle chain is shifted from a smaller sprocket to the bicycle sprocket. The second shifting facilitation projection is coupled to the sprocket element to engage with an outer link plate of the bicycle chain when the bicycle chain is shifted from the smaller sprocket to the bicycle sprocket.

With the bicycle sprocket according to the first aspect, the first shifting facilitation projection and the second shifting facilitation projection facilitate a first shifting operation in which the bicycle chain is shifted from the smaller sprocket to the bicycle sprocket. This improves shifting performance of the bicycle sprocket.

In accordance with a second aspect of the present invention, the bicycle sprocket according to the first aspect is configured so that the second shifting facilitation projection is provided on a downstream side of the first shifting facilitation projection in a rotational direction in which the bicycle sprocket rotates during pedaling without another shifting facilitation projection between the first shifting facilitation projection and the second shifting facilitation projection in the rotational direction.

With the bicycle sprocket according to the second aspect, it is possible to effectively facilitate the first shifting operation by using the second shifting facilitation projection in addition to the first shifting facilitation projection.

In accordance with a third aspect of the present invention, the bicycle sprocket according to any one of the above aspects is configured so that the first shifting facilitation projection is spaced apart from the second shifting facilitation projection at a first pitch in a circumferential direction defined about the rotational center axis. The first pitch is substantially equal to a chain pitch of the bicycle chain.

With the bicycle sprocket according to the third aspect, it is possible to more effectively facilitate the first shifting operation by using the second shifting facilitation projection in addition to the first shifting facilitation projection.

In accordance with a fourth aspect of the present invention, the bicycle sprocket according to any one of the above aspects is configured so that the plurality of sprocket teeth includes a first adjacent tooth and a second adjacent tooth. The second adjacent tooth is adjacent to the first adjacent tooth without another tooth in a circumferential direction defined about the rotational center axis. The first adjacent tooth is closest to the first shifting facilitation projection among the plurality of sprocket teeth. The second adjacent tooth is closest to the second shifting facilitation projection among the plurality of sprocket teeth.

With the bicycle sprocket according to the fourth aspect, it is possible to narrow an area in which the first shifting facilitation projection and the second shifting facilitation projection are provided in the rotational direction.

In accordance with a fifth aspect of the present invention, the bicycle sprocket according to any one of the above aspects is configured so that the plurality of sprocket teeth includes a receiving tooth adjacent to the first adjacent tooth without another tooth between the receiving tooth and the first adjacent tooth in the circumferential direction. The receiving tooth is provided on an upstream side of the first adjacent tooth in a rotational direction in which the bicycle sprocket rotates during pedaling. The receiving tooth includes a tooth root and a tooth tip. The tooth root is coupled to the radially outer periphery of the sprocket body. The tooth root has a first axial center defined in an axial direction parallel to the rotational center axis. The tooth tip is provided radially outward of the tooth root with respect to the rotational center axis. The tooth tip has a second axial center defined in the axial direction. The second axial center is provided at an axial position equal to an axial position of the first axial center in the axial direction.

With the bicycle sprocket according to the fifth aspect, the bicycle chain is less likely to get on the tooth tip of the receiving tooth when the bicycle chain is shifted between the bicycle sprocket and the smaller sprocket since the second axial center is provided at the axial position equal to the axial position of the first axial center in the axial direction. Thus, it is possible to stably hold the bicycle chain when a pedaling force is transmitted from the bicycle sprocket to the bicycle chain during pedaling without shifting the bicycle chain.

In accordance with a sixth aspect of the present invention, the bicycle sprocket according to any one of the above aspects is configured so that the plurality of sprocket teeth includes a receiving tooth adjacent to the first adjacent tooth without another tooth between the receiving tooth and the first adjacent tooth in the circumferential direction. The receiving tooth is provided on an upstream side of the first adjacent tooth in a rotational direction in which the bicycle sprocket rotates during pedaling. The receiving tooth includes a tooth root and a tooth tip. The tooth root is coupled to the radially outer periphery of the sprocket body. The tooth root has a first axial center defined in an axial direction parallel to the rotational center axis. The tooth tip is provided radially outward of the tooth root with respect to the rotational center axis. The tooth tip has a second axial center defined in the axial direction. The second axial center is offset from the first axial center in the axial direction.

With the bicycle sprocket according to the sixth aspect, it is possible to certainly receive the bicycle chain with the receiving tooth, improving the first shifting operation.

In accordance with a seventh aspect of the present invention, the bicycle sprocket according to any one of the above aspects is configured so that the second axial center is closer to the first shifting facilitation projection than the first axial center in the axial direction.

With the bicycle sprocket according to the seventh aspect, it is possible to more certainly receive the bicycle chain with the receiving tooth, improving the first shifting operation.

In accordance with an eighth aspect of the present invention, the bicycle sprocket according to any one of the above aspects is configured so that the first shifting facilitation projection has a first axial length defined from the sprocket element in an axial direction parallel to the rotational center axis. The second shifting facilitation projection has a second axial length defined from the sprocket element in the axial direction. The first axial length is smaller than the second axial length.

With the bicycle sprocket according to the eighth aspect, it is possible to reduce interference between the first shifting facilitation projection and the bicycle chain during a second shifting operation in which the bicycle chain is shifted from the bicycle sprocket to the smaller sprocket.

In accordance with a ninth aspect of the present invention, the bicycle sprocket according to any one of the above aspects is configured so that the first shifting facilitation projection includes a first coupling body and a protruding part. The first coupling body is coupled to the sprocket element. The protruding part extends radially outward from the first coupling body with respect to the rotational center axis.

With the bicycle sprocket according to the ninth aspect, the protruding part can easily catch the bicycle chain when the bicycle chain is shifted from the smaller sprocket to the bicycle sprocket. This facilitates the first shifting operation of the bicycle chain.

In accordance with a tenth aspect of the present invention, the bicycle sprocket according to any one of the above aspects is configured so that the protruding part is spaced apart from the sprocket element in an axial direction parallel to the rotational center axis.

With the bicycle sprocket according to the tenth aspect, the protruding part can hold inner link plate of the bicycle chain between the protruding part and the sprocket element when the bicycle chain is shifted from the smaller sprocket to the bicycle sprocket. This effectively facilitate the first shifting operation of the bicycle chain.

In accordance with an eleventh aspect of the present invention, the bicycle sprocket according to any one of the above aspects is configured so that the plurality of sprocket teeth includes a first adjacent tooth closest to the first shifting facilitation projection among the plurality of sprocket teeth. The maximum axial distance is defined between the protruding part and the first adjacent tooth in the axial direction is larger than an axial width of the inner link plate.

With the bicycle sprocket according to the eleventh aspect, it is possible to reduce interference between the protruding part and the bicycle chain during pedaling without shifting the bicycle chain. This can reduce noise caused by the interference between the protruding part and the bicycle chain.

In accordance with a twelfth aspect of the present invention, the bicycle sprocket according to any one of the above aspects is configured so that the first shifting facilitation projection is disposed to keep a clearance at least one of between the protruding part and the inner link plate in the axial direction and between the first adjacent tooth and the inner link plate in the axial direction during pedaling.

With the bicycle sprocket according to the twelfth aspect, it is possible to reduce a resistance force produced the at least one of between the protruding part and the inner link plate and between the first adjacent tooth and the inner link plate. This can reduce noise caused by the interference between the protruding part and the bicycle chain.

In accordance with a thirteenth aspect of the present invention, the bicycle sprocket according to any one of the above aspects is configured so that the maximum axial distance is in a range of 0.5 mm to 4.0 mm.

With the bicycle sprocket according to the thirteenth aspect, it is possible to certainly reduce the resistance force. This can effectively reduce noise caused by the interference between the protruding part and the bicycle chain.

In accordance with a fourteenth aspect of the present invention, the bicycle sprocket according to any one of the above aspects is configured so that the maximum axial distance is equal to or larger than 1.0 mm.

With the bicycle sprocket according to the fourteenth aspect, it is possible to more certainly reduce the resistance force. This can more effectively reduce noise caused by the interference between the protruding part and the bicycle chain.

In accordance with a fifteenth aspect of the present invention, the bicycle sprocket according to any one of the above aspects is configured so that the maximum axial distance is equal to or smaller than 3.8 mm.

With the bicycle sprocket according to the fifteenth aspect, it is possible to more certainly reduce the resistance force. This can more effectively reduce noise caused by the interference between the protruding part and the bicycle chain.

In accordance with a sixteenth aspect of the present invention, the bicycle sprocket according to any one of the above aspects is configured so that the maximum axial distance is in a range of 1.0 mm to 2.0 mm.

With the bicycle sprocket according to the sixteenth aspect, it is possible to more certainly reduce the resistance force. This can more effectively reduce noise caused by the interference between the protruding part and the bicycle chain. Furthermore, the smaller maximum axial distance can approach the inner link plate toward the sprocket element. Thus, it is possible to certainly perform shifting of the bicycle chain.

In accordance with a seventeenth aspect of the present invention, the bicycle sprocket according to any one of the above aspects is configured so that the protruding part includes a radially inner end, a radially outer end, and a first inclined surface. The radially inner end is coupled to the first coupling body. The radially outer end is provided radially outward of the radially inner end with respect to the rotational center axis. The first inclined surface faces the sprocket element in the axial direction. The first inclined surface is inclined to gradually approach the sprocket element in the axial direction from the radially outer end toward the radially inner end.

With the bicycle sprocket according to the seventeenth aspect, the first inclined surface of the protruding part can guide the bicycle chain toward the sprocket element in the axial direction when the bicycle chain is shifted from the smaller sprocket to the bicycle sprocket. This can easily bring the bicycle chain into engagement with first shifting facilitation projection and can approach the bicycle chain toward the sprocket element.

In accordance with an eighteenth aspect of the present invention, the bicycle sprocket according to any one of the above aspects is configured so that the second shifting facilitation projection includes a second inclined surface facing toward an opposite side of the sprocket element in the axial direction. The second inclined surface is inclined to gradually approach the sprocket element in the axial direction from a radially inner side to a radially outer side with respect to the rotational center axis.

With the bicycle sprocket according to the eighteenth aspect, the second inclined surface of the second shifting facilitation projection can guide the bicycle chain away from the sprocket element in the axial direction when the bicycle chain is shifted from the smaller sprocket to the bicycle sprocket. This can incline the bicycle chain to easily come into engagement with the plurality of sprocket teeth, effectively facilitating the first shifting operation of the bicycle chain.

In accordance with a nineteenth aspect of the present invention, the bicycle sprocket according to any one of the above aspects is configured so that the protruding part is disposed to at least partly overlap with one of the plurality of sprocket teeth when viewed from an axial direction parallel to the rotational center axis.

With the bicycle sprocket according to the nineteenth aspect, the protruding part is disposed to at least partly overlap with one of the plurality of sprocket teeth when viewed from an axial direction parallel to the rotational center axis. This can increase a radial height of the first shifting facilitation projection. Accordingly, it is possible to effectively approach the bicycle chain toward the sprocket element.

In accordance with a twentieth aspect of the present invention, the bicycle sprocket according to any one of the above aspects is configured so that the plurality of sprocket teeth include at least one first tooth and at least one second tooth. The at least one first tooth has a first chain engaging width. The at least one second tooth has a second chain engaging width. The first chain engaging width is smaller than an inner link space defined between an opposed pair of inner link plates of the bicycle chain. The second chain engaging width is larger than the inner link space and is smaller than an outer link space defined between an opposed pair of outer link plates of the bicycle chain.

With the bicycle sprocket according to the twentieth aspect, it is possible to easily keep holding the bicycle chain with the at least one first tooth and the at least one second tooth.

In accordance with a twenty-first aspect of the present invention, the bicycle sprocket according to any one of the above aspects is configured so that the at least one first tooth includes a first adjacent tooth closest to the first shifting facilitation projection among the plurality of sprocket teeth.

With the bicycle sprocket according to the twenty-first aspect, it is possible to bring the inner link plate of the bicycle chain into engagement with the first adjacent tooth during the first shifting operation of the bicycle chain. This causes the inner link plate of the bicycle chain to be engaged with the first shifting facilitation projection during the first shifting operation.

In accordance with a twenty-second aspect of the present invention, the bicycle sprocket according to any one of the above aspects is configured so that the at least one second tooth includes a second adjacent tooth closest to the second shifting facilitation projection among the plurality of sprocket teeth.

With the bicycle sprocket according to the twenty-second aspect, it is possible to bring the outer link plate of the bicycle chain into engagement with the second adjacent tooth during the first shifting operation of the bicycle chain. This causes the outer link plate of the bicycle chain to be engaged with the second shifting facilitation projection during the first shifting operation.

In accordance with a twenty-third aspect of the present invention, the bicycle sprocket according to any one of the above aspects is configured so that the plurality of sprocket teeth includes a receiving tooth adjacent to the first adjacent tooth without another tooth between the receiving tooth and the first adjacent tooth in a circumferential direction defined about the rotational center axis. The receiving tooth is provided on an upstream side of the first adjacent tooth in a rotational direction in which the bicycle sprocket rotates during pedaling. The receiving tooth has an axial width smaller than the second chain engaging width.

With the bicycle sprocket according to the twenty-third aspect, it is possible to smoothly receive the bicycle chain at the receiving tooth. This facilitates the first shifting operation of the bicycle chain.

In accordance with a twenty-fourth aspect of the present invention, the bicycle sprocket according to any one of the above aspects is configured so that the plurality of sprocket teeth includes a receiving tooth adjacent to the first adjacent tooth without another tooth between the receiving tooth and the first adjacent tooth in a circumferential direction defined about the rotational center axis. The receiving tooth is provided on an upstream side of the first adjacent tooth in a rotational direction in which the bicycle sprocket rotates during pedaling. The receiving tooth has a radial length smaller than a radial length of the second adjacent tooth.

With the bicycle sprocket according to the twenty-fourth aspect, it is possible to smoothly receive the bicycle chain at the receiving tooth. This facilitates the first shifting operation of the bicycle chain.

In accordance with a twenty-fifth aspect of the present invention, the bicycle sprocket according to any one of the above aspects is configured so that the second shifting facilitation projection is coupled to the sprocket element to engage with the bicycle chain when the bicycle chain is shifted from the bicycle sprocket to the smaller sprocket.

With the bicycle sprocket according to the twenty-fifth aspect, it is possible to facilitate a second shifting operation in which the bicycle chain is shifted from the bicycle sprocket to the smaller sprocket.

In accordance with a twenty-sixth aspect of the present invention, the bicycle sprocket according to any one of the above aspects is configured so that the first shifting facilitation projection is disposed not to be inserted between an opposed pair of link plates of the bicycle chain when the bicycle chain is shifted from the bicycle sprocket to the smaller sprocket.

With the bicycle sprocket according to the twenty-sixth aspect, it is possible to it is possible to smoothly shift the bicycle chain from the bicycle sprocket to the smaller sprocket regardless of the first shifting facilitation projection.

In accordance with a twenty-seventh aspect of the present invention, a bicycle sprocket comprises a sprocket element and a first shifting facilitation projection. The sprocket element includes a rotational center axis, a sprocket body, and a plurality of sprocket teeth. The sprocket body includes a radially outer periphery disposed about the rotational center axis. The plurality of sprocket teeth are arranged on the radially outer periphery. The first shifting facilitation projection is coupled to the sprocket element. The first shifting facilitation projection includes a first coupling body and a protruding part. The first coupling body is coupled to the sprocket element. The protruding part extends radially outward from the first coupling body with respect to the rotational center axis. The plurality of sprocket teeth includes a first adjacent tooth and a receiving tooth. The first adjacent tooth is closest to the first shifting facilitation projection among the plurality of sprocket teeth. The receiving tooth is adjacent to the first adjacent tooth without another tooth between the receiving tooth and the first adjacent tooth in a circumferential direction defined about the rotational center axis. The receiving tooth is provided on an upstream side of the first adjacent tooth in a rotational direction in which the bicycle sprocket rotates during pedaling. A maximum axial distance defined between the protruding part and the first adjacent tooth in an axial direction parallel to the rotational center axis is in a range of 0.5 mm to 4.0 mm.

With the bicycle sprocket according to the twenty-seventh aspect, the maximum axial distance can certainly reduce the resistance force. This can more effectively facilitate the first shifting operation.

In accordance with a twenty-eighth aspect of the present invention, the bicycle sprocket according to any one of the above aspects is configured so that the maximum axial distance is equal to or larger than 1.0 mm.

With the bicycle sprocket according to the twenty-eighth aspect, it is possible to more certainly reduce the resistance force. This can more effectively facilitate the first shifting operation.

In accordance with a twenty-ninth aspect of the present invention, the bicycle sprocket according to any one of the above aspects is configured so that the maximum axial distance is equal to or smaller than 3.8 mm.

With the bicycle sprocket according to the twenty-ninth aspect, it is possible to more certainly reduce the resistance force. This can more effectively facilitate the first shifting operation.

In accordance with a thirtieth aspect of the present invention, the bicycle sprocket according to any one of the above aspects is configured so that the maximum axial distance is in a range of 1.0 mm to 2.0 mm.

With the bicycle sprocket according to the thirtieth aspect, it is possible to more certainly reduce the resistance force. This can more effectively facilitate the first shifting operation.

In accordance with a thirty-first aspect of the present invention, the bicycle sprocket according to any one of the above aspects is configured so that the receiving tooth includes a tooth root and a tooth tip. The tooth root is coupled to the radially outer periphery of the sprocket body. The tooth root has a first axial center defined in an axial direction parallel to the rotational center axis. The tooth tip is provided radially outward of the tooth root with respect to the rotational center axis. The tooth tip has a second axial center defined in the axial direction. The second axial center is provided at an axial position equal to an axial position of the first axial center in the axial direction.

With the bicycle sprocket according to the thirty-first aspect, it is possible to certainly receive the bicycle chain with the receiving tooth, improving the first shifting operation.

In accordance with a thirty-second aspect of the present invention, the bicycle sprocket according to any one of the above aspects is configured so that the receiving tooth includes a tooth root and a tooth tip. The tooth root is coupled to the radially outer periphery of the sprocket body. The tooth root has a first axial center defined in an axial direction parallel to the rotational center axis. The tooth tip is provided radially outward of the tooth root with respect to the rotational center axis. The tooth tip has a second axial center defined in the axial direction. The second axial center is offset from the first axial center in the axial direction.

With the bicycle sprocket according to the thirty-second aspect, it is possible to certainly receive the bicycle chain with the receiving tooth, improving the first shifting operation.

In accordance with a thirty-third aspect of the present invention, the bicycle sprocket according to any one of the above aspects is configured so that the second axial center is closer to the first shifting facilitation projection than the first axial center in the axial direction.

With the bicycle sprocket according to the thirty-third aspect, it is possible to more certainly receive the bicycle chain with the receiving tooth, improving the first shifting operation.

In accordance with a thirty-fourth aspect of the present invention, the bicycle sprocket according to any one of the above aspects is configured so that the first shifting facilitation projection is disposed to keep a clearance at least one of between the protruding part and an inner link plate of a bicycle chain in the axial direction and between the first adjacent tooth and the inner link plate in the axial direction during pedaling.

With the bicycle sprocket according to the thirty-fourth aspect, it is possible to reduce a resistance force produced the at least one of between the protruding part and the inner link plate and between the first adjacent tooth and the inner link plate. This can effectively facilitate the first shifting operation.

In accordance with a thirty-fifth aspect of the present invention, the bicycle sprocket according to any one of the above aspects is configured so that the protruding part includes a radially inner end, a radially outer end, and a first inclined surface. The radially inner end coupled to the first coupling body. The radially outer end is provided radially outward of the radially inner end with respect to the rotational center axis. The first inclined surface faces the sprocket element in the axial direction. The first inclined surface is inclined to approach the sprocket element in the axial direction from the radially outer end toward the radially inner end.

With the bicycle sprocket according to the thirty-fifth aspect, the first inclined surface of the protruding part can guide the bicycle chain toward the sprocket element in the axial direction when the bicycle chain is shifted from the smaller sprocket to the bicycle sprocket. This effectively facilitate the first shifting operation of the bicycle chain.

In accordance with a thirty-sixth aspect of the present invention, the bicycle sprocket according to any one of the above aspects further comprises a second shifting facilitation projection coupled to the sprocket element. The second shifting facilitation projection includes a second inclined surface facing toward an opposite side of the sprocket element in the axial direction. The second inclined surface is inclined to gradually approach the sprocket element in the axial direction from a radially inner side to a radially outer side with respect to the rotational center axis.

With the bicycle sprocket according to the thirty-sixth aspect, the second inclined surface of the second shifting facilitation projection can guide the bicycle chain away from the sprocket element in the axial direction when the bicycle chain is shifted from the smaller sprocket to the bicycle sprocket. This can incline the bicycle chain to easily come into engagement with the plurality of sprocket teeth, effectively facilitating the first shifting operation of the bicycle chain.

In accordance with a thirty-seventh aspect of the present invention, the bicycle sprocket according to any one of the above aspects is configured so that the protruding part is disposed to at least partly overlap with one of the plurality of sprocket teeth when viewed from an axial direction parallel to the rotational center axis.

With the bicycle sprocket according to the thirty-seventh aspect, it is possible to easily hold the inner link plate of the bicycle chain between the protruding part and the one of the plurality of sprocket teeth when the bicycle chain is shifted from the smaller sprocket to the bicycle sprocket.

In accordance with a thirty-eighth aspect of the present invention, the bicycle sprocket according to any one of the above aspects is configured so that the plurality of sprocket teeth include at least one first tooth and at least one second tooth. The at least one first tooth has a first chain engaging width. The at least one second tooth has a second chain engaging width. The first chain engaging width is smaller than an inner link space defined between an opposed pair of inner link plates of the bicycle chain. The second chain engaging width is larger than the inner link space and is smaller than an outer link space defined between an opposed pair of outer link plates of the bicycle chain.

With the bicycle sprocket according to the thirty-eighth aspect, it is possible to easily keep holding the bicycle chain with the at least one first tooth and the at least one second tooth.

In accordance with a thirty-ninth aspect of the present invention, the bicycle sprocket according to any one of the above aspects is configured so that the at least one first tooth includes the first adjacent tooth closest to the first shifting facilitation projection among the plurality of sprocket teeth.

With the bicycle sprocket according to the thirty-ninth aspect, it is possible to bring the inner link plate of the bicycle chain into engagement with the first adjacent tooth during the first shifting operation of the bicycle chain. This causes the inner link plate of the bicycle chain to be engaged with the first shifting facilitation projection during the first shifting operation.

In accordance with a fortieth aspect of the present invention, the bicycle sprocket according to any one of the above aspects further comprises a second shifting facilitation projection coupled to the sprocket element. The at least one second tooth includes a second adjacent tooth closest to the second shifting facilitation projection among the plurality of sprocket teeth.

With the bicycle sprocket according to the fortieth aspect, it is possible to bring the outer link plate of the bicycle chain into engagement with the second adjacent tooth during the first shifting operation of the bicycle chain. This causes the outer link plate of the bicycle chain to be engaged with the second shifting facilitation projection during the first shifting operation.

In accordance with a forty-first aspect of the present invention, the bicycle sprocket according to any one of the above aspects is configured so that the receiving tooth has an axial width smaller than the second chain engaging width.

With the bicycle sprocket according to the forty-first aspect, it is possible to smoothly receive the bicycle chain at the receiving tooth. This facilitates the first shifting operation of the bicycle chain.

In accordance with a forty-second aspect of the present invention, the bicycle sprocket according to any one of the above aspects is configured so that the receiving tooth has a radial length smaller than a radial length of the second adjacent tooth.

With the bicycle sprocket according to the forty-second aspect, it is possible to smoothly receive the bicycle chain at the receiving tooth. This facilitates the first shifting operation of the bicycle chain.

In accordance with a forty-third aspect of the present invention, the bicycle sprocket according to any one of the above aspects is configured so that the first shifting facilitation projection is disposed not to be inserted between an opposed pair of link plates of the bicycle chain when the bicycle chain is shifted from the bicycle sprocket to the smaller sprocket.

With the bicycle sprocket according to the forty-third aspect, it is possible to smoothly shift the bicycle chain from the bicycle sprocket to the smaller sprocket regardless of the first shifting facilitation projection.

In accordance with a forty-fourth aspect of the present invention, a bicycle sprocket comprises a sprocket element and at least one shifting facilitation projection. The sprocket element includes a rotational center axis, a sprocket body, and a plurality of sprocket teeth. The sprocket body includes a radially outer periphery disposed about the rotational center axis. The plurality of sprocket teeth are arranged on the radially outer periphery. The at least one shifting facilitation projection is coupled to the sprocket element to engage with a link plate of a bicycle chain when the bicycle chain is shifted from the smaller sprocket to the bicycle sprocket. The plurality of sprocket teeth includes at least one first tooth and at least one second tooth. The at least one first tooth has a first chain engaging width. The at least one second tooth has a second chain engaging width. The first chain engaging width is smaller than an inner link space defined between an opposed pair of inner link plates of the bicycle chain. The second chain engaging width is larger than the inner link space and is smaller than an outer link space defined between an opposed pair of outer link plates of the bicycle chain. The plurality of sprocket teeth includes a receiving tooth configured to first engage with the bicycle chain when the bicycle chain is shifted from the smaller sprocket to the bicycle sprocket. The receiving tooth is provided on an upstream side of the at least one shifting facilitation projection in a rotational direction in which the bicycle sprocket rotates during pedaling. The receiving tooth includes a tooth root and a tooth tip. The tooth root is coupled to the radially outer periphery of the sprocket body. The tooth root has a first axial center defined in an axial direction parallel to the rotational center axis. The tooth tip is provided radially outward of the tooth root with respect to the rotational center axis. The tooth tip has a second axial center defined in the axial direction. The second axial center is offset from the first axial center in the axial direction.

With the bicycle sprocket according to the forty-fourth aspect, it is possible to certainly receive the bicycle chain with the receiving tooth, improving the first shifting operation.

In accordance with a forty-fifth aspect of the present invention, the bicycle sprocket according to any one of the above aspects is configured so that the second axial center is closer to the at least one shifting facilitation projection than the first axial center in the axial direction.

With the bicycle sprocket according to the forty-fifth aspect, it is possible to more certainly receive the bicycle chain with the receiving tooth, improving the first shifting operation.

In accordance with a forty-sixth aspect of the present invention, the bicycle sprocket according to any one of the above aspects is configured so that the second axial center is farther from the at least one shifting facilitation projection than the first axial center in the axial direction.

In accordance with a forty-seventh aspect of the present invention, the bicycle sprocket according to any one of the above aspects is configured so that the receiving tooth has a radial length smaller than a radial length of the at least one second tooth.

With the bicycle sprocket according to the forty-seventh aspect, it is possible to smoothly receive the bicycle chain at the receiving tooth. This facilitates the first shifting operation of the bicycle chain.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 39 is a partial perspective view of a bicycle sprocket assembly in accordance with a modification of the fourth embodiment.

DESCRIPTION OF THE EMBODIMENTS

Figure 1:
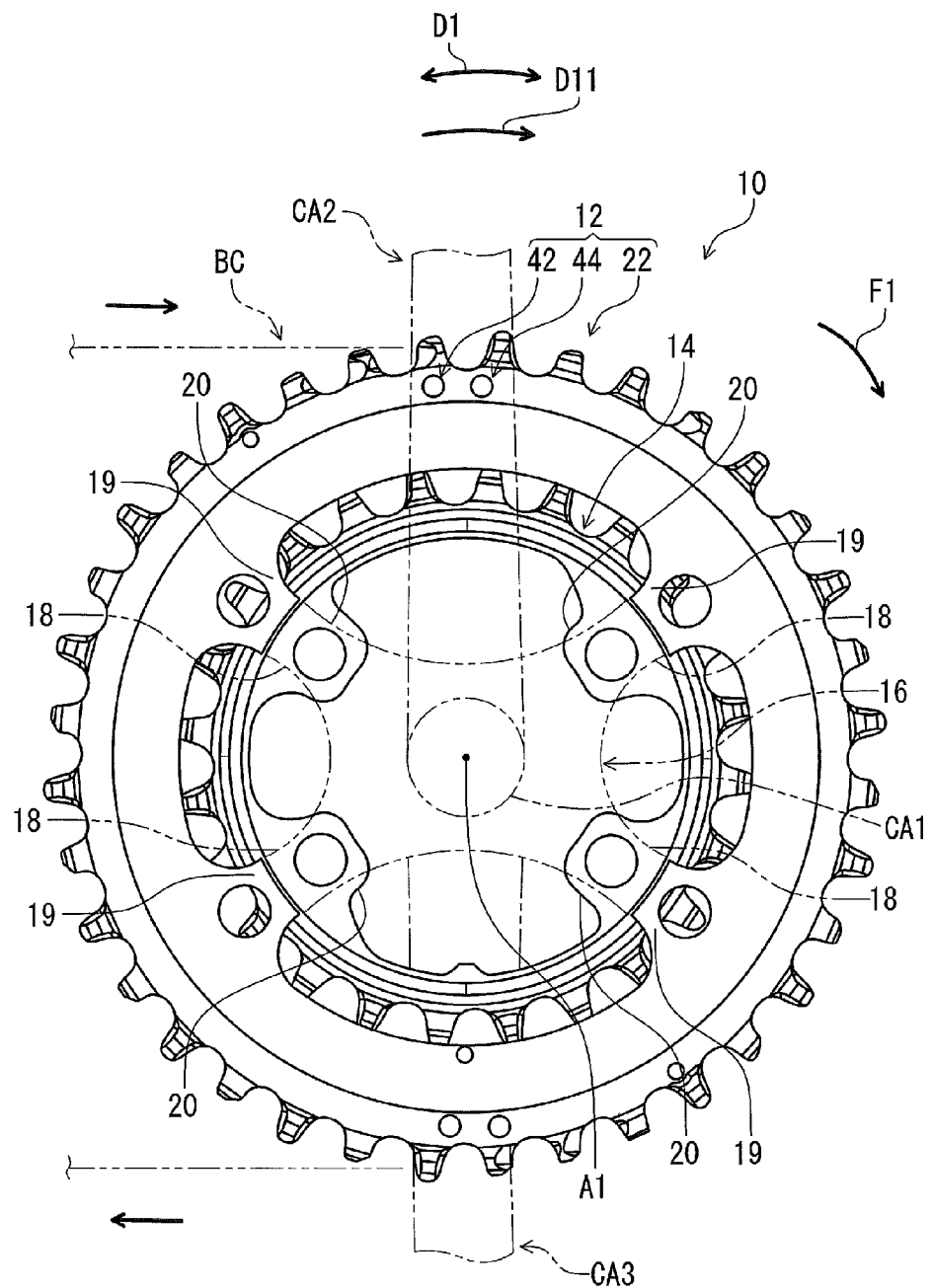
FIG. 1 is a side elevational view of a bicycle sprocket assembly including a bicycle sprocket in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle sprocket assembly 10 comprises a bicycle sprocket 12 in accordance with a first embodiment. The bicycle sprocket 12 has a rotational center axis A1. The bicycle sprocket 12 is rotatable about the rotational center axis A1 relative to a bicycle frame (not shown). The bicycle sprocket 12 is engaged with a bicycle chain BC to transmit a rotational driving force F1 to the bicycle chain BC. The bicycle sprocket assembly 10 comprises a smaller sprocket 14. The smaller sprocket 14 is engaged with the bicycle chain BC to transmit the rotational driving force F1 to the bicycle chain BC. The smaller sprocket 14 has an outer diameter smaller than an outer diameter of the bicycle sprocket 12. While the bicycle sprocket assembly 10 comprises the bicycle sprocket 12 and the smaller sprocket 14 in this embodiment, the bicycle sprocket assembly 10 can comprise at least one additional sprocket in addition to the bicycle sprocket 12 and the smaller sprocket 14. In this embodiment, the bicycle sprocket assembly 10 is a front sprocket assembly. However, structures of the bicycle sprocket assembly 10 can be applied to rear sprocket assembly. The bicycle chain BC is shifted between the bicycle sprocket 12 and the smaller sprocket 14 by a shifting device such as a derailleur (not shown).

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket 12 of the bicycle sprocket assembly 10, should be interpreted relative to the bicycle equipped with the bicycle sprocket 12 as used in an upright riding position on a horizontal surface.

Figure 2:
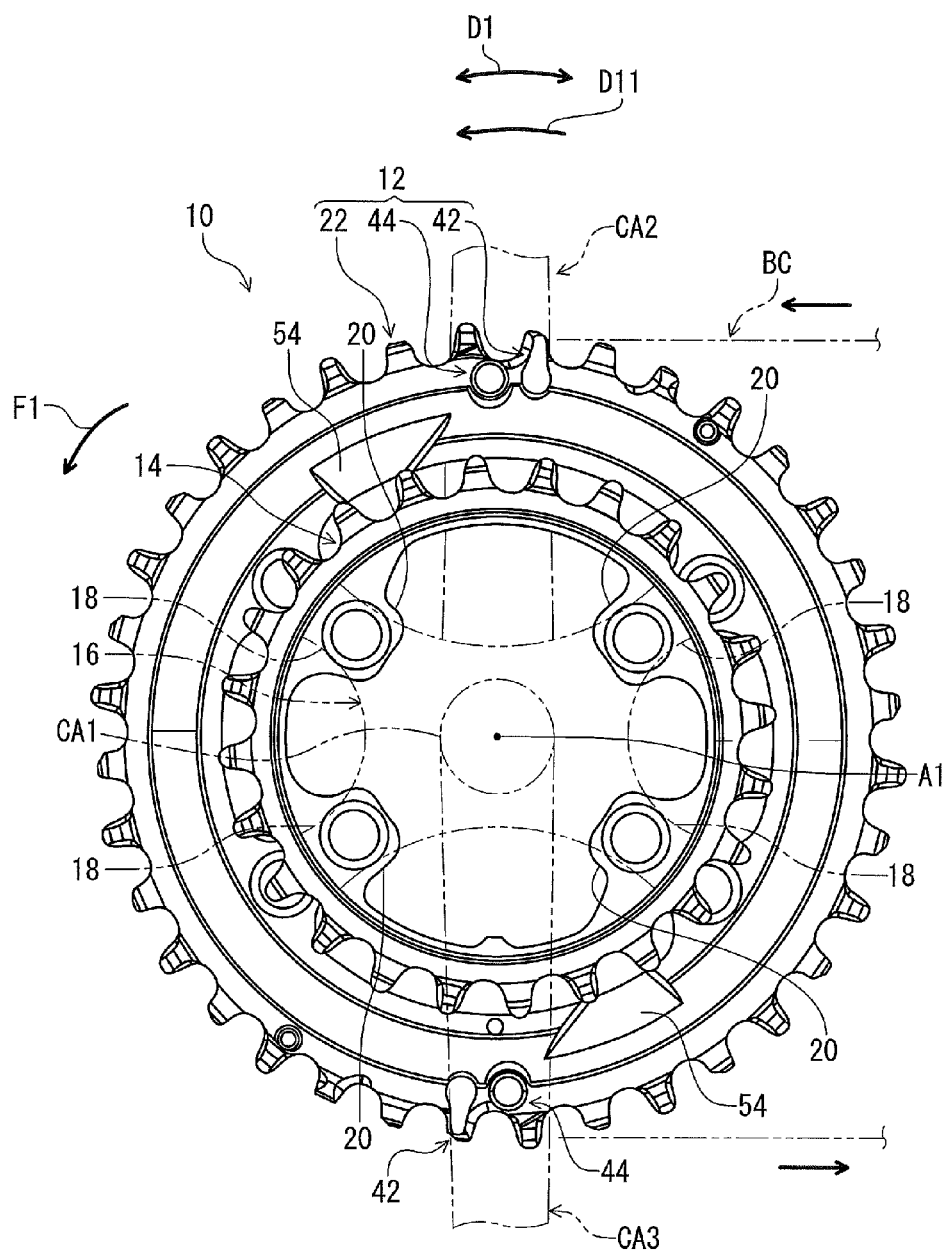
FIG. 2 is another side elevational view of the bicycle sprocket assembly illustrated in FIG. 1.

As seen in FIGS. 1 and 2, the bicycle sprocket assembly 10 includes a sprocket mounting member 16, a crank axle CA1, a right crank arm CA2, and a left crank arm CA3. The sprocket mounting member 16 includes crank connecting arms 18. The bicycle sprocket 12 comprises crank attachment portions 19. The smaller sprocket 14 comprises additional crank attachment portions 20. The crank connecting arms 18 are respectively fastened to the crank attachment portions 19 by fasteners such as bolts (not shown). The additional crank attachment portions 20 are fastened to the sprocket mounting member 16 by fasteners such as bolts (not shown).

The right crank arm CA2 and the left crank arm CA3 are secured to the crank axle CA1. The right crank arm CA2 and the left crank arm CA3 are rotatably mounted to the bicycle frame about the rotational center axis A1 via the crank axle CA1. The sprocket mounting member 16 is mounted on the right crank arm CA2 to be rotatable integrally with the right crank arm CA2 about the rotational center axis A1. The sprocket mounting member 16 can also be integrally provided with the right crank arm CA2 as a one-piece unitary member. Namely, the bicycle sprocket 12 is rotatable integrally with the sprocket mounting member 16 and the right crank arm CA2 about the rotational center axis A1. The bicycle sprocket 12 is rotatable about the rotational center axis A1 in a rotational direction D11 during pedaling. The rotational direction D11 is defined along a circumferential direction D1 defined about the rotational center axis A1.

Figure 3:
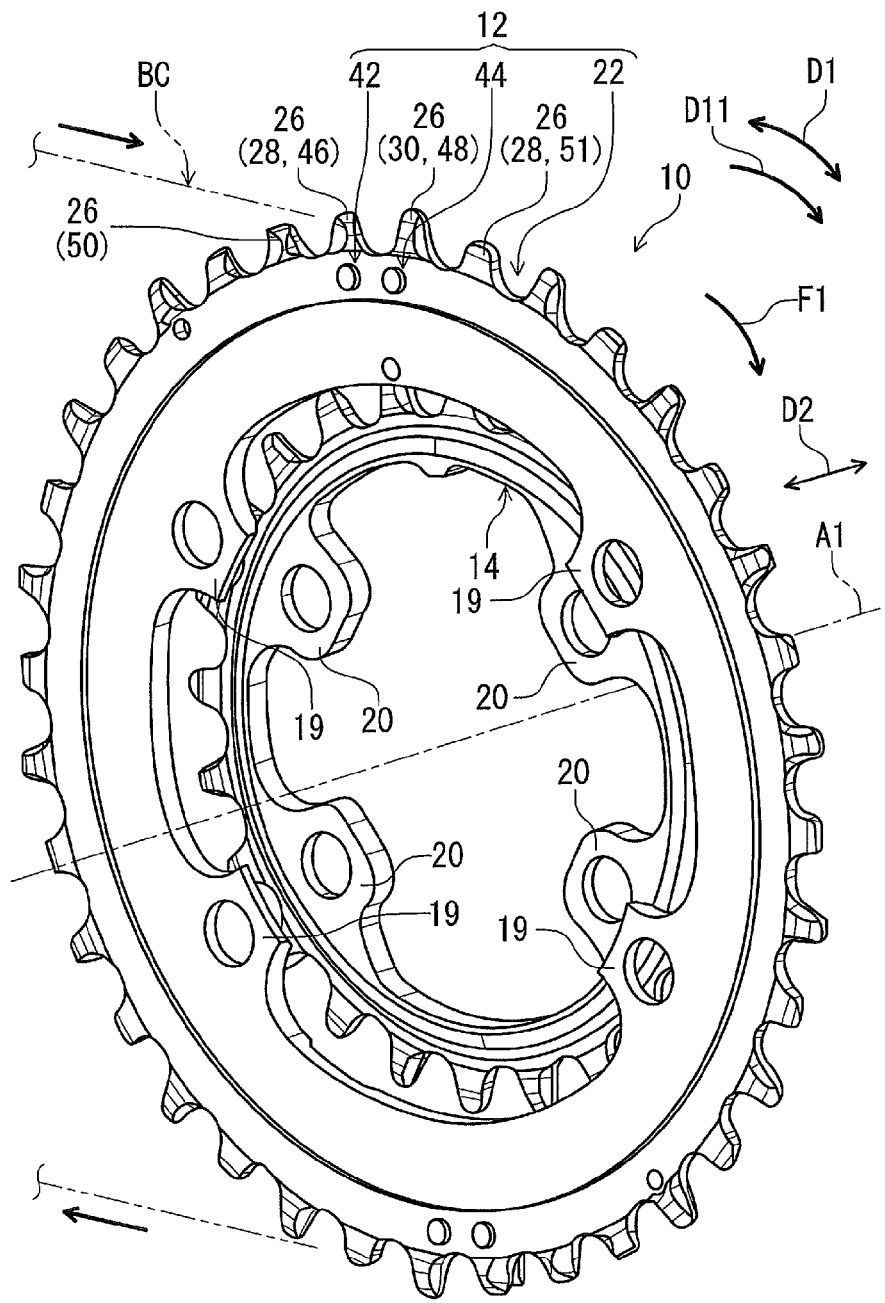
FIG. 3 is a perspective view of the bicycle sprocket assembly illustrated in FIG. 1 with a sprocket mounting member omitted.
Figure 4:
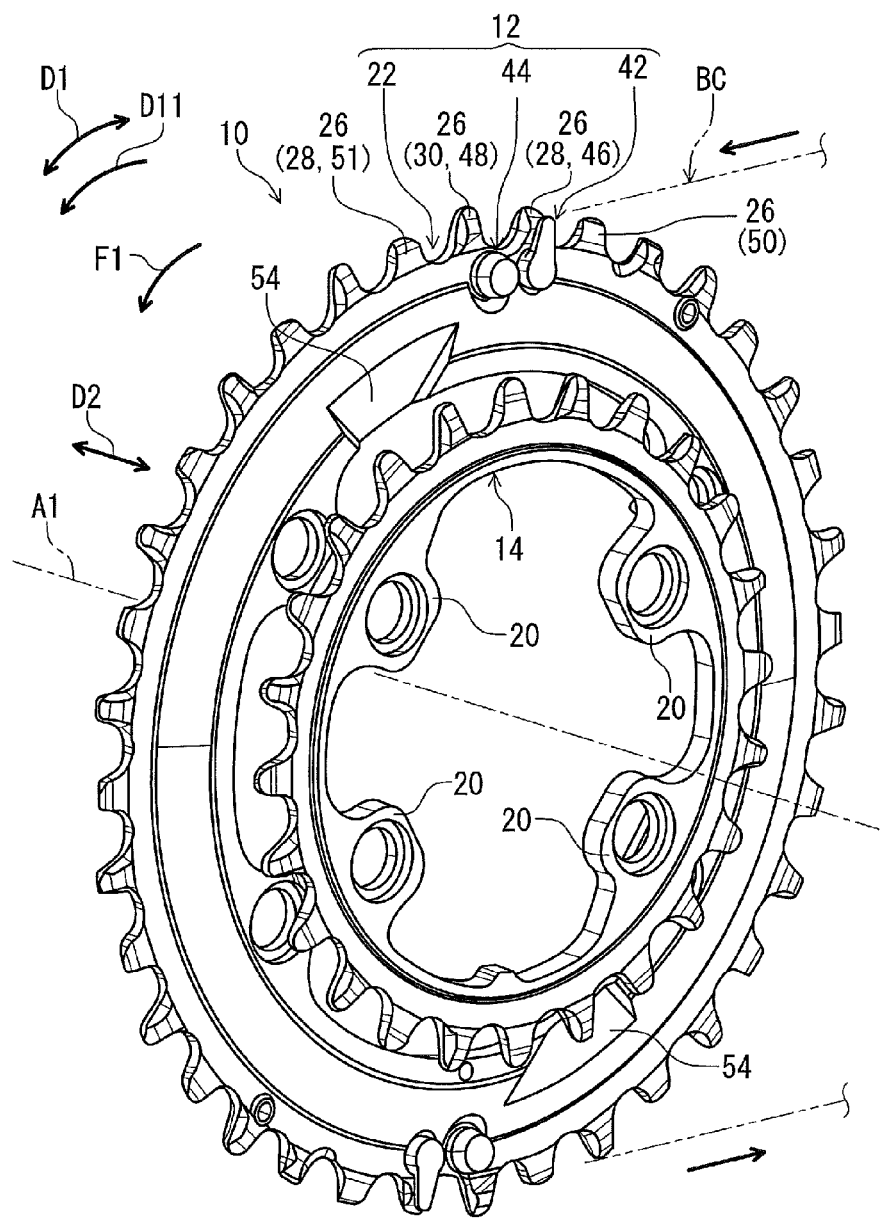
FIG. 4 is another perspective view of the bicycle sprocket assembly illustrated in FIG. 1 with the sprocket mounting member omitted.

As seen in FIGS. 3 and 4, the smaller sprocket 14 is adjacent to the bicycle sprocket 12 without another sprocket between the smaller sprocket 14 and the bicycle sprocket 12. The smaller sprocket 14 is adjacent to the bicycle sprocket 12 in an axial direction D2 parallel to the rotational center axis A1 without another sprocket between the smaller sprocket 14 and the bicycle sprocket 12.

Figure 5:
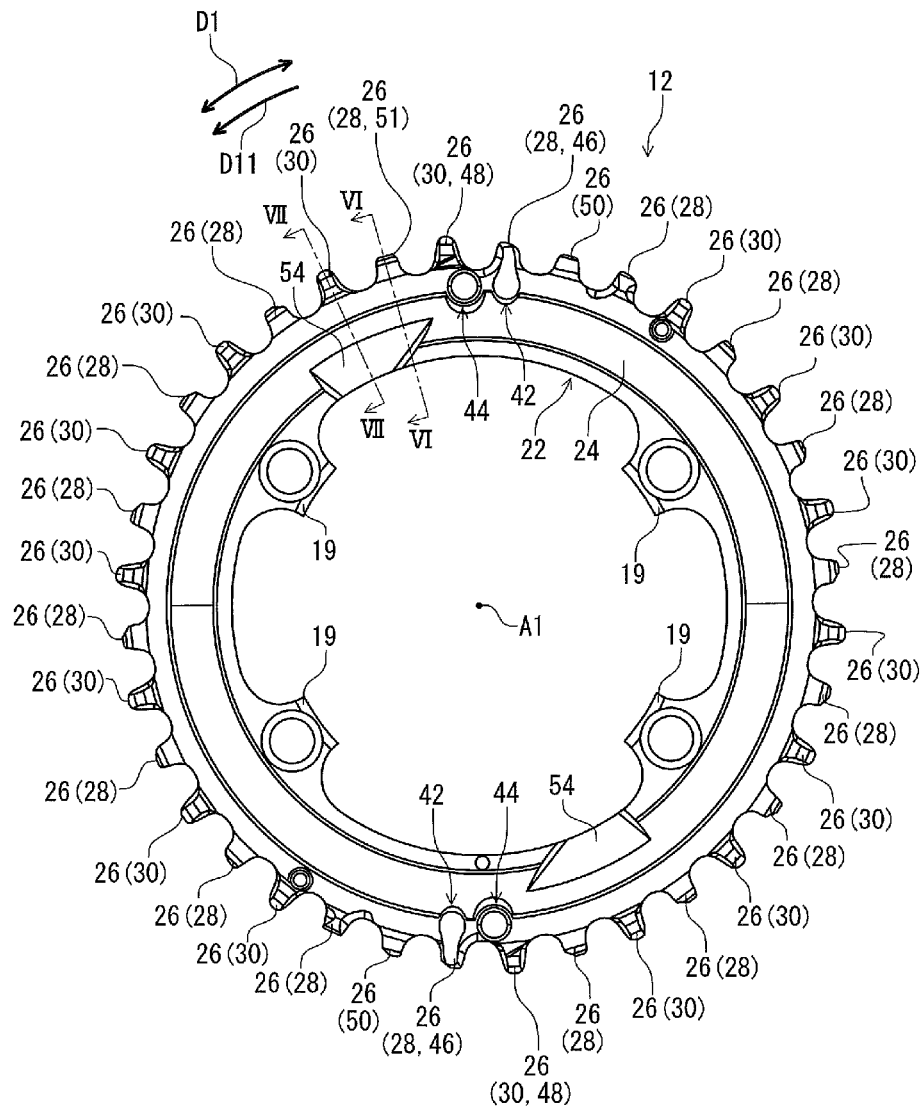
FIG. 5 is a side elevational view of the bicycle sprocket of the bicycle sprocket assembly illustrated in FIG. 1.

As seen in FIG. 5, the bicycle sprocket 12 comprise a sprocket element 22. The sprocket element 22 includes the rotational center axis A1, a sprocket body 24, and a plurality of sprocket teeth 26. The sprocket element 22 is rotatable relative to the bicycle frame (not shown) in the rotational direction D11 during pedaling. The sprocket body 24 includes a radially outer periphery disposed about the rotational center axis A1. The plurality of sprocket teeth 26 are arranged on the radially outer periphery of the sprocket body 24. The plurality of sprocket teeth 26 are coupled to the sprocket body 24 to engage with the bicycle chain BC to transmit the rotational driving force F1 to the bicycle chain BC. The plurality of sprocket teeth 26 include at least one first tooth 28 and at least one second tooth 30. In this embodiment, the plurality of sprocket teeth 26 include a plurality of first teeth 28 and a plurality of second teeth 30. Preferably, the first teeth 28 and the second teeth 30 are alternately arranged in the circumferential direction D1 of the bicycle sprocket 12.

Figure 6:
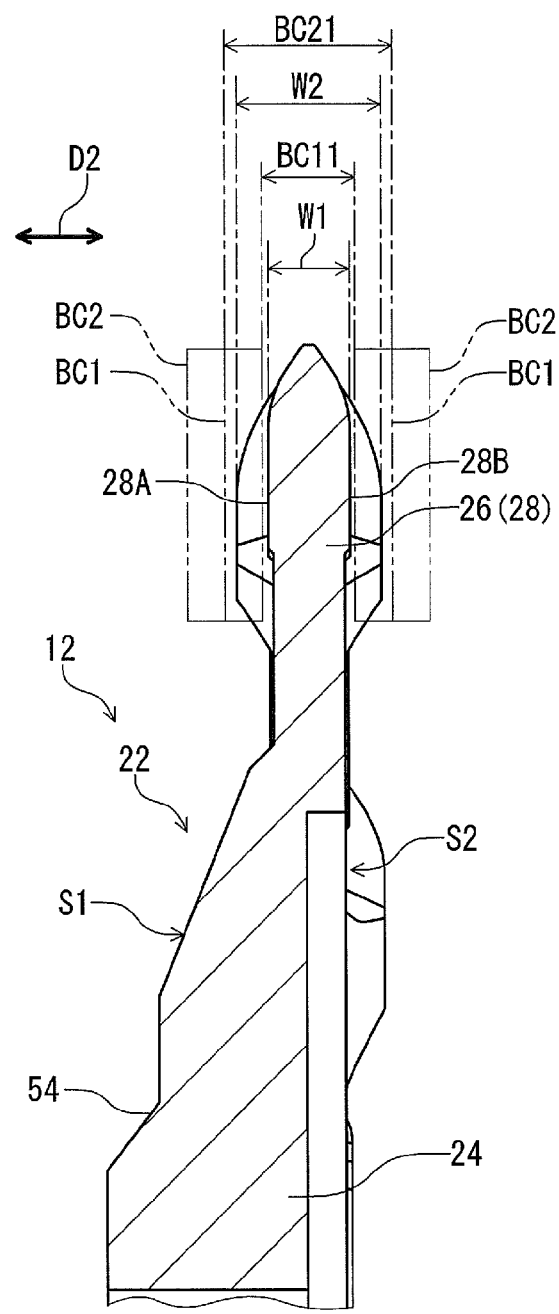
FIG. 6 is a cross-sectional view of the bicycle sprocket taken along line VI-VI of FIG. 5.
Figure 7:
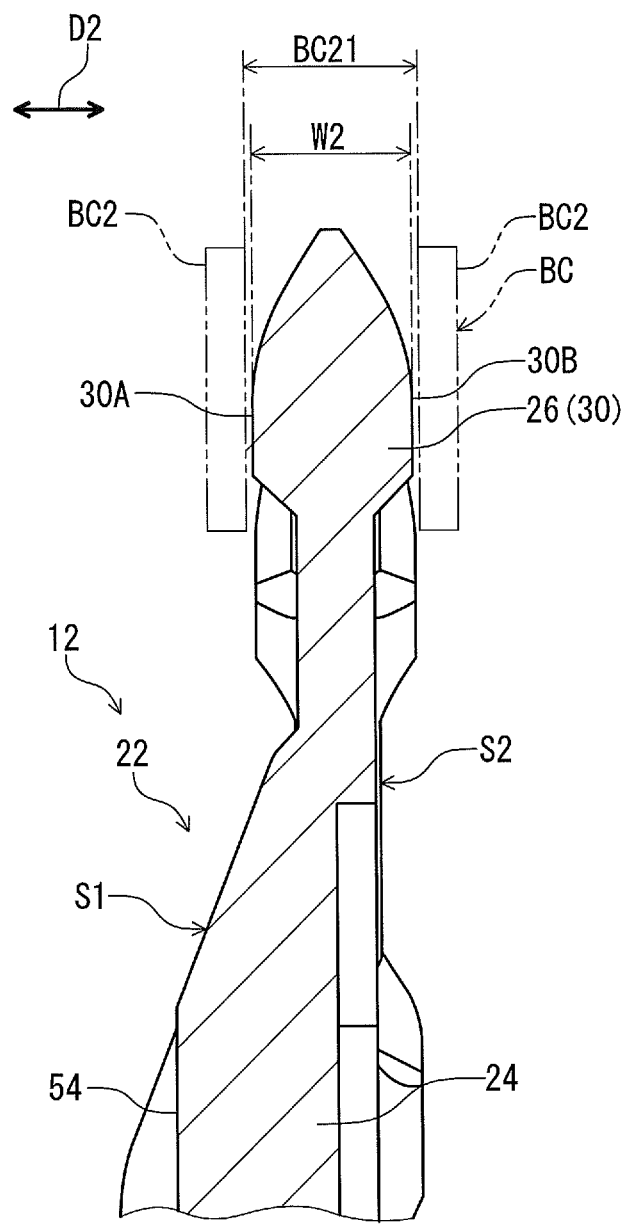
FIG. 7 is a cross-sectional view of the bicycle sprocket taken along line VII-VII of FIG. 5.

As seen in FIG. 6, the at least one first tooth 28 has a first chain engaging width W1. Each of the first teeth 28 has the first chain engaging width W1. As seen in FIG. 7, the at least one second tooth 30 has a second chain engaging width W2. Each of the second teeth 30 has the second chain engaging width W2. As seen in FIGS. 6 and 7, the first chain engaging width W1 is smaller than an inner link space BC11 defined between an opposed pair of inner link plates BC1 of the bicycle chain BC. The second chain engaging width W2 is larger than the inner link space BC11 and is smaller than an outer link space BC21 defined between an opposed pair of outer link plates BC2 of the bicycle chain BC. The inner link plate BC1 can also be referred to as a link plate BC1. The outer link plate BC2 can also be referred to as a link plate BC2. The sprocket element 22 includes a first axial surface S1 and a second axial surface S2 opposite to the first axial surface S1 in the axial direction D2. The first axial surface S1 is closer to the smaller sprocket 14 than the second axial surface S2 in the axial direction D2.

As seen in FIG. 6, the at least one first tooth 28 includes a first axial end 28A and a first opposite axial end 28B opposite to the first axial end 28A in the axial direction D2. The first axial end 28A and the first opposite axial end 28B are contactable with the inner link plate BC1 of the bicycle chain BC. The first chain engaging width W1 is defined between the first axial end 28A and the first opposite axial end 28B in the axial direction D2. In this embodiment, each of the first teeth 28 includes the first axial end 28A and the first opposite axial end 28B opposite to the first axial end 28A in the axial direction D2. In each of the first teeth 28, the first chain engaging width W1 is defined between the first axial end 28A and the first opposite axial end 28B in the axial direction D2. The first axial end 28A is disposed on the first axial surface S1. The first opposite axial end 28B is disposed on the second axial surface S2.

As seen in FIG. 7, the at least one second tooth 30 includes a second axial end 30A and a second opposite axial end 30B opposite to the second axial end 30A in the axial direction D2. The second axial end 30A and the second opposite axial end 30B are contactable with the outer link plate BC2 of the bicycle chain BC. The second chain engaging width W2 is defined between the second axial end 30A and the second opposite axial end 30B in the axial direction D2. In this embodiment, each of the second teeth 30 includes the second axial end 30A and the second opposite axial end 30B opposite to the second axial end 30A in the axial direction D2. In each of the second teeth 30, the second chain engaging width W2 is defined between the second axial end 30A and the second opposite axial end 30B in the axial direction D2. The second axial end 30A is disposed on the first axial surface S1. The second opposite axial end 30B is disposed on the second axial surface S2.

Figure 8:
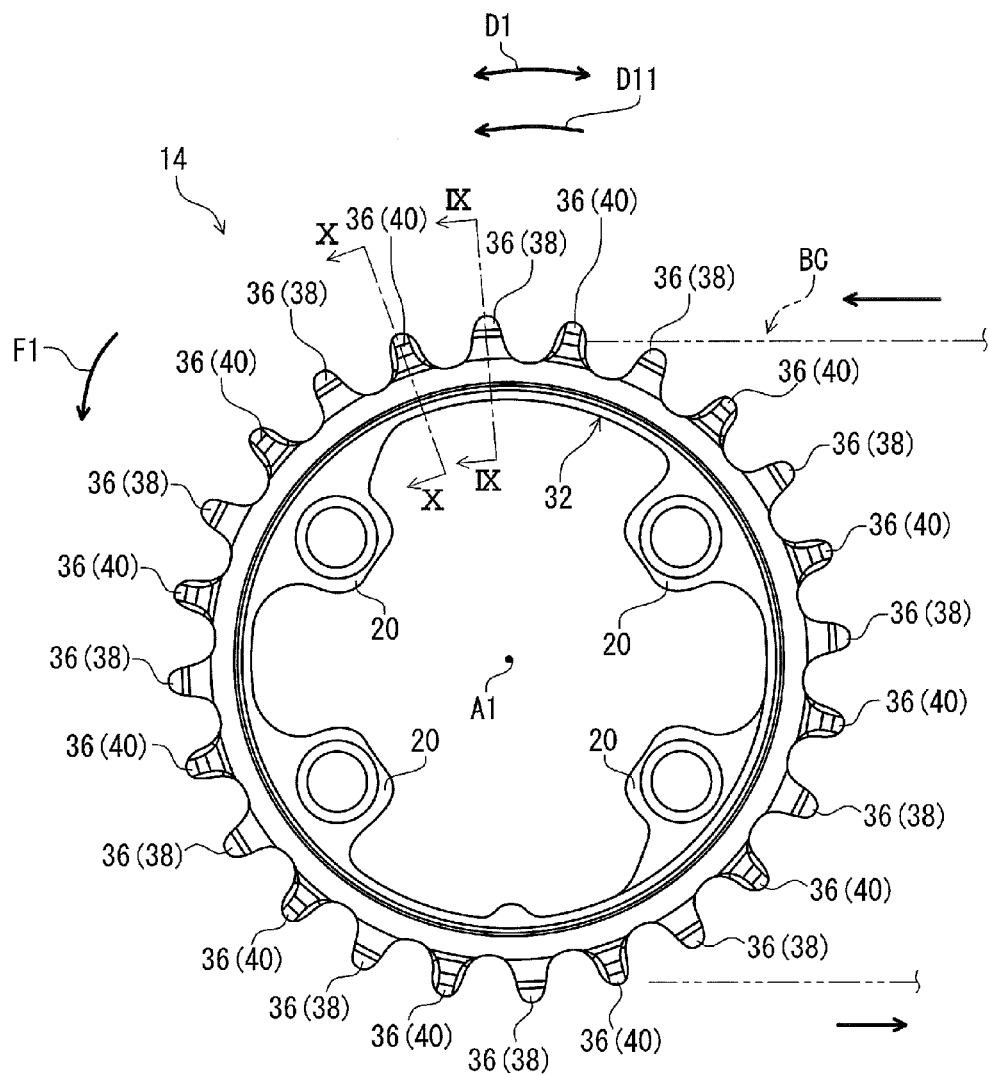
FIG. 8 is a side elevational view of a smaller sprocket of the bicycle sprocket assembly illustrated in FIG. 1.

As seen in FIG. 8, the smaller sprocket 14 comprises an additional sprocket body 32 and a plurality of additional sprocket teeth 36. The additional sprocket body 32 has an annular shape. The plurality of additional sprocket teeth 36 are arranged on the radially outer periphery of the additional sprocket body 32. The plurality of additional sprocket teeth 36 are coupled to the additional sprocket body 32 to engage with the bicycle chain BC to transmit the rotational driving force F1 to the bicycle chain BC. The plurality of additional sprocket teeth 36 are arranged at a constant pitch in the circumferential direction D1.

The plurality of additional sprocket teeth 36 includes at least one first additional tooth 38 and at least one second additional tooth 40. In this embodiment, the plurality of additional sprocket teeth 36 includes a plurality of first additional teeth 38 and a plurality of second additional teeth 40. Preferably, the first additional teeth 38 and the second additional teeth 40 are alternately arranged in the circumferential direction D1 defined about the rotational center axis A1. A total number of the plurality of additional sprocket teeth 36 of the smaller sprocket 14 is less than a total number of the plurality of sprocket teeth 26 of the bicycle sprocket 12.

Figure 9:
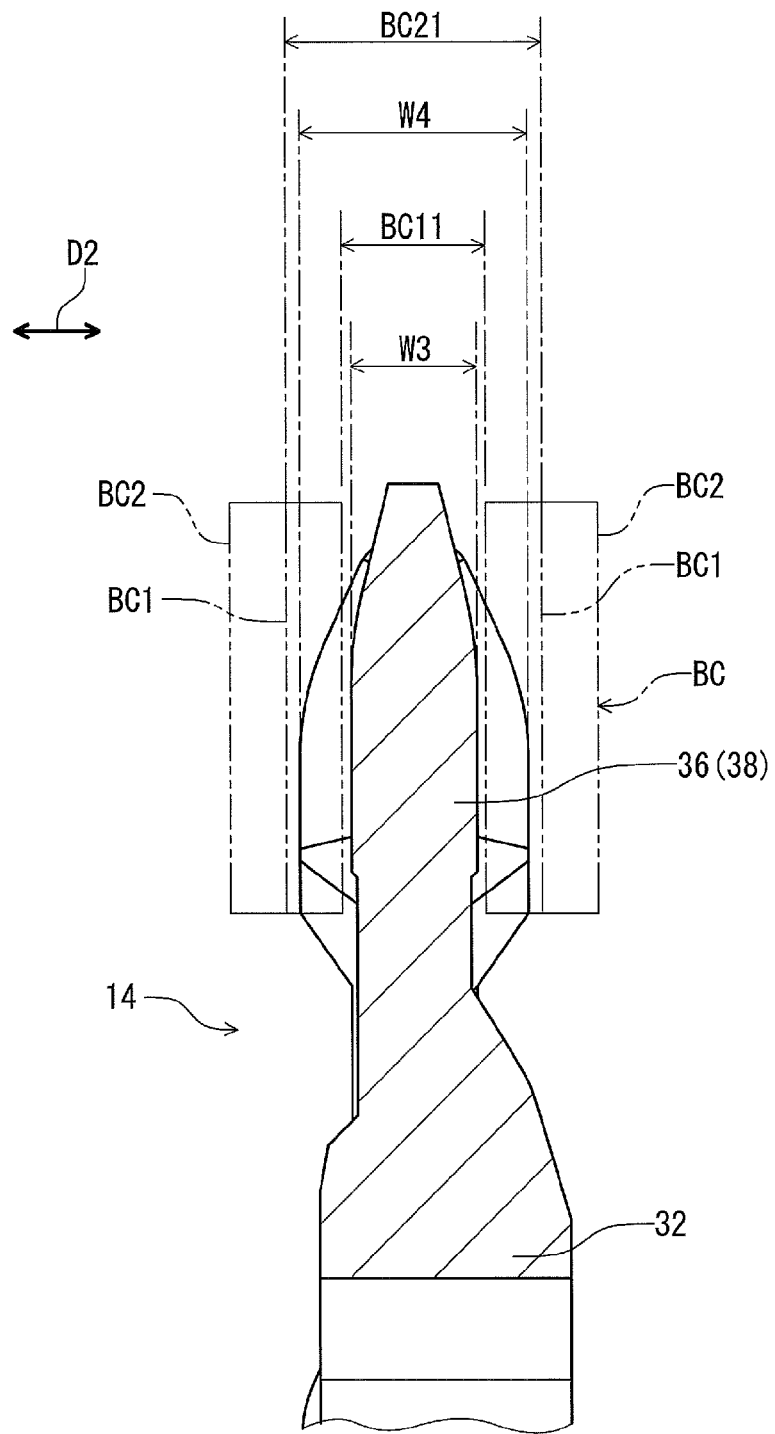
FIG. 9 is a cross-sectional view of the smaller sprocket taken along line IX-IX of FIG. 8.
Figure 10:
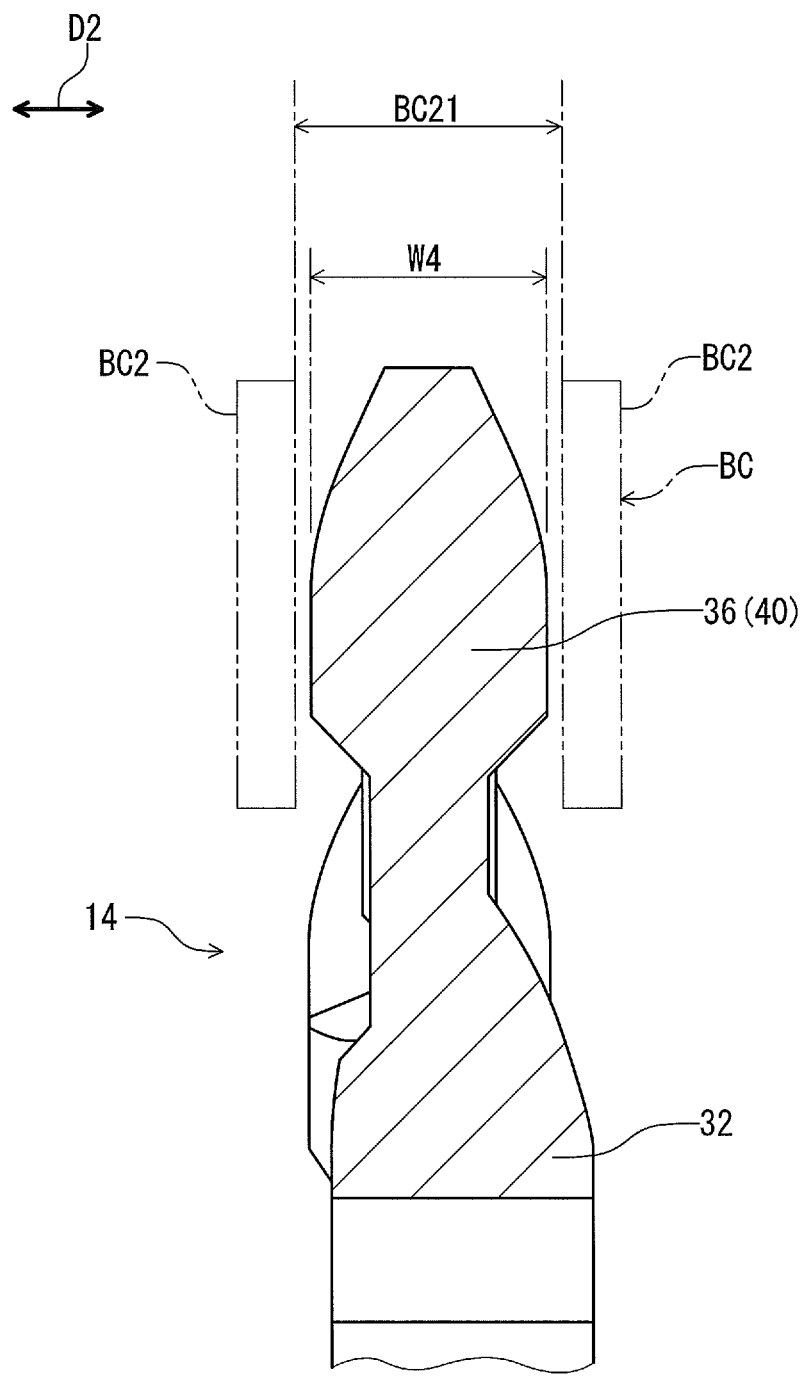
FIG. 10 is a cross-sectional view of the smaller sprocket taken along line X-X of FIG. 8.

As seen in FIG. 9, the at least one first additional tooth 38 has a third chain engaging width W3. The third chain engaging width W3 is defined in the axial direction D2 as well as the first chain engaging width W1 of the first tooth 28. Each of the first additional teeth 38 has the third chain engaging width W3. As seen in FIG. 10, the at least one second additional tooth 40 has a fourth chain engaging width W4. The fourth chain engaging width W4 is defined in the axial direction D2 as well as the second chain engaging width W2 of the second tooth 30. Each of the second additional teeth 40 has the fourth chain engaging width W4. As seen in FIGS. 9 and 10, the third chain engaging width W3 is smaller than the inner link space BC11. The fourth chain engaging width W4 is larger than the inner link space BC11 and is smaller than the outer link space BC21.

Figure 11:
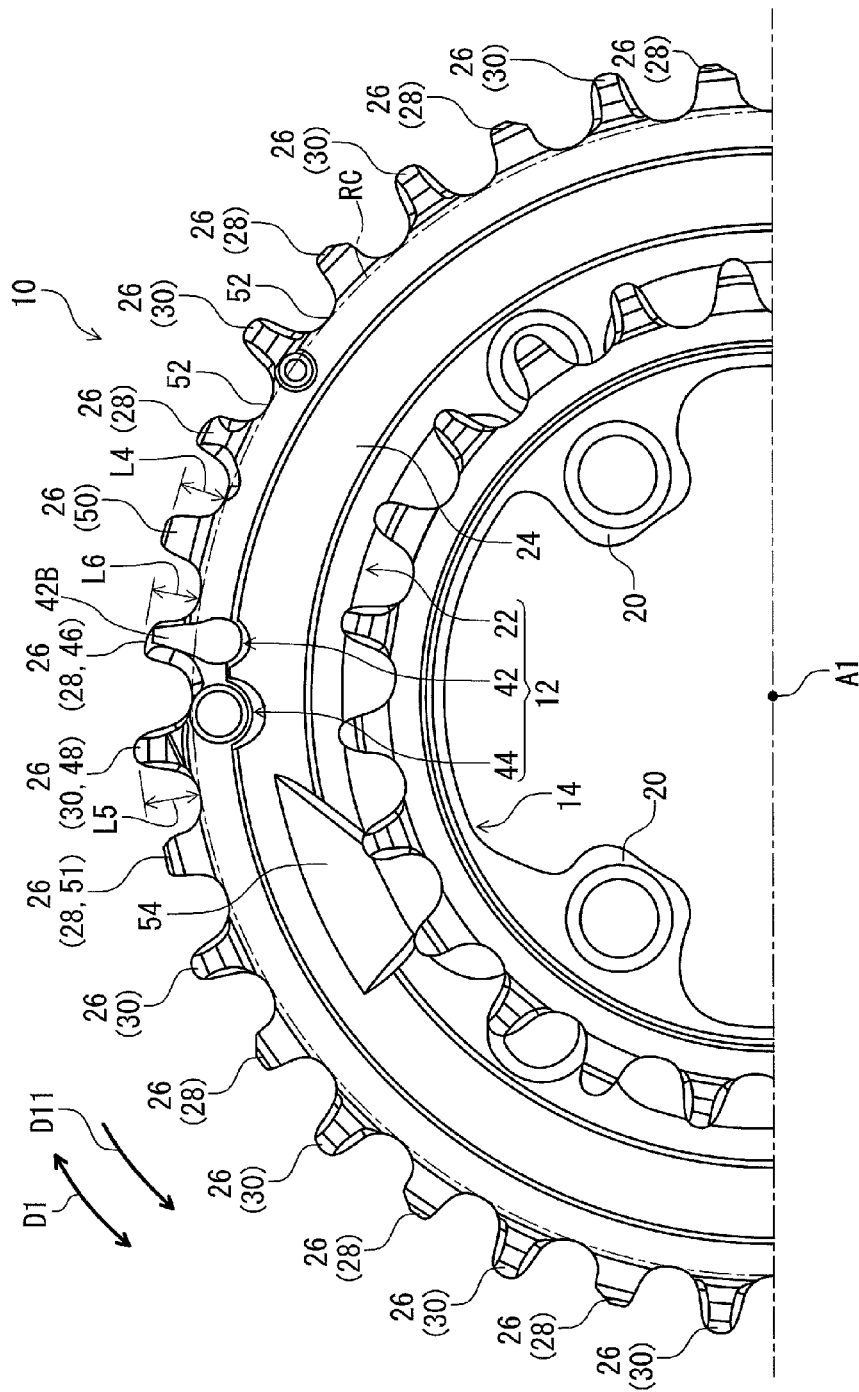
FIG. 11 is a side elevational view of the bicycle sprocket assembly illustrated in FIG. 1.

As seen in FIG. 11, the bicycle sprocket 12 comprise a first shifting facilitation projection 42 and a second shifting facilitation projection 44. In this embodiment, as seen in FIG. 5, the bicycle sprocket 12 comprise a plurality of first shifting facilitation projections 42 and a plurality of second shifting facilitation projections 44. However, a total number of the first shifting facilitation projections 42 is not limited to this embodiment. A total number of the second shifting facilitation projections 44 is not limited to this embodiment.

Figure 12:
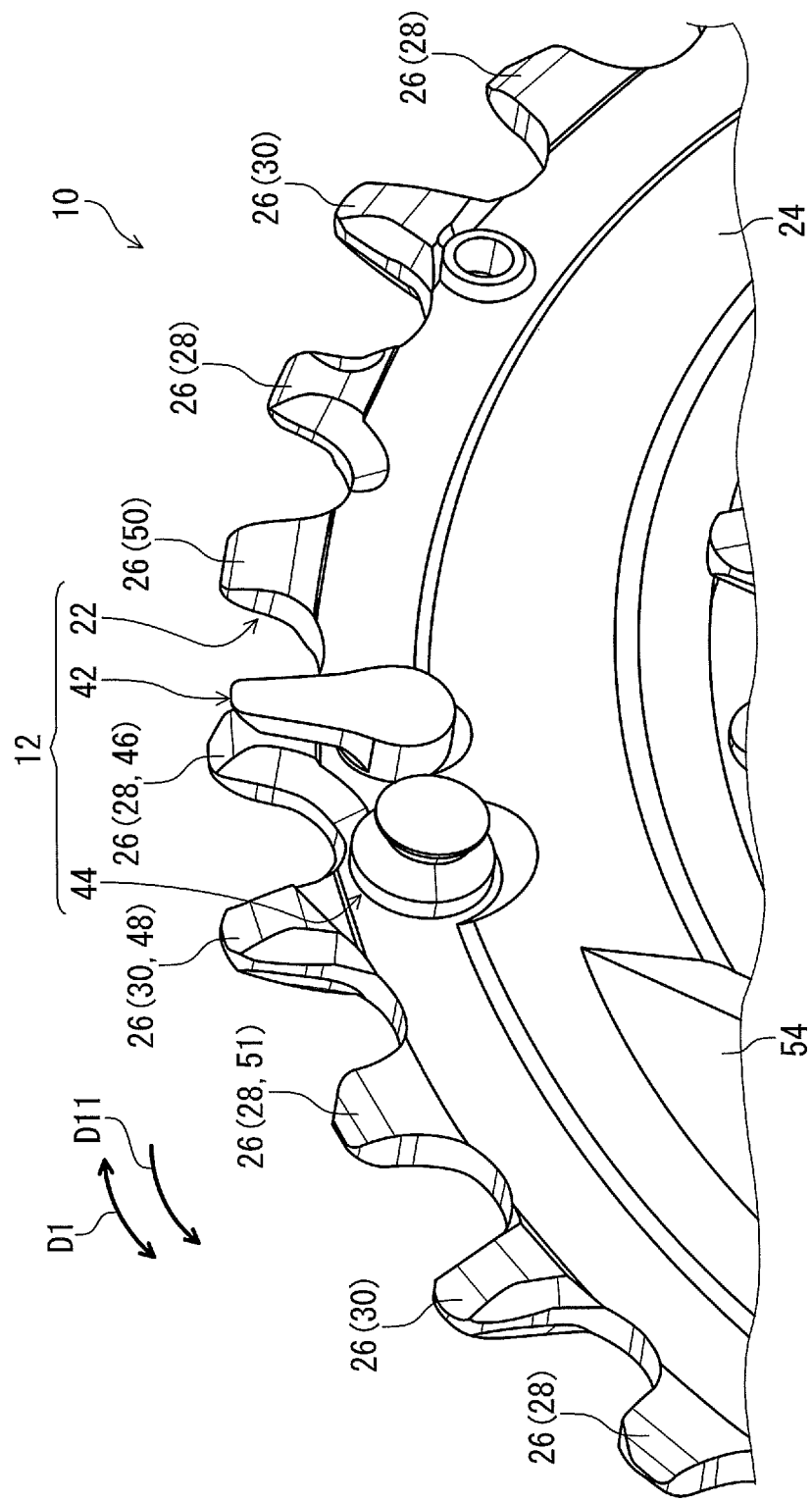
FIG. 12 is a partial perspective view of the bicycle sprocket assembly illustrated in FIG. 1.
Figure 13:
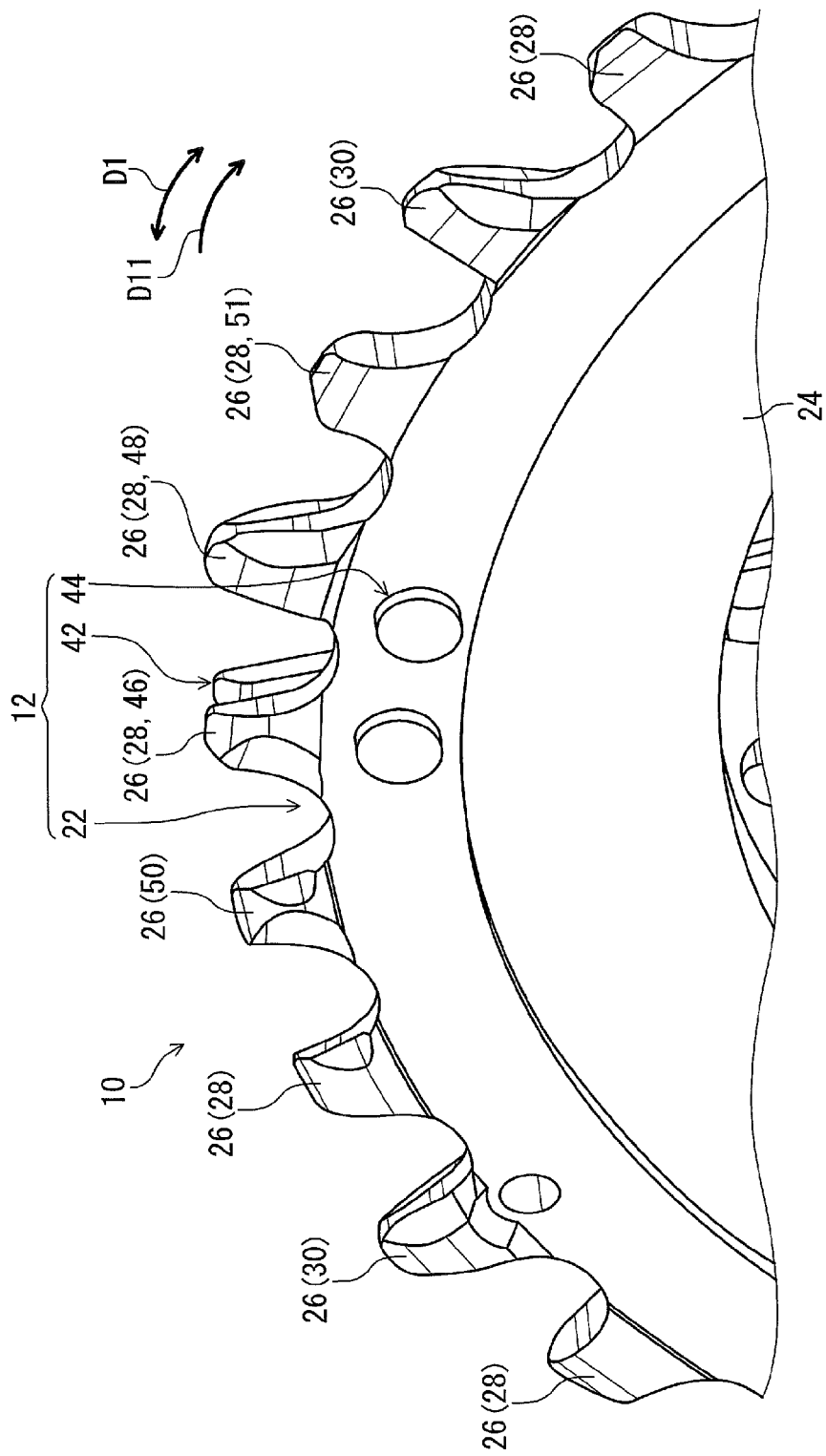
FIG. 13 is another partial perspective view of the bicycle sprocket assembly illustrated in FIG. 1.

As seen in FIGS. 12 and 13, the first shifting facilitation projection 42 is coupled to the sprocket element 22. The second shifting facilitation projection 44 is coupled to the sprocket element 22. In this embodiment, each of the first shifting facilitation projection 42 and the second shifting facilitation projection 44 is a separate member from the sprocket element 22. However, at least one of the first shifting facilitation projection 42 and the second shifting facilitation projection 44 can be integrally provided with the sprocket element 22 as a one-piece unitary member. Furthermore, the first shifting facilitation projection 42 is a separate member from the second shifting facilitation projection 44. However, the first shifting facilitation projection 42 can be integrally provided with the second shifting facilitation projection 44 as a one-piece unitary member. The first shifting facilitation projection 42 can also be referred to as a shifting facilitation projection 42. The second shifting facilitation projection 44 can also be referred to as a shifting facilitation projection 44.

The second shifting facilitation projection 44 is provided on a downstream side of the first shifting facilitation projection 42 in the rotational direction D11 in which the bicycle sprocket 12 rotates during pedaling without another shifting facilitation projection between the first shifting facilitation projection 42 and the second shifting facilitation projection 44 in the rotational direction D11. However, the arrangement of the first and second shifting facilitation projections 42 and 44 is not limited to this embodiment. The second shifting facilitation projection 44 can be provided on an upstream side of the first shifting facilitation projection 42 in the rotational direction D11 without another shifting facilitation projection between the first shifting facilitation projection 42 and the second shifting facilitation projection 44 in the rotational direction D11. Furthermore, another shifting facilitation projection can be disposed between the first and second shifting facilitation projections 42 and 44.

As seen in FIGS. 11 to 13, the plurality of sprocket teeth 26 includes a first adjacent tooth 46 and a second adjacent tooth 48. The at least one first tooth 28 includes the first adjacent tooth 46 closest to the first shifting facilitation projection 42 among the plurality of sprocket teeth 26. The at least one second tooth 30 includes the second adjacent tooth 48 closest to the second shifting facilitation projection 44 among the plurality of sprocket teeth 26. The second adjacent tooth 48 is adjacent to the first adjacent tooth 46 without another tooth in the circumferential direction D1 with respect to the rotational center axis A1. The first adjacent tooth 46 is closest to the first shifting facilitation projection 42 among the plurality of sprocket teeth 26. The second adjacent tooth 48 is closest to the second shifting facilitation projection 44 among the plurality of sprocket teeth 26. The first adjacent tooth 46 is disposed radially outward of the first shifting facilitation projection 42. The second adjacent tooth 48 is disposed radially outward of the second shifting facilitation projection 44.

Figure 14:
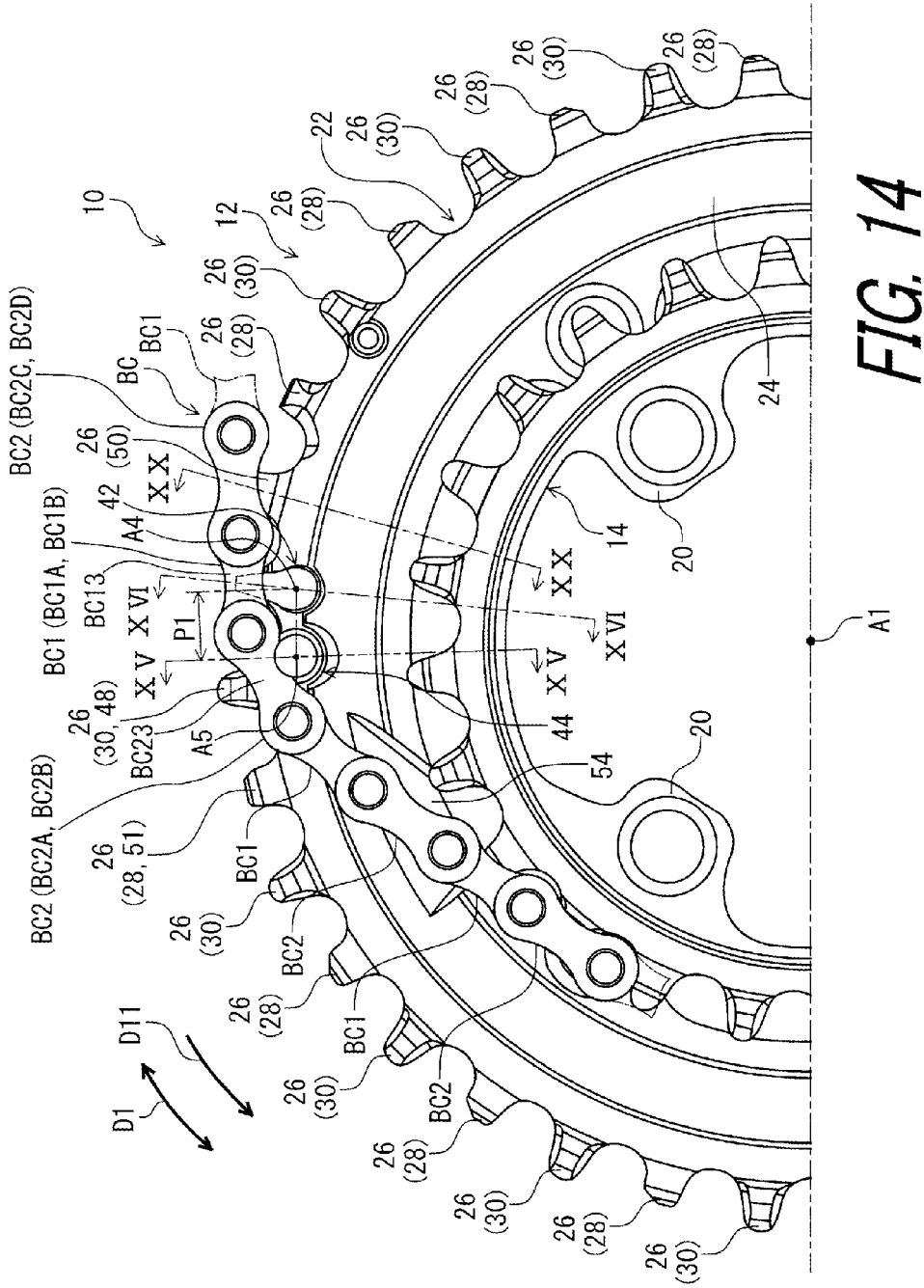
FIG. 14 is a side elevational view of the bicycle sprocket assembly illustrated in FIG. 1 with a bicycle chain (an upshifting operation).

FIG. 14 shows a positional relationship between the bicycle chain BC, the bicycle sprocket 12, and the smaller sprocket 14 in a shifting operation (an upshifting operation) in which the bicycle chain BC is shifted from the smaller sprocket 14 to the bicycle sprocket 12. As seen in FIG. 14, the first shifting facilitation projection 42 is spaced apart from the second shifting facilitation projection 44 at a first pitch P1 in the circumferential direction D1 defined about the rotational center axis A1. The first pitch P1 is substantially equal to a chain pitch of the bicycle chain BC. However, the first pitch P1 can be different from the chain pitch of the bicycle chain BC.

Figure 15:
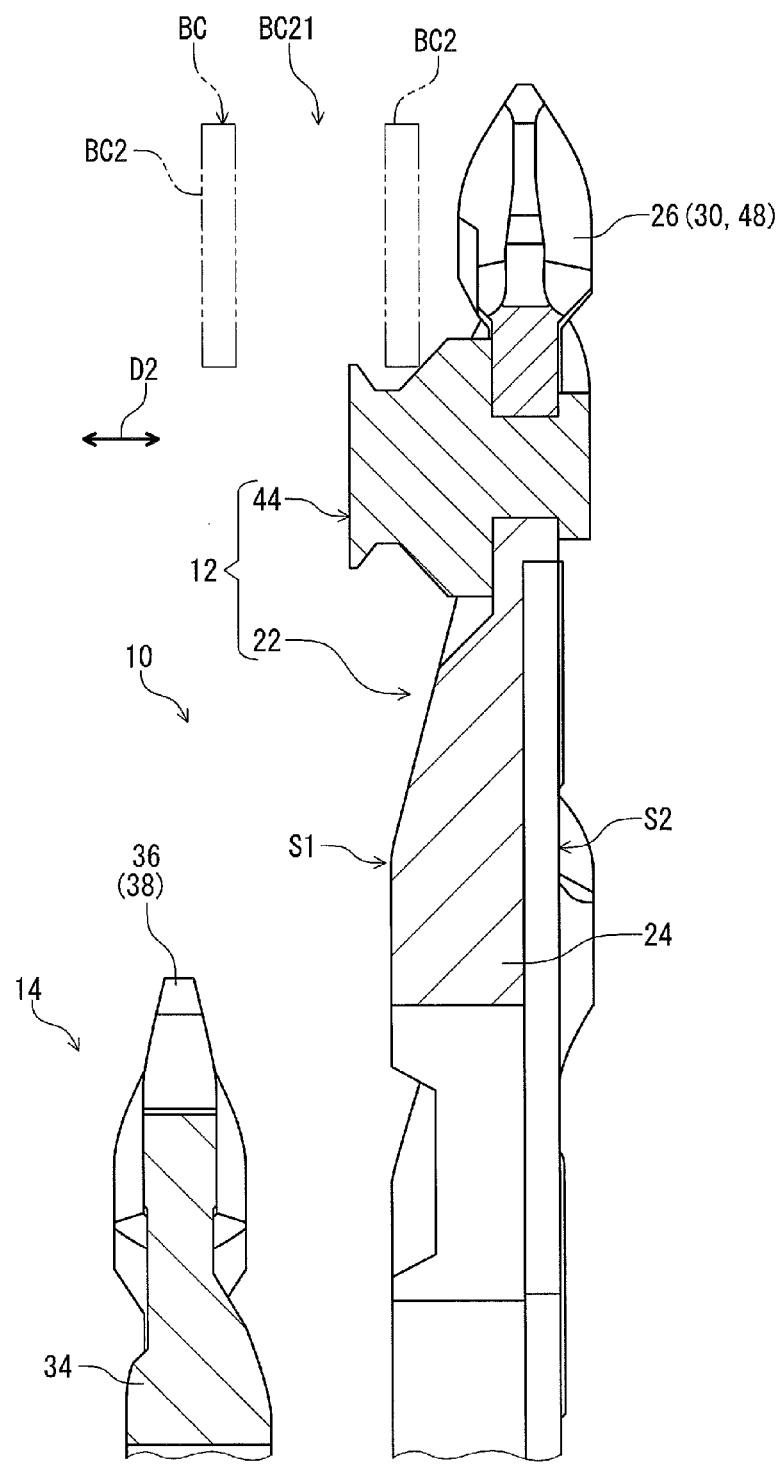
FIG. 15 is a cross-sectional view of the bicycle sprocket assembly taken along line XV-XV of FIG. 14 (the upshifting operation).

As seen in FIGS. 14 and 15, the second shifting facilitation projection 44 is coupled to the sprocket element 22 to engage with the bicycle chain BC when the bicycle chain BC is shifted from the smaller sprocket 14 to the bicycle sprocket 12. In this embodiment, the second shifting facilitation projection 44 is coupled to the sprocket element 22 to engage with the outer link plate BC2 of the bicycle chain BC when the bicycle chain BC is shifted from the smaller sprocket 14 to the bicycle sprocket 12. The second shifting facilitation projection 44 is coupled to the sprocket element 22 to engage with an intermediate portion BC23 (FIG. 14) of the outer link plate BC2 of the bicycle chain BC when the bicycle chain BC is shifted from the smaller sprocket 14 to the bicycle sprocket 12. The second shifting facilitation projection 44 is partly inserted in the outer link space BC21 of the opposed pair of outer link plates BC2 when the bicycle chain BC is shifted from the smaller sprocket 14 to the bicycle sprocket 12.

Figure 16:
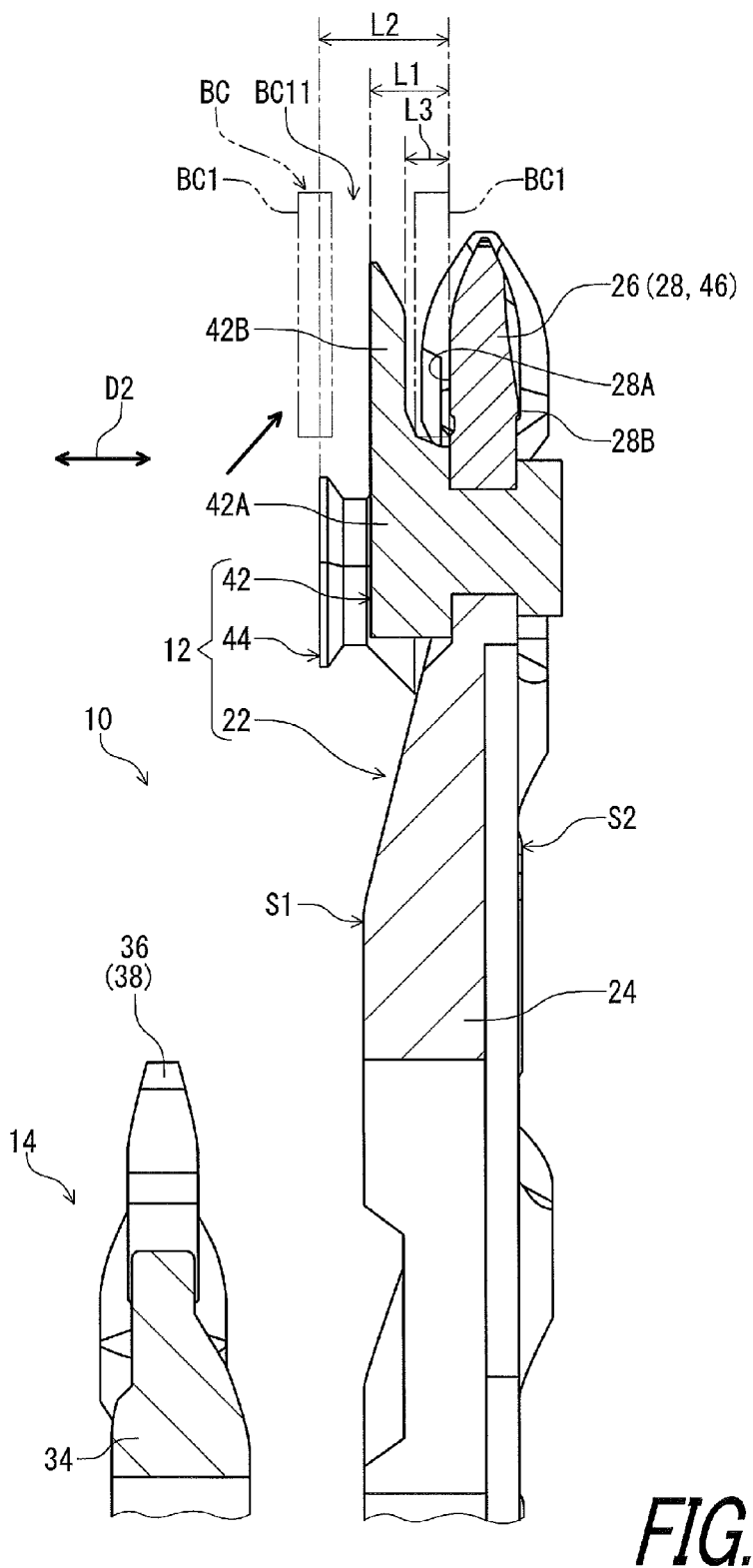
FIG. 16 is a cross-sectional view of the bicycle sprocket assembly taken along line XVI-XVI of FIG. 14 (the upshifting operation).

As seen in FIGS. 14 and 16, the first shifting facilitation projection 42 is coupled to the sprocket element 22 to engage with the bicycle chain BC when the bicycle chain BC is shifted from the smaller sprocket 14 to the bicycle sprocket 12. In this embodiment, the first shifting facilitation projection 42 is coupled to the sprocket element 22 to engage with the inner link plate BC1 of the bicycle chain BC when the bicycle chain BC is shifted from the smaller sprocket 14 to the bicycle sprocket 12. The first shifting facilitation projection 42 is coupled to the sprocket element 22 to engage with an intermediate portion BC13 (FIG. 14) of the inner link plate BC1 of the bicycle chain BC when the bicycle chain BC is shifted from the smaller sprocket 14 to the bicycle sprocket 12. The first shifting facilitation projection 42 is partly inserted in the inner link space BC11 of the opposed pair of inner link plates BC1 when the bicycle chain BC is shifted from the smaller sprocket 14 to the bicycle sprocket 12.

As seen in FIG. 16, the first shifting facilitation projection 42 has a first axial length L1 defined from the sprocket element 22 in the axial direction D2 parallel to the rotational center axis A1. The second shifting facilitation projection 44 has a second axial length L2 defined from the sprocket element 22 in the axial direction D2. The first axial length L1 is smaller than the second axial length L2. In this embodiment, the first axial length L1 is defined from the first axial end 28A of the first tooth 28 (the first adjacent tooth 46) in the axial direction D2. The second axial length L2 is defined from the first axial end 28A of the first tooth 28 (the first adjacent tooth 46) in the axial direction D2.

Figure 17:
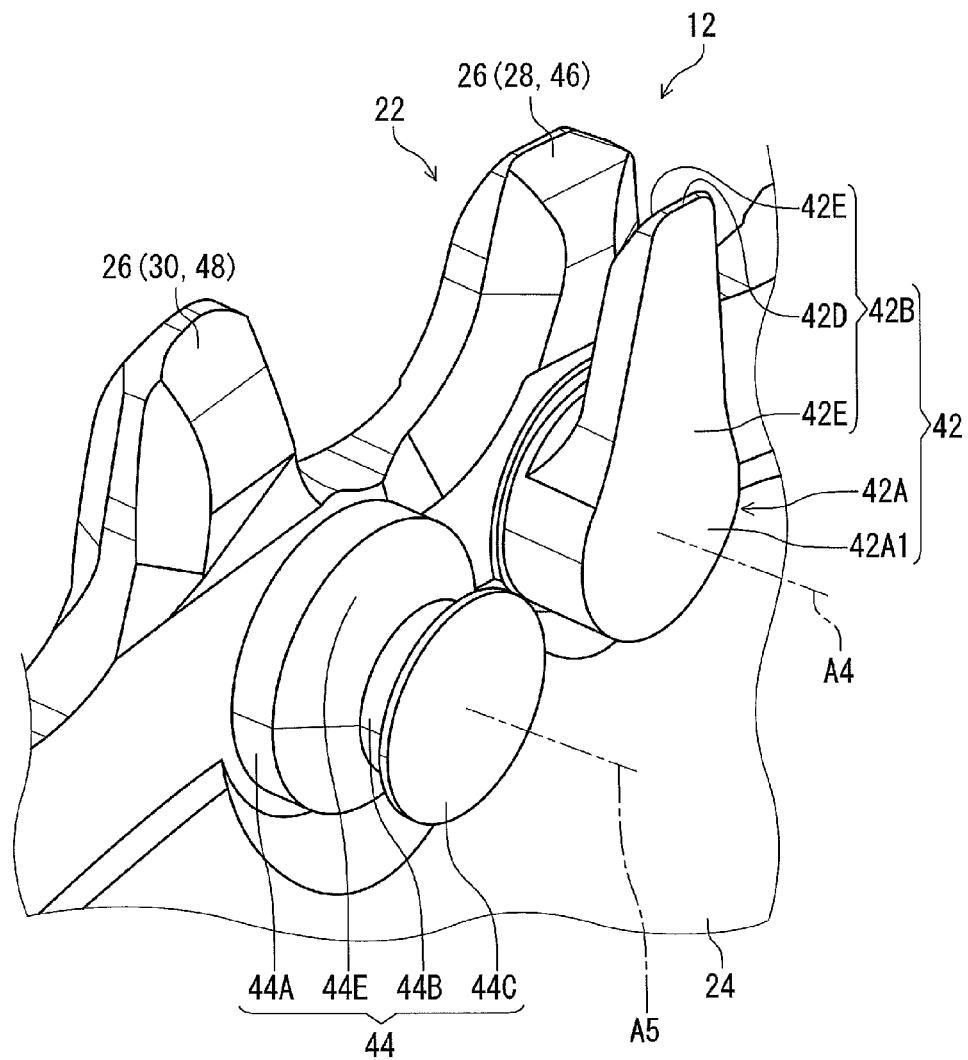
FIG. 17 is a partial enlarged perspective view of the bicycle sprocket assembly illustrated in FIG. 1.
Figure 18:
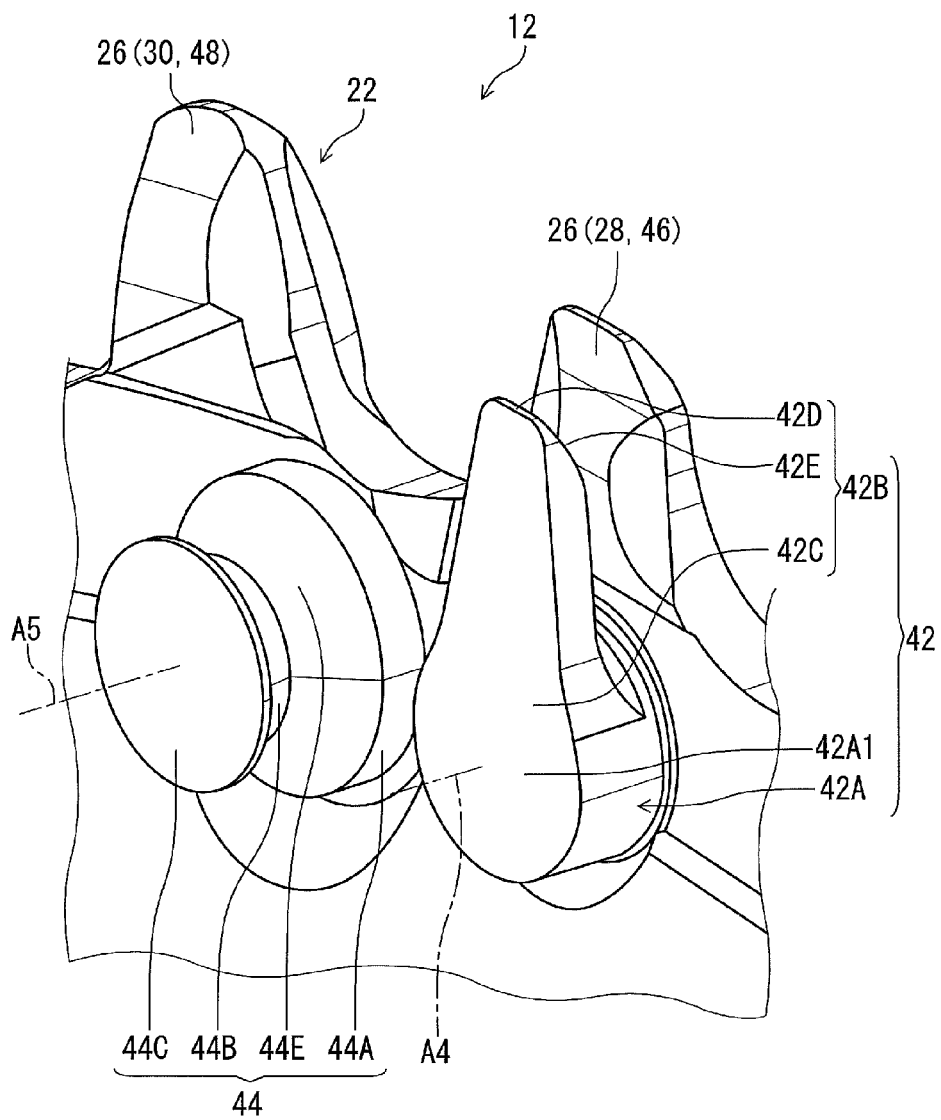
FIG. 18 is another partial enlarged perspective view of the bicycle sprocket assembly illustrated in FIG. 1.
Figure 19:
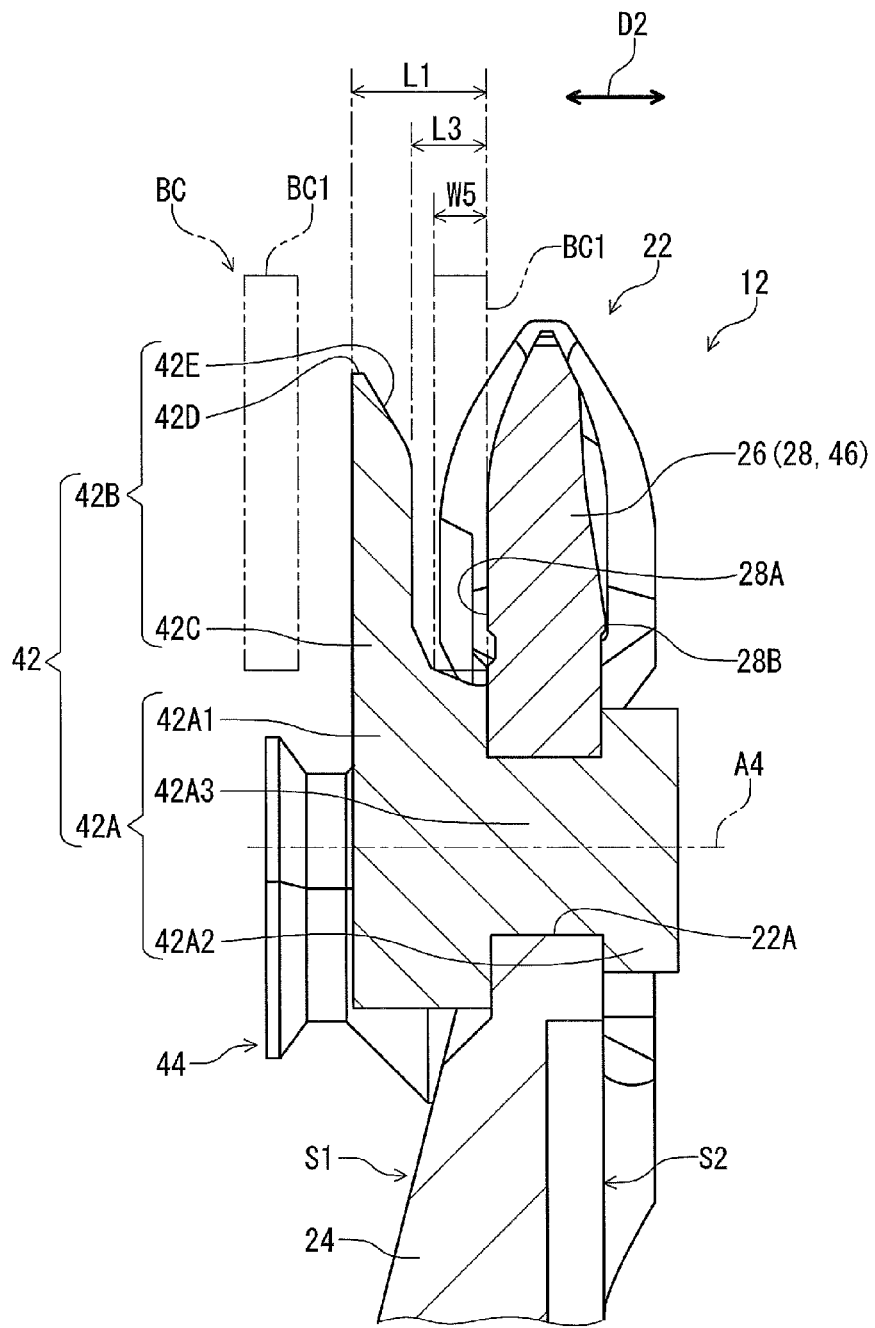
FIG. 19 is a partial enlarged cross-sectional view of the bicycle sprocket assembly illustrated in FIG. 16.

As seen in FIGS. 17 to 19, the first shifting facilitation projection 42 includes a first coupling body 42A and a protruding part 42B. The first coupling body 42A is coupled to the sprocket element 22. The protruding part 42B extends radially outward from the first coupling body 42A with respect to the rotational center axis A1. The protruding part 42B is spaced apart from the sprocket element 22 in the axial direction D2 parallel to the rotational center axis A1. In this embodiment, the protruding part 42B is spaced apart from the first tooth 28 (the first adjacent tooth 46) in the axial direction D2. The protruding part 42B is contactable with the bicycle chain BC when the bicycle chain BC is shifted from the smaller sprocket 14 to the bicycle sprocket 12.

The first coupling body 42A includes a first base body 42A1, a first head part 42A2, and a first connecting part 42A3 (see FIG. 19). The first base body 42A1 is disposed on the first axial surface S1. The protruding part 42B extends radially outward from the first base body 42A1 with respect to the rotational center axis A1. The first base body 42A1 is contactable with the inner link plate BC1 of the bicycle chain BC. The first head part 42A2 is disposed on the second axial surface S2. The first connecting part 42A3 connects the first head part 42A2 to the first base body 42A1 and extends through a first attachment hole 22A of the sprocket element 22. The first coupling body 42A has a first center axis A4 extends in the axial direction D2. While the first center axis A4 of the first coupling body 42A is parallel to the axial direction D2 in this embodiment, the first center axis A4 can be non-parallel to the axial direction D2. The first base body 42A1 has an outer diameter larger than an outer diameter of the first connecting part 42A3. The first head part 42A2 has an outer diameter larger than the outer diameter of the first connecting part 42A3. The first base body 42A1, the first head part 42A2, and the first connecting part 42A3 constitute a rivet. However, the first shifting facilitation projection 42 can be coupled to the sprocket element 22 with other coupling structures.

As seen in FIG. 19, the first shifting facilitation projection 42 is disposed to keep a clearance at least one of between the protruding part 42B and the inner link plate BC1 in the axial direction D2 and between the first adjacent tooth 46 and the inner link plate BC1 in the axial direction D2 during pedaling. A maximum axial distance L3 defined between the protruding part 42B and the first adjacent tooth 46 in the axial direction D2 is larger than an axial width W5 of the inner link plate BC1.

The maximum axial distance L3 is in a range of 0.5 mm to 4.0 mm. The maximum axial distance L3 is preferably equal to or larger than 1.0 mm. The maximum axial distance L3 is preferably equal to or smaller than 3.8 mm. The maximum axial distance L3 is preferably in a range of 1.0 mm to 2.0 mm. However, the maximum axial distance L3 can be in a range different from the above ranges.

As seen in FIGS. 17 to 19, the protruding part 42B includes a radially inner end 42C, a radially outer end 42D, and a first inclined surface 42E. The radially inner end 42C is coupled to the first coupling body 42A. The radially outer end 42D is provided radially outward of the radially inner end 42C with respect to the rotational center axis A1. The first inclined surface 42E faces the sprocket element 22 in the axial direction D2. The first inclined surface 42E is inclined to gradually approach the sprocket element 22 in the axial direction D2 from the radially outer end 42D toward the radially inner end 42C. The first inclined surface 42E guides the inner link plate BC1 of the bicycle chain BC toward the first adjacent tooth 46 in the axial direction D2 when the first shifting facilitation projection 42 comes into engagement with the bicycle chain BC.

As seen in FIG. 11, the protruding part 42B is disposed to at least partly overlap with one of the plurality of sprocket teeth 26 when viewed from the axial direction D2 parallel to the rotational center axis A1. In this embodiment, the protruding part 42B is disposed to partly overlap with the first adjacent tooth 46 when viewed from the axial direction D2 parallel to the rotational center axis A1.

As seen in FIG. 19, the first shifting facilitation projection 42 is engaged between an opposed pair of link plates of the bicycle chain BC when the bicycle chain BC is shifted from the smaller sprocket 14 to the bicycle sprocket 12. In this embodiment, the first shifting facilitation projection 42 is engaged between the opposed pair of inner link plates BC1 of the bicycle chain BC when the bicycle chain BC is shifted from the smaller sprocket 14 to the bicycle sprocket 12.

Figure 20:
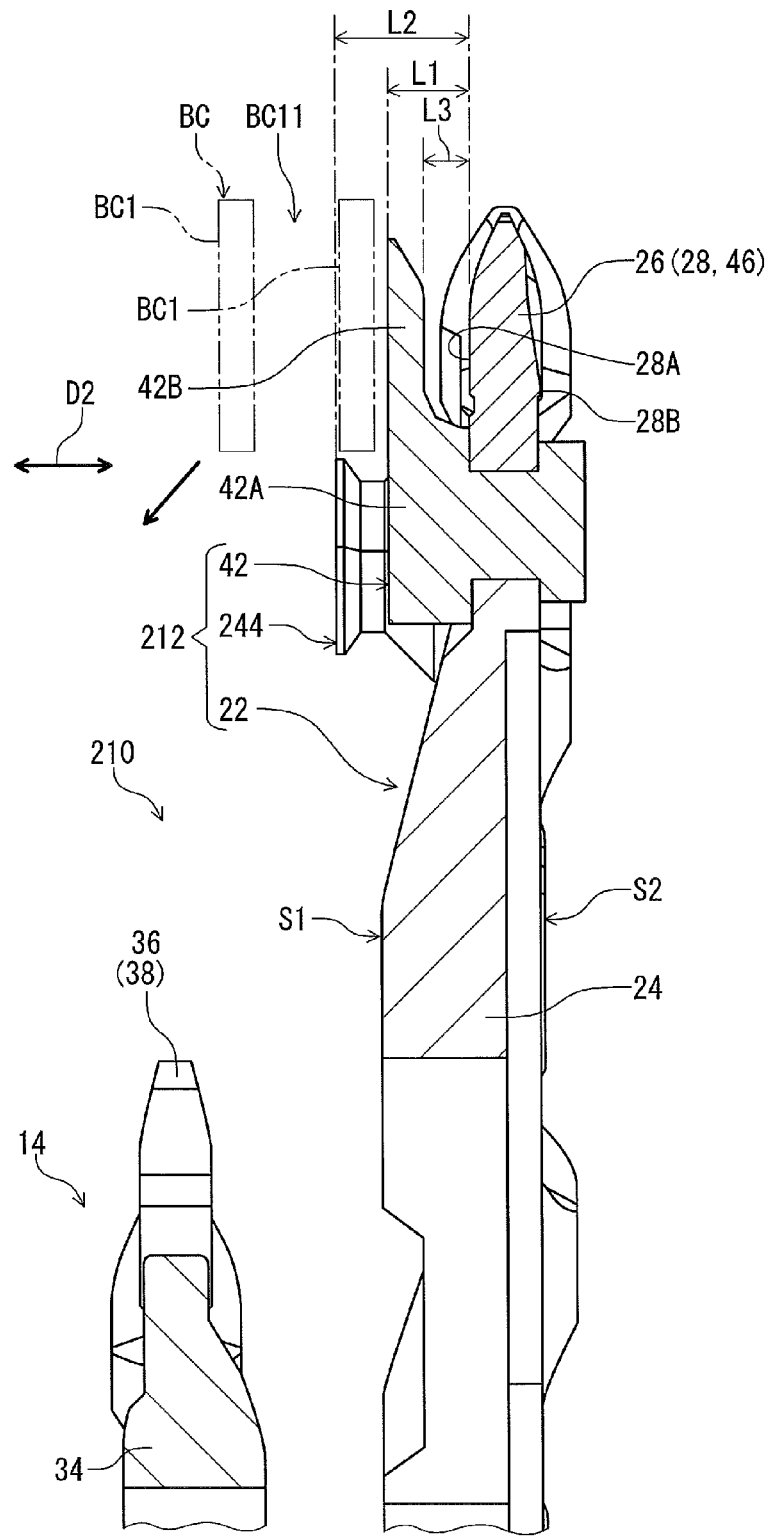
FIG. 20 is a partial cross-sectional view of the bicycle sprocket assembly (a downshifting operation).

As seen in FIG. 20, the first shifting facilitation projection 42 is disposed not to be inserted between an opposed pair of link plates of the bicycle chain BC when the bicycle chain BC is shifted from the bicycle sprocket 12 to the smaller sprocket 14. In this embodiment, the first shifting facilitation projection 42 is disposed not to be inserted between the opposed pair of inner link plates BC1 of the bicycle chain BC when the bicycle chain BC is shifted from the bicycle sprocket 12 to the smaller sprocket 14 (i.e., during a downshifting operation).

Figure 21:
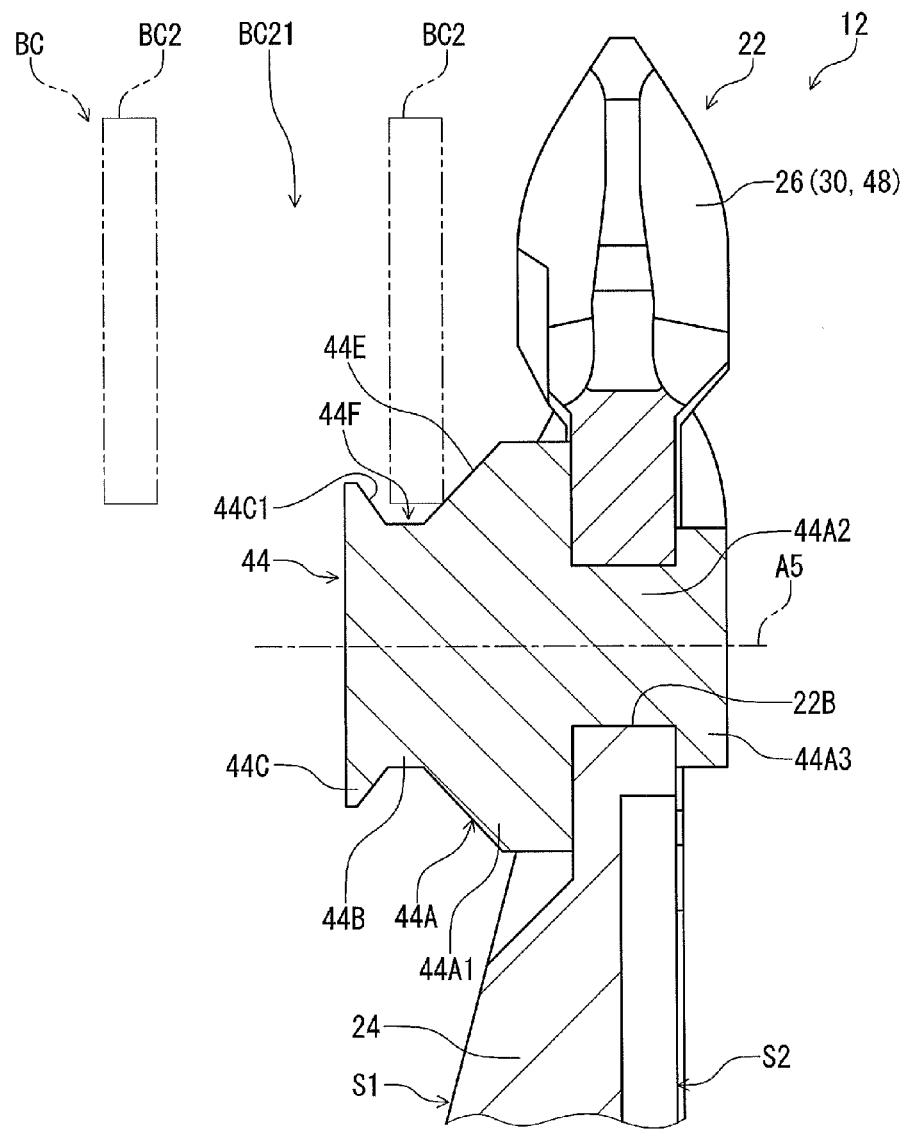
FIG. 21 is a partial enlarged cross-sectional view of the bicycle sprocket assembly (the downshifting operation).

As seen in FIGS. 17, 18, and 21, the second shifting facilitation projection 44 includes a second inclined surface 44E facing toward an opposite side of the sprocket element 22 in the axial direction D2. The second inclined surface 44E is inclined to gradually approach the sprocket element 22 in the axial direction D2 from a radially inner side to a radially outer side with respect to the rotational center axis A1. The second inclined surface 44E guides the outer link plate BC2 of the bicycle chain BC away from the second adjacent tooth 48 in the axial direction D2 when the bicycle chain BC is shifted from the smaller sprocket 14 to the bicycle sprocket 12.

The second shifting facilitation projection 44 has a second center axis A5 and protrudes from the sprocket element 22 along the second center axis A5. In this embodiment, the second center axis A5 extends in the axial direction D2. While the second center axis A5 of the second shifting facilitation projection 44 is parallel to the axial direction D2 in this embodiment, the second center axis A5 can be non-parallel to the axial direction D2. The second shifting facilitation projection 44 includes a second coupling body 44A, an intermediate part 44B, and an additional protruding part 44C. The second coupling body 44A includes the second inclined surface 44E. In this embodiment, the additional protruding part 44C has an annular shape and the second inclined surface 44E includes a tapered surface arranged about the second center axis A5. As seen in FIG. 14, the first pitch P1 is defined between the first center axis A4 and the second center axis A5.

As seen in FIGS. 17, 18, and 21, the intermediate part 44B protrudes from the second coupling body 44A along the second center axis A5 toward an opposite side of the sprocket element 22. The additional protruding part 44C protrudes radially outward from the intermediate part 44B. The additional protruding part 44C has an annular shape and includes a third inclined surface 44C1 facing toward the sprocket element 22. The third inclined surface 44C1 is inclined to gradually approach the sprocket element 22 in the axial direction D2 from the radially outer side to the radially inner side with respect to the rotational center axis A1. In this embodiment, the third inclined surface 44C1 includes a tapered surface arranged about the second center axis A5. The second inclined surface 44E, the third inclined surface 44C1, and the intermediate part 44B define an annular groove 44F.

The second coupling body 44A includes a second base body 44A1, a second head part 44A2, and a second connecting part 44A3. The second base body 44A1 is disposed on the first axial surface S1. The intermediate part 44B protrudes from the second base body 44A1 along the second center axis A5 toward the opposite side of the sprocket element 22. The second base body 44A1 is contactable with the outer link plate BC2 of the bicycle chain BC when the bicycle chain BC is shifted from the smaller sprocket 14 to the bicycle sprocket 12. The second base body 44A1 includes the second inclined surface 44E. The second head part 44A2 is disposed on the second axial surface S2. The second connecting part 44A3 connects the second head part 44A2 to the second base body 44A1 and extends through a second attachment hole 22B of the sprocket element 22. The second base body 44A1 has an outer diameter larger than an outer diameter of the second connecting part 44A3. The second head part 44A2 has an outer diameter larger than the outer diameter of the second connecting part 44A3. The second base body 44A1, the second head part 44A2, and the second connecting part 44A3 constitute a rivet. However, the second shifting facilitation projection 44 can be coupled to the sprocket element 22 with other coupling structures.

As seen in FIGS. 5 and 11, the plurality of sprocket teeth 26 includes a receiving tooth 50 adjacent to the first adjacent tooth 46 without another tooth between the receiving tooth 50 and the first adjacent tooth 46 in the circumferential direction D1 defined about the rotational center axis A1. The receiving tooth 50 is provided on an upstream side of the first adjacent tooth 46 in the rotational direction D11 in which the bicycle sprocket 12 rotates during pedaling.

As seen in FIG. 14, the receiving tooth 50 is configured to first engage with the bicycle chain BC when the bicycle chain BC is shifted from the smaller sprocket 14 to the bicycle sprocket 12. The receiving tooth 50 is provided on an upstream side of the at least one shifting facilitation projection 42 and/or 44 in the rotational direction D11 in which the bicycle sprocket 12 rotates during pedaling. In this embodiment, the receiving tooth 50 is provided on the upstream side of the shifting facilitation projections 42 and 44 in the rotational direction D11. Specifically, the receiving tooth 50 is provided on the upstream side of the first adjacent tooth 46 in the rotational direction D11 to be adjacent to the first adjacent tooth 46 without another tooth between the receiving tooth 50 and the first adjacent tooth 46. However, the receiving tooth 50 can be provided on the upstream side of only one of the shifting facilitation projections 42 and 44 in the rotational direction D11.

Figure 22:
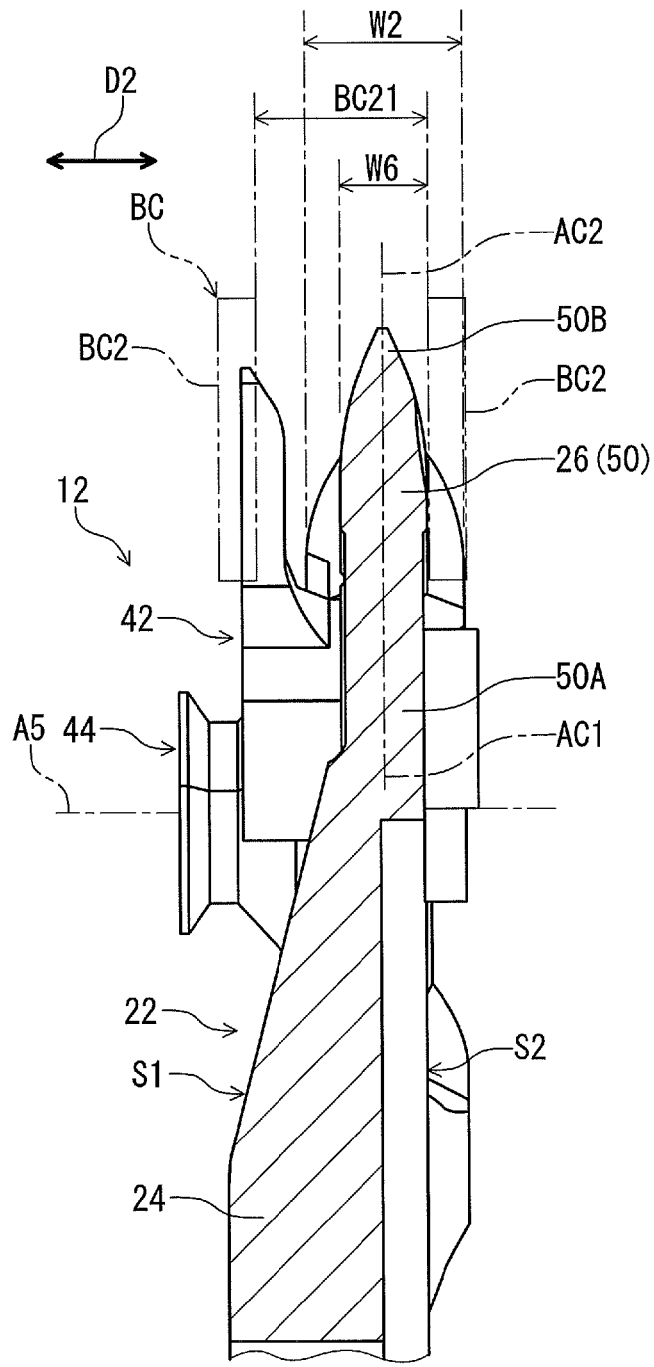
FIG. 22 is a partial cross-sectional view of the bicycle sprocket assembly taken along line XXII-XXII of FIG. 14 (the upshifting operation).

As seen in FIG. 22, the receiving tooth 50 includes a tooth root 50A and a tooth tip 50B. The tooth root 50A is coupled to the radially outer periphery of the sprocket body 24. The tooth root 50A has a first axial center AC1 defined in the axial direction D2 parallel to the rotational center axis A1. The tooth tip 50B is provided radially outward of the tooth root 50A with respect to the rotational center axis A1. The tooth tip 50B has a second axial center AC2 defined in the axial direction D2. The second axial center AC2 is provided at an axial position equal to an axial position of the first axial center AC1 in the axial direction D2. In other words, the tooth tip 50B (the second axial center AC2) is not substantially offset from the first axial center AC1 in the axial direction D2. The receiving tooth 50 has an axial width W6 smaller than the second chain engaging width W2. The receiving tooth 50 may have an axial width that is equal to or smaller than the first chain engaging width W1.

As seen in FIGS. 5 and 11, the plurality of sprocket teeth 26 includes a derailing tooth 51 adjacent to the second adjacent tooth 48 without another tooth between the derailing tooth 51 and the second adjacent tooth 48 in the circumferential direction D1. The derailing tooth 51 is provided on a downstream side of the second adjacent tooth 48 in the rotational direction D11. Specifically, the derailing tooth 51 is provided on the downstream side of the second adjacent tooth 48 in the rotational direction D11 to be adjacent to the second adjacent tooth 48 without another tooth between the derailing tooth 51 and the second adjacent tooth 48. The derailing tooth 51 is configured to first derail the bicycle chain BC from the bicycle sprocket 12 when the bicycle chain BC is shifted from the bicycle sprocket 12 toward the smaller sprocket 14. The derailing tooth 51 is provided on a downstream side of the at least one shifting facilitation projection 42 and/or 44 in the rotational direction D11. In this embodiment, the derailing tooth 51 is provided on the downstream side of the shifting facilitation projections 42 and 44 in the rotational direction D11. However, the derailing tooth 51 can be provided on the downstream side of only one of the shifting facilitation projections 42 and 44 in the rotational direction D11.

As seen in FIG. 11, the receiving tooth 50 has a radial length L4 smaller than a radial length L5 of the second adjacent tooth 48. However, the radial length L4 of the receiving tooth 50 can be equal to or larger than the radial length L5 of the second adjacent tooth 48. The radial length L4 of the receiving tooth 50 is smaller than a radial length L6 of the first adjacent tooth 46. However, the radial length L4 of the receiving tooth 50 can be equal to or larger than the radial length L6 of the first adjacent tooth 46. The radial length L6 of the first adjacent tooth 46 is smaller than the radial length L5 of the second adjacent tooth 48.

The sprocket element 22 includes a plurality of tooth bottoms 52 (see FIG. 11). Each of the plurality of tooth bottoms 52 is disposed between the first tooth 28 and the second tooth 30 in the circumferential direction D1. The plurality of tooth bottoms 52 define a root circle RC. The radial length L4 of the receiving tooth 50 is radially defined from the root circle RC to a radially outermost end of the receiving tooth 50. The radial length L5 of the second adjacent tooth 48 is radially defined from the root circle RC to a radially outermost end of the second adjacent tooth 48. The radial length L6 of the first adjacent tooth 46 is radially defined from the root circle RC to a radially outermost end of the first adjacent tooth 46.

As seen in FIG. 14, the sprocket element 22 includes side recesses 54 (FIG. 5) to reduce interference between the sprocket element 22 and the bicycle chain BC and to guide the bicycle chain BC toward the sprocket teeth 26 of the bicycle sprocket 12 when the bicycle chain BC is shifted from the smaller sprocket 14 to the bicycle sprocket 12. The side recesses 54 are provided on the sprocket body 24. The second shifting facilitation projection 44 is provided between the side recess 54 and the first shifting facilitation projection 42 in the circumferential direction D1.

An upshifting operation of the bicycle chain BC in the bicycle sprocket assembly 10 will be described below referring to FIGS. 14, 23 and 24.

Figure 23:
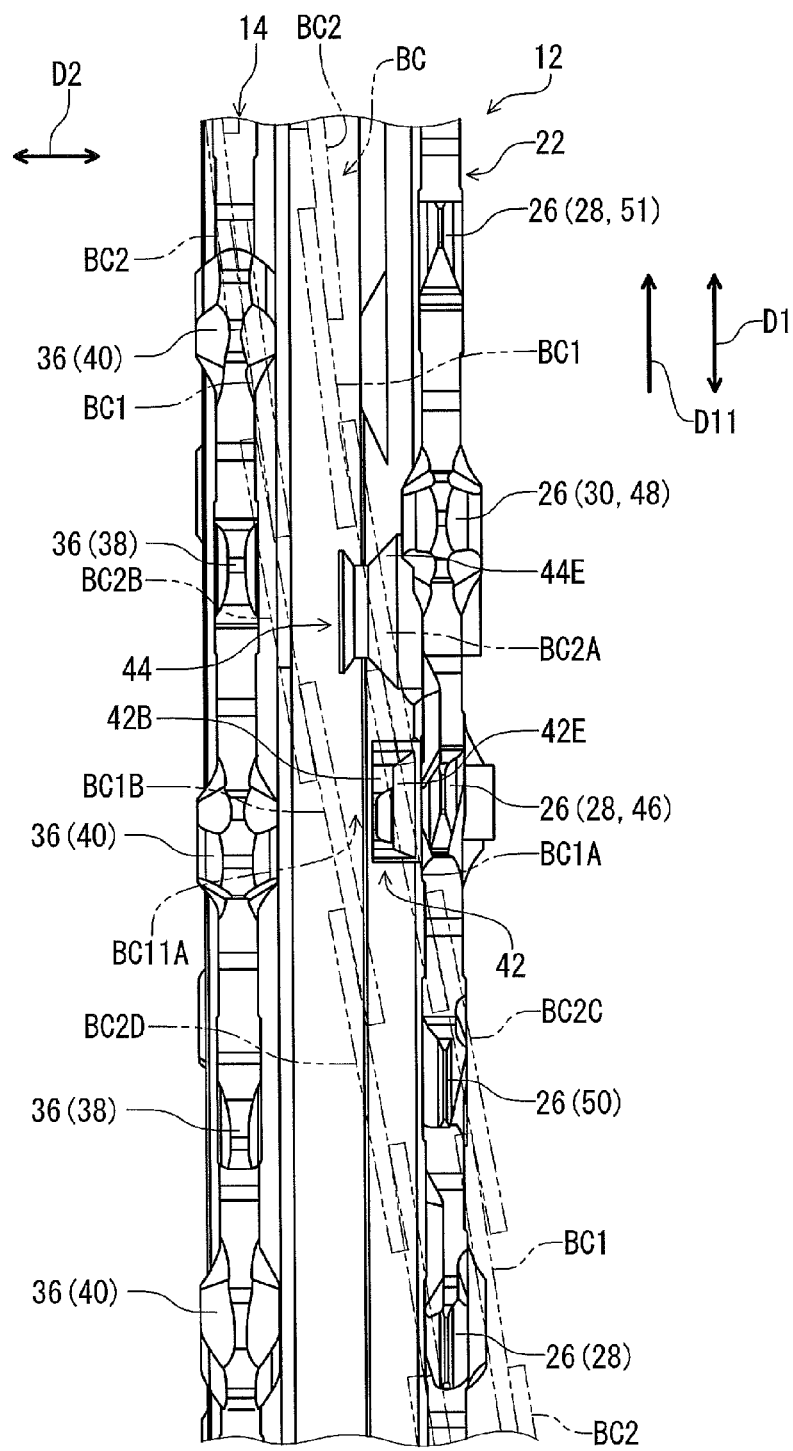
FIG. 23 is a plan view of the bicycle sprocket assembly illustrated in FIG. 1 with the bicycle chain (the upshifting operation).
Figure 24:
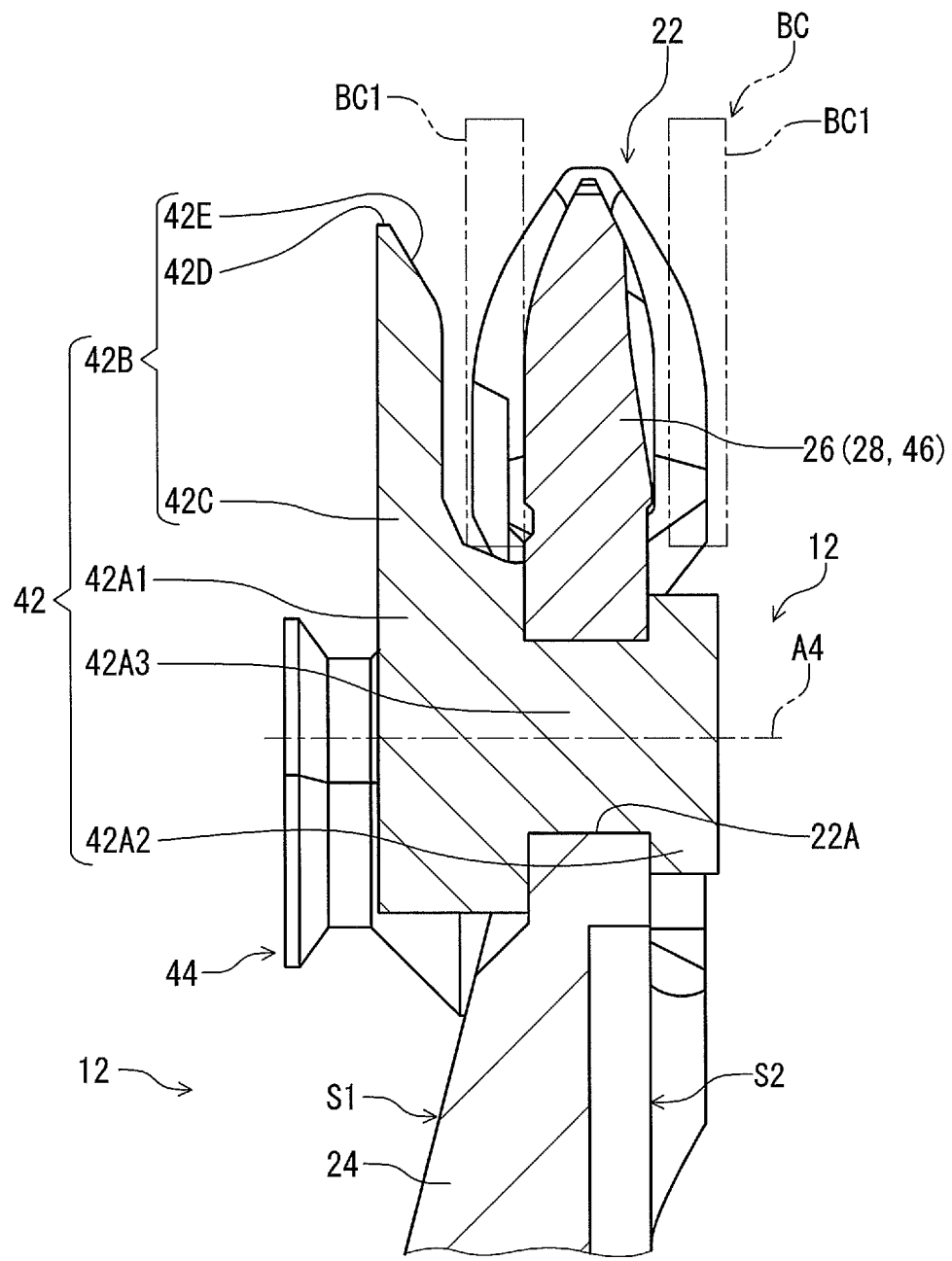
FIG. 24 is a partial enlarged cross-sectional view of the bicycle sprocket assembly (after the downshifting operation).

As seen in FIGS. 14 and 23, the bicycle chain BC is shifted from the smaller sprocket 14 toward the bicycle sprocket 12 by a front derailleur (not shown) in the upshifting operation. This brings the second shifting facilitation projection 44 into engagement with the outer link plate BC2A of the bicycle chain BC. The opposed pair of outer link plates BC2A and BC2B is upwardly moved by the second shifting facilitation projection 44 in response to the rotation of the bicycle sprocket assembly 10 in a state where the second shifting facilitation projection 44 is engaged with the outer link plate BC2A. At this time, the inner link plate BC1A is guided toward the first adjacent tooth 46 in the axial direction D2 by the first inclined surface 42E of the first shifting facilitation projection 42. Thus, the opposed pair of inner link plates BC1A and BC1B is moved toward the first adjacent tooth 46 in the axial direction D2 by the first shifting facilitation projection 42, causing the first shifting facilitation projection 42 to be inserted into the inner link space BC11A of the opposed pair of inner link plates BC1A and BC1B.

In this state, the outer link plate BC2A is guided by the second inclined surface 44E of the second shifting facilitation projection 44 to move away from the sprocket element 22 in the axial direction D2. Thus, the opposed pair of outer link plate BC2A and BC2B is further inclined relative to the sprocket element 22. This helps the inner link plate BC1A to be guided by the first shifting facilitation projection 42 toward the first adjacent tooth 46 in the axial direction D2. The opposed pair of outer link plates BC2C and BC2D are first received by the receiving tooth 50 when the bicycle sprocket assembly 10 further rotates about the rotational center axis A1 in the rotational direction D11. The opposed pair of outer link plates BC2C and BC2D are disposed on an upstream side of the second shifting facilitation projection 44 in the rotational direction D11 to be adjacent to the second shifting facilitation projection 44 without another outer link plate between the second shifting facilitation projection 44 and the opposed pair of outer link plates BC2C and BC2D.

The first shifting facilitation projection 42 is once disengaged from the inner link plate BC1A when the bicycle sprocket assembly 10 further rotates about the rotational center axis A1 in the rotational direction D11. After that, as seen in FIG. 24, the first adjacent tooth 46 is inserted into the inner link space BC11A of the opposed pair of inner link plates BC1A and BC1B in the chain-engagement area. This brings the opposed inner link plates BC1A and BC1B into engagement with the first adjacent tooth 46.

A downshifting operation of the bicycle chain BC in the bicycle sprocket assembly 10 will be described below referring to FIGS. 25 and 26.

Figure 25:
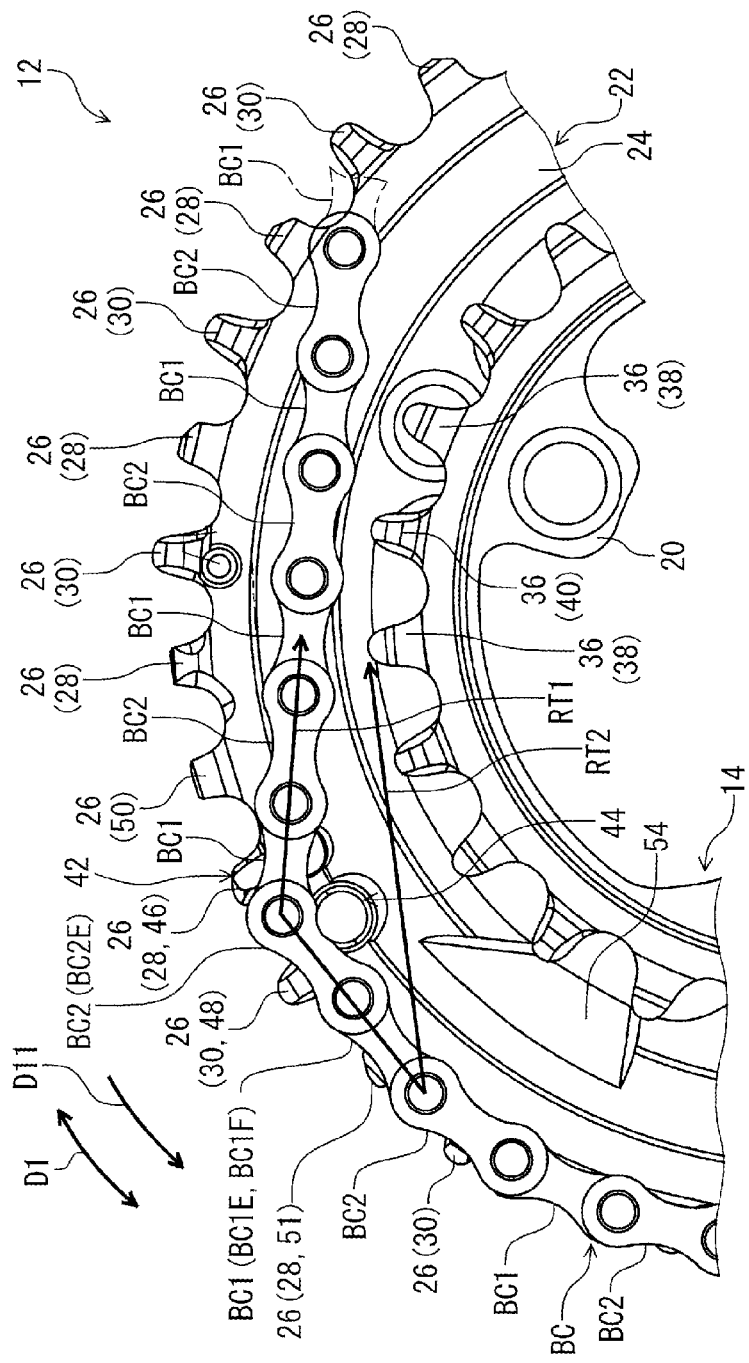
FIG. 25 is a side elevational view of the bicycle sprocket assembly illustrated in FIG. 1 with the bicycle chain (the downshifting operation).
Figure 26:
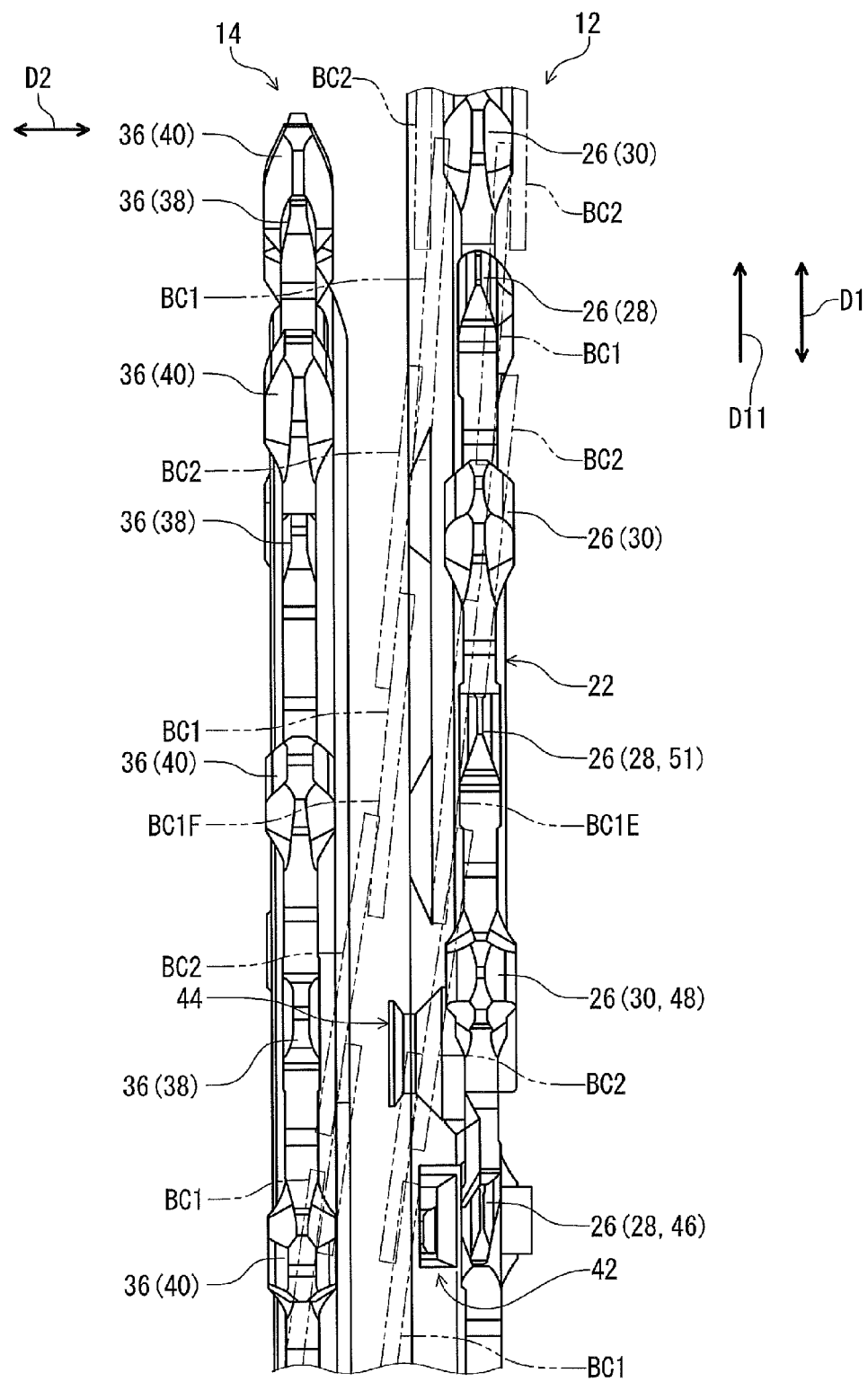
FIG. 26 is a plan view of the bicycle sprocket assembly illustrated in FIG. 1 with the bicycle chain (the downshifting operation).
Figure 27:
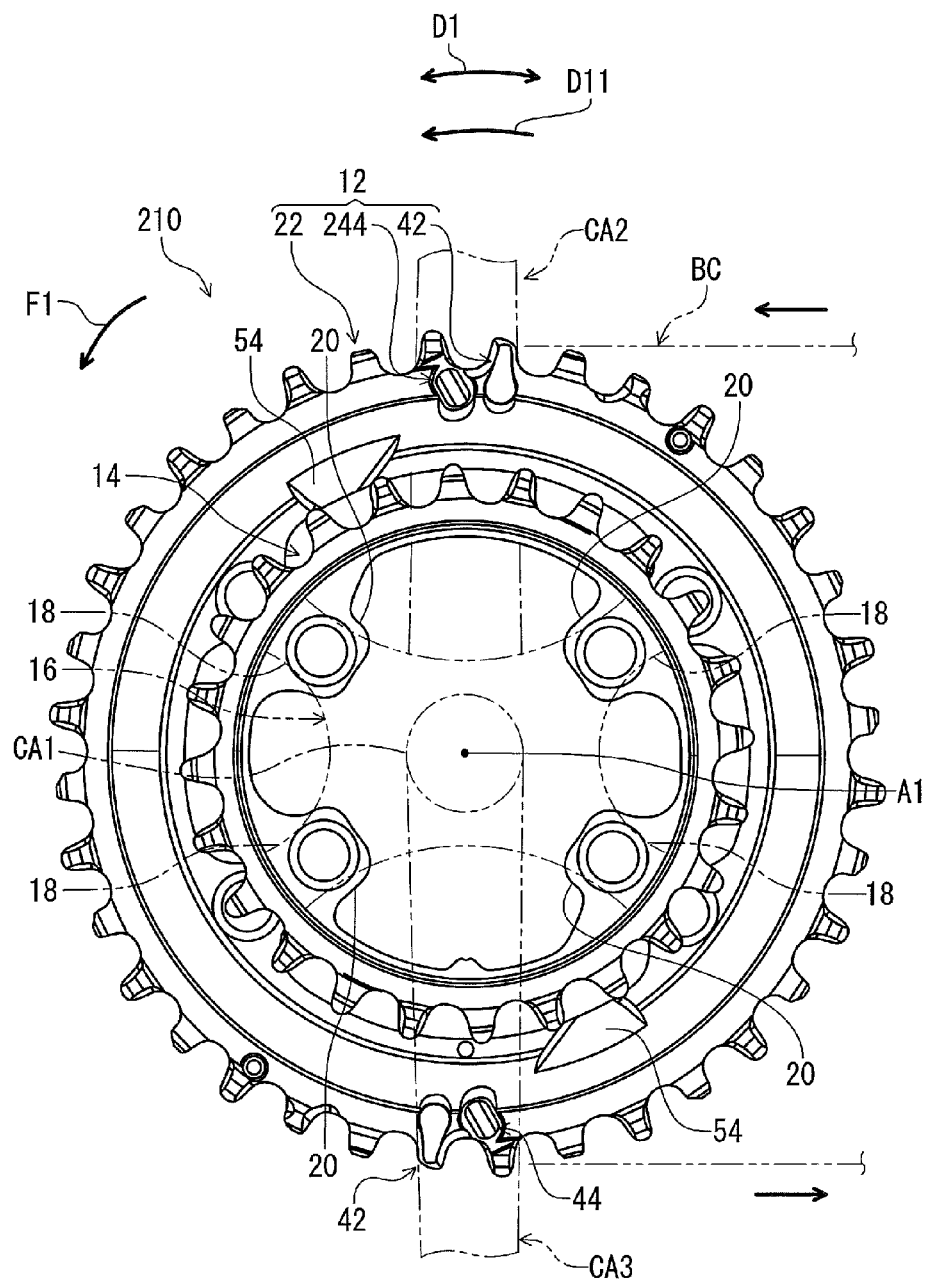
FIG. 27 is a side elevational view of a bicycle sprocket assembly including a bicycle sprocket in accordance with a second embodiment.
Figure 28:
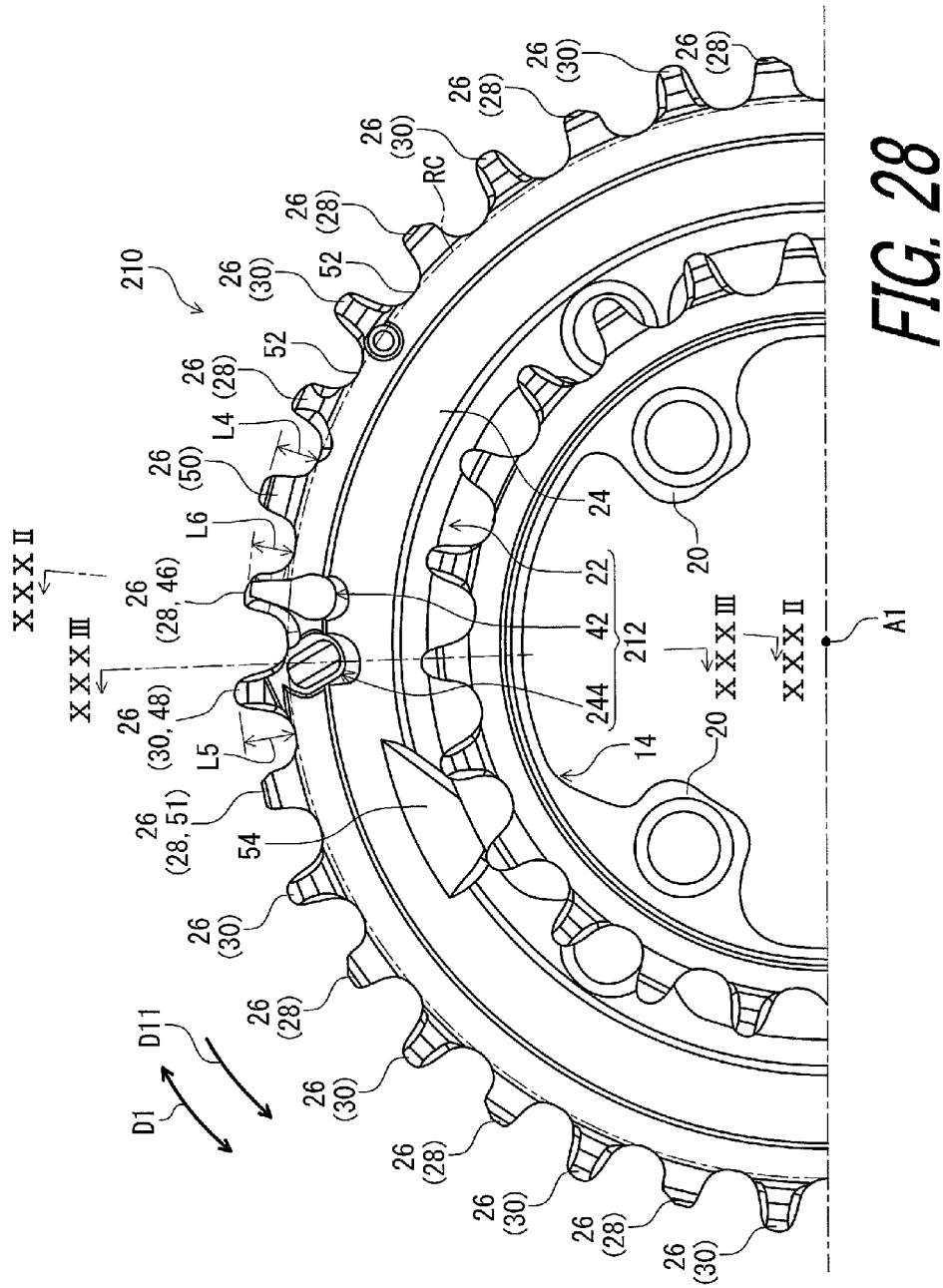
FIG. 28 is a partial side elevational view of the bicycle sprocket assembly illustrated in FIG. 27.
Figure 29:
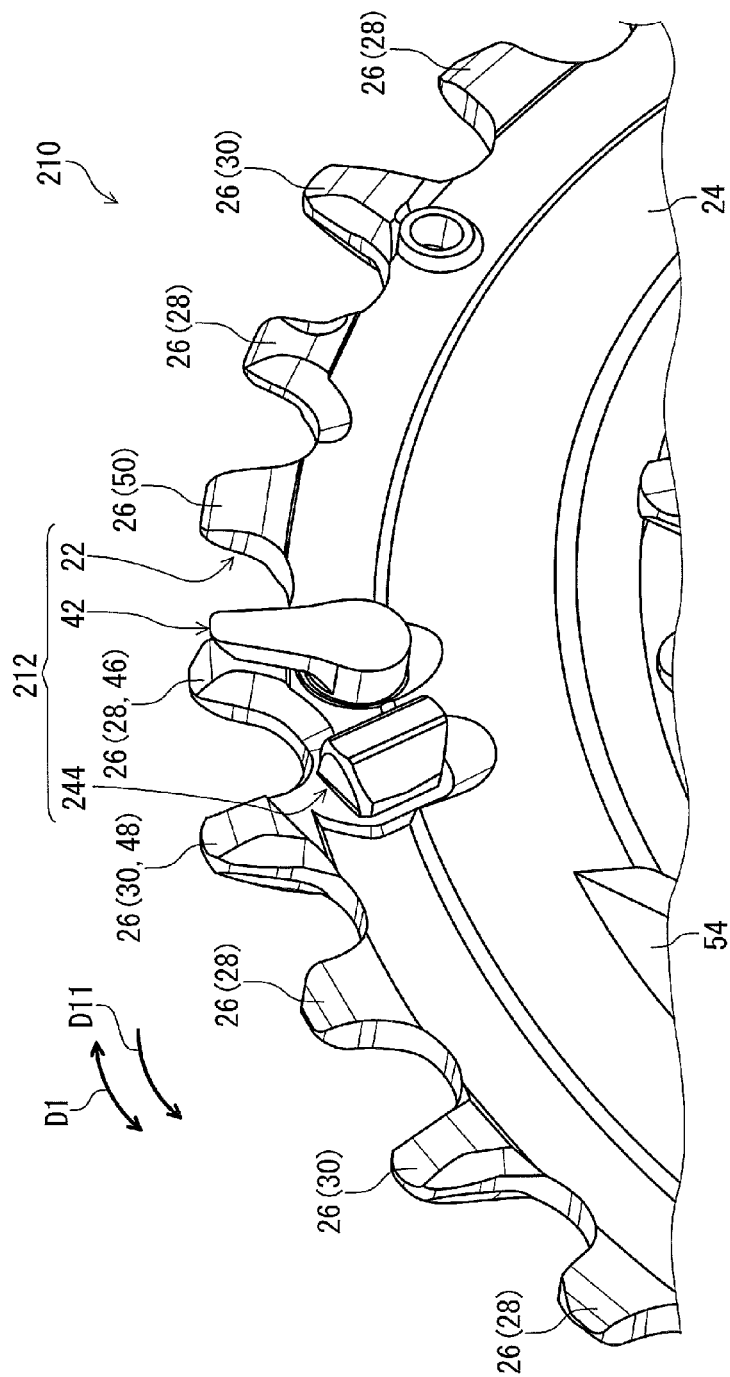
FIG. 29 is a partial perspective view of the bicycle sprocket assembly illustrated in FIG. 27.
Figure 30:
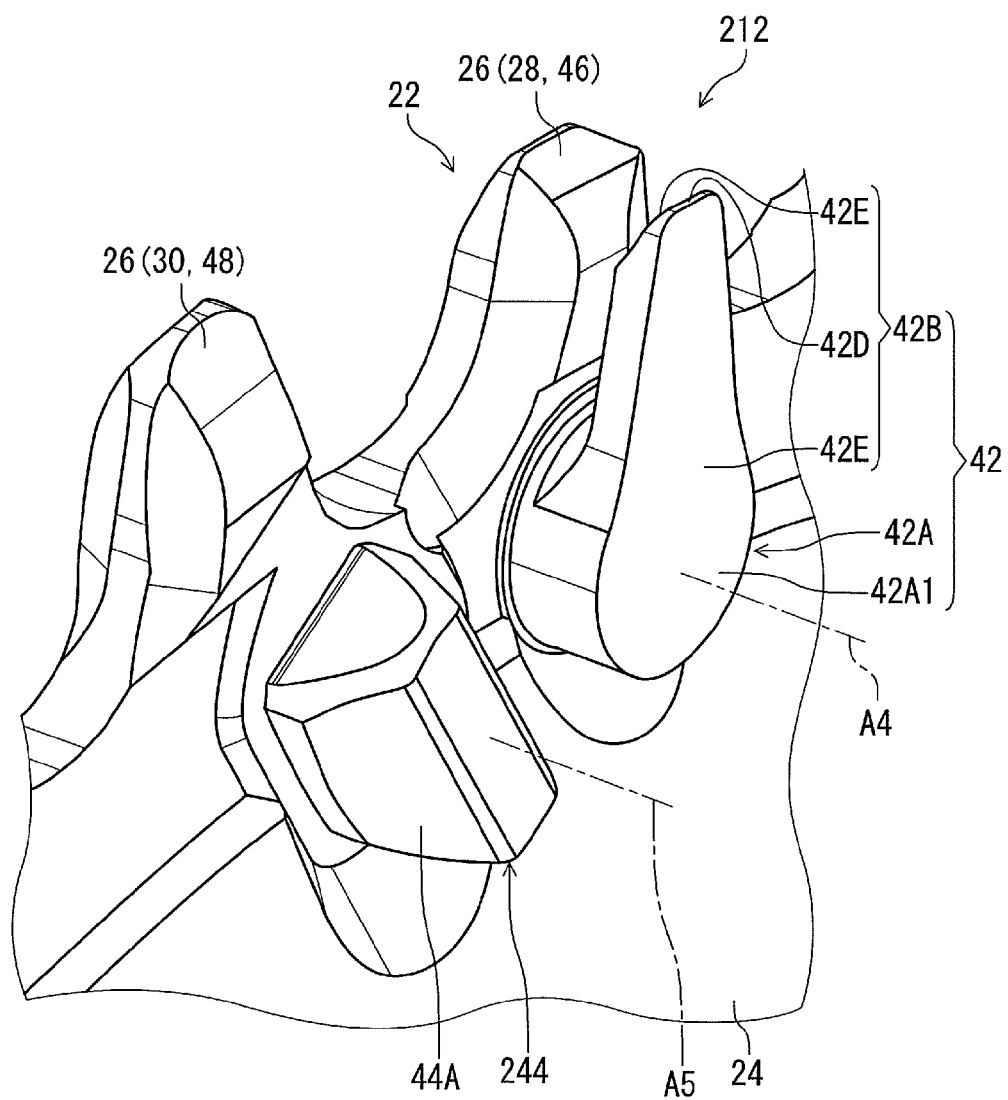
FIG. 30 is a partial enlarged perspective view of the bicycle sprocket assembly illustrated in FIG. 27.
Figure 31:
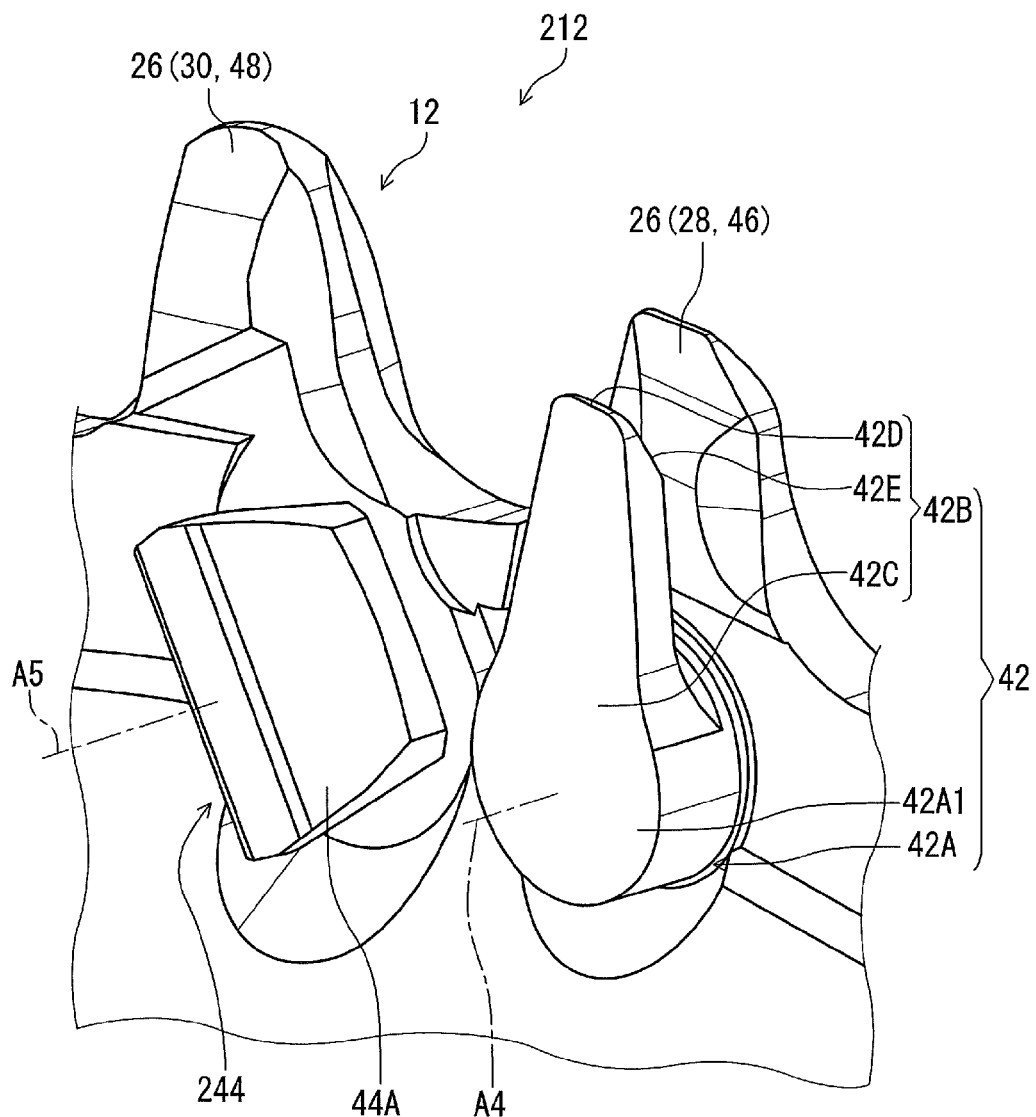
FIG. 31 is another partial enlarged perspective view of the bicycle sprocket assembly illustrated in FIG. 27.
Figure 32:
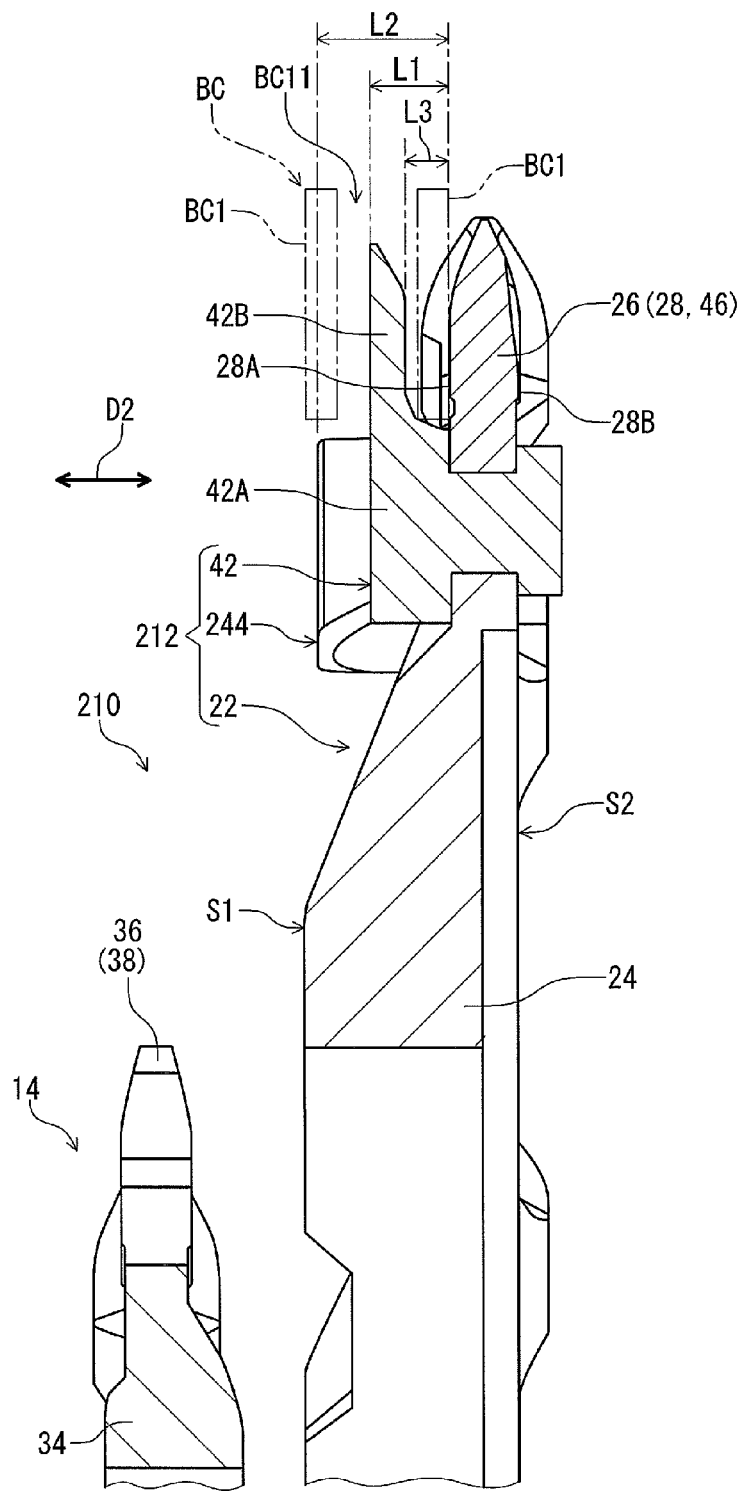
FIG. 32 is a partial cross-sectional view of the bicycle sprocket assembly taken along line XXXII-XXXII of FIG. 28 (the upshifting operation).
Figure 33:
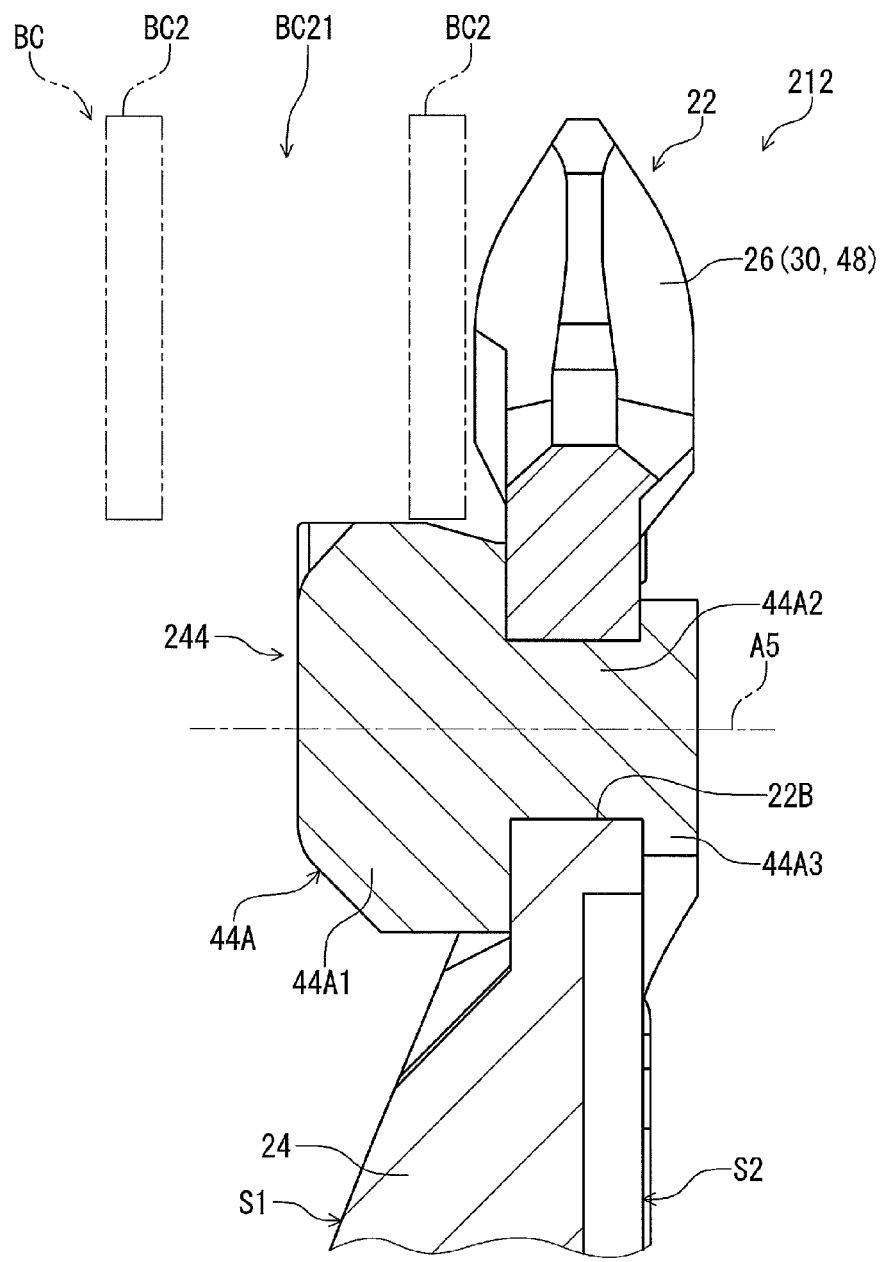
FIG. 33 is a partial cross-sectional view of the bicycle sprocket assembly taken along line XXXIII-XXXIII of FIG. 28 (the upshifting operation).

As seen in FIGS. 25 and 26, the bicycle chain BC is shifted from the bicycle sprocket 12 toward the smaller sprocket 14 by the front derailleur (not shown) in the downshifting operation. The pair of inner link plate BC1E and BC1F are derailed from the bicycle sprocket 12 at the derailing tooth 51 in the downshifting operation. As seen in FIG. 25, at this time, the outer link plate BC2E is engaged with the second shifting facilitation projection 44 in a state where the pair of inner link plate BC1E and BC1F are derailed from the derailing tooth 51. This adjusts (lengthens in this embodiment) a chain-downshifting distance RT1 (FIG. 25) of the bicycle chain BC defined from the bicycle sprocket 12 to the smaller sprocket 14 so that the bicycle chain BC engages with a tooth of the smaller sprocket 14 without undesirably riding on a crest of the tooth of the smaller sprocket 14 in comparison with a chain-downshifting distance RT2 (FIG. 25) in a case where the bicycle sprocket 12 does not include the second shifting facilitation projection 44. Accordingly, it is possible to smoothen the downshifting operation from the bicycle sprocket 12 to the smaller sprocket 14.

The bicycle sprocket 12 has the following features.

(1) The first shifting facilitation projection 42 is coupled to the sprocket element 22 to engage with the inner link plate BC1 of the bicycle chain BC when the bicycle chain BC is shifted from the smaller sprocket 14 to the bicycle sprocket 12. The second shifting facilitation projection 44 is coupled to the sprocket element 22 to engage with the outer link plate BC2 of the bicycle chain BC when the bicycle chain BC is shifted from the smaller sprocket 14 to the bicycle sprocket 12. The first shifting facilitation projection 42 and the second shifting facilitation projection 44 facilitate a first shifting operation (e.g., the upshifting operation) in which the bicycle chain BC is shifted from the smaller sprocket 14 to the bicycle sprocket 12. This improves shifting performance of the bicycle sprocket 12.

(2) The second shifting facilitation projection 44 is provided on the downstream side of the first shifting facilitation projection 42 in the rotational direction D11 without another shifting facilitation projection between the first shifting facilitation projection 42 and the second shifting facilitation projection 44 in the rotational direction D11. Accordingly, it is possible to effectively facilitate the first shifting operation by using the second shifting facilitation projection 44 in addition to the first shifting facilitation projection 42.

(3) The first shifting facilitation projection 42 is spaced apart from the second shifting facilitation projection 44 at the first pitch P1 in the circumferential direction D1. The first pitch P1 is substantially equal to a chain pitch of the bicycle chain BC. Accordingly, it is possible to more effectively facilitate the first shifting operation by using the second shifting facilitation projection 44 in addition to the first shifting facilitation projection 42.

(4) The first adjacent tooth 46 is closest to the first shifting facilitation projection 42 among the plurality of sprocket teeth 26. The second adjacent tooth 48 is closest to the second shifting facilitation projection 44 among the plurality of sprocket teeth 26. Accordingly, it is possible to narrow an area in which the first shifting facilitation projection 42 and the second shifting facilitation projection 44 are provided in the rotational direction D11.

(5) The tooth root 50A of the receiving tooth 50 has the first axial center AC1 defined in the axial direction D2. The tooth tip 50B of the receiving tooth 50 has the second axial center AC2 defined in the axial direction D2. The second axial center AC2 is provided at an axial position equal to an axial position of the first axial center AC1 in the axial direction D2. Accordingly, the bicycle chain BC is less likely to get on the tooth tip 50B of the receiving tooth 50 when the bicycle chain BC is shifted between the bicycle sprocket 12 and the smaller sprocket 14. Thus, it is possible to stably hold the bicycle chain BC when a pedaling force is transmitted from the bicycle sprocket 12 to the bicycle chain BC during pedaling without shifting the bicycle chain BC.

(6) The first axial length L1 of the first shifting facilitation projection 42 is smaller than the second axial length L2 of the second shifting facilitation projection 44. Accordingly, it is possible to reduce interference between the first shifting facilitation projection 42 and the bicycle chain BC during a second shifting operation (e.g., the downshifting operation) in which the bicycle chain BC is shifted from the bicycle sprocket 12 to the smaller sprocket 14.

(7) The first shifting facilitation projection 42 includes the first coupling body 42A and the protruding part 42B. The first coupling body 42A is coupled to the sprocket element 22. The protruding part 42B extends radially outward from the first coupling body 42A with respect to the rotational center axis A1. Thus, the protruding part 42B can easily catch the bicycle chain BC when the bicycle chain BC is shifted from the smaller sprocket 14 to the bicycle sprocket 12. This facilitates the first shifting operation of the bicycle chain BC.

(8) The protruding part 42B is spaced apart from the sprocket element 22 in the axial direction D2 parallel to the rotational center axis A1. Accordingly, the protruding part 42B can hold inner link plate of the bicycle chain BC between the protruding part 42B and the sprocket element 22 when the bicycle chain BC is shifted from the smaller sprocket 14 to the bicycle sprocket 12. This effectively facilitate the first shifting operation of the bicycle chain BC.

(9) The maximum axial distance L3 defined between the protruding part 42B and the first adjacent tooth 46 in the axial direction D2 is larger than the axial width W5 of the inner link plate BC1. Accordingly, it is possible to reduce interference between the protruding part 42B and the bicycle chain BC during pedaling without shifting the bicycle chain BC. This can reduce noise caused by the interference between the protruding part 42B and the bicycle chain BC.

(10) The first shifting facilitation projection 42 is disposed to keep the clearance at least one of between the protruding part 42B and the inner link plate BC1 in the axial direction D2 and between the first adjacent tooth 46 and the inner link plate BC1 in the axial direction D2 during pedaling. Accordingly, it is possible to reduce a resistance force produced the at least one of between the protruding part 42B and the inner link plate BC1 and between the first adjacent tooth 46 and the inner link plate BC1. This can reduce noise caused by the interference between the protruding part 42B and the bicycle chain BC.

(11) Since the maximum axial distance L3 is in a range of 0.5 mm to 4.0 mm, it is possible to certainly reduce the resistance force. This can effectively reduce noise caused by the interference between the protruding part 42B and the bicycle chain BC.

(12) Since the maximum axial distance L3 is equal to or larger than 1.0 mm, it is possible to more certainly reduce the resistance force. This can more effectively reduce noise caused by the interference between the protruding part 42B and the bicycle chain BC.

(13) Since the maximum axial distance L3 is equal to or smaller than 3.8 mm, it is possible to more certainly reduce the resistance force. This can more effectively reduce noise caused by the interference between the protruding part 42B and the bicycle chain BC.

(14) Since the maximum axial distance L3 is in a range of 1.0 mm to 2.0 mm, it is possible to more certainly reduce the resistance force. This can more effectively reduce noise caused by the interference between the protruding part 42B and the bicycle chain BC. Furthermore, the smaller maximum axial distance L3 can approach the inner link plate BC1 toward the sprocket element 22. Thus, it is possible to certainly perform shifting of the bicycle chain BC.

(15) The first inclined surface 42E of the protruding part 42B can guide the bicycle chain BC toward the sprocket element 22 in the axial direction D2 when the bicycle chain BC is shifted from the smaller sprocket 14 to the bicycle sprocket 12. This can easily bring the bicycle chain BC into engagement with first shifting facilitation projection 42 and can approach the bicycle chain BC toward the sprocket element 22.

(16) The second inclined surface 44E of the second shifting facilitation projection 44 can guide the bicycle chain BC away from the sprocket element 22 in the axial direction D2 when the bicycle chain BC is shifted from the smaller sprocket 14 to the bicycle sprocket 12. This can incline the bicycle chain BC to easily come into engagement with the plurality of sprocket teeth 26, effectively facilitating the first shifting operation of the bicycle chain BC.

(17) The protruding part 42B is disposed to at least partly overlap with one of the plurality of sprocket teeth 26 when viewed from the axial direction D2 parallel to the rotational center axis A1. This can increase a radial height of the first shifting facilitation projection 42. Accordingly, it is possible to effectively approach the bicycle chain BC toward the sprocket element 22.

(18) The second chain engaging width W2 is larger than the inner link space BC11 and is smaller than an outer link space BC21 defined between an opposed pair of outer link plates BC2 of the bicycle chain BC. Accordingly, it is possible to easily keep holding the bicycle chain BC with the at least one first tooth 28 and the at least one second tooth 30.

(19) Since the at least one first tooth 28 includes the first adjacent tooth 46, it is possible to bring the inner link plate of the bicycle chain BC into engagement with the first adjacent tooth 46 during the first shifting operation of the bicycle chain BC. This causes the inner link plate of the bicycle chain BC to be engaged with the first shifting facilitation projection 42 during the first shifting operation.

(20) Since the at least one second tooth 30 includes the second adjacent tooth 48, it is possible to bring the outer link plate of the bicycle chain BC into engagement with the second adjacent tooth 48 during the first shifting operation of the bicycle chain BC. This causes the outer link plate of the bicycle chain BC to be engaged with the second shifting facilitation projection 44 during the first shifting operation.

(21) The receiving tooth 50 has the axial width W5 smaller than the second chain engaging width W2. Accordingly, it is possible to smoothly receive the bicycle chain BC at the receiving tooth 50. This facilitates the first shifting operation of the bicycle chain BC.

(22) The receiving tooth 50 has the radial length L4 smaller than the radial length L5 of the second adjacent tooth 48. Accordingly, it is possible to smoothly receive the bicycle chain BC at the receiving tooth 50. This facilitates the first shifting operation of the bicycle chain BC.

(23) The second shifting facilitation projection 44 is coupled to the sprocket element 22 to engage with the bicycle chain BC when the bicycle chain BC is shifted from the bicycle sprocket 12 to the smaller sprocket 14. Accordingly, it is possible to facilitate the second shifting operation (e.g., the downshifting operation) in which the bicycle chain BC is shifted from the bicycle sprocket 12 to the smaller sprocket 14.

(24) The first shifting facilitation projection 42 is disposed not to be inserted between an opposed pair of link plates of the bicycle chain BC when the bicycle chain BC is shifted from the bicycle sprocket 12 to the smaller sprocket 14. Accordingly, it is possible to smoothly shift the bicycle chain BC from the bicycle sprocket 12 to the smaller sprocket 14 regardless of the first shifting facilitation projection 42.

Second Embodiment

A bicycle sprocket assembly 210 including a bicycle sprocket 212 in accordance with a second embodiment will be described below referring to FIGS. 27 to 33. The bicycle sprocket 212 has the same structure and/or configuration as those of the bicycle sprocket 12 except for the second shifting facilitation projection 44. Thus, elements having substantially the same function as those in the first embodiment will be numbered the same here, and will not be described and/or illustrated again in detail here for the sake of brevity.

As seen in FIGS. 27 to 33, the bicycle sprocket 212 comprises the sprocket element 22, the first shifting facilitation projection 42, and a second shifting facilitation projection 244. In this embodiment, the bicycle sprocket 212 comprises the plurality of first shifting facilitation projections 42 and a plurality of second shifting facilitation projections 244. The second shifting facilitation projection 244 has substantially the same structure as that of the second shifting facilitation projection 44 of the first embodiment. The second shifting facilitation projection 244 has a shape different from the shape of the second shifting facilitation projection 44. The intermediate part 44B and the additional protruding part 44C are omitted from the second shifting facilitation projection 244.

With the bicycle sprocket 212, it is possible to obtain substantially the same effects as those of the bicycle sprocket 12 of the first embodiment.

Third Embodiment

A bicycle sprocket assembly 310 including a bicycle sprocket 312 in accordance with a third embodiment will be described below referring to FIGS. 34 and 35. The bicycle sprocket 312 has the same structure and/or configuration as those of the bicycle sprocket 12 except for the receiving tooth 50. Thus, elements having substantially the same function as those in the above embodiments will be numbered the same here, and will not be described and/or illustrated again in detail here for the sake of brevity.

Figure 34:
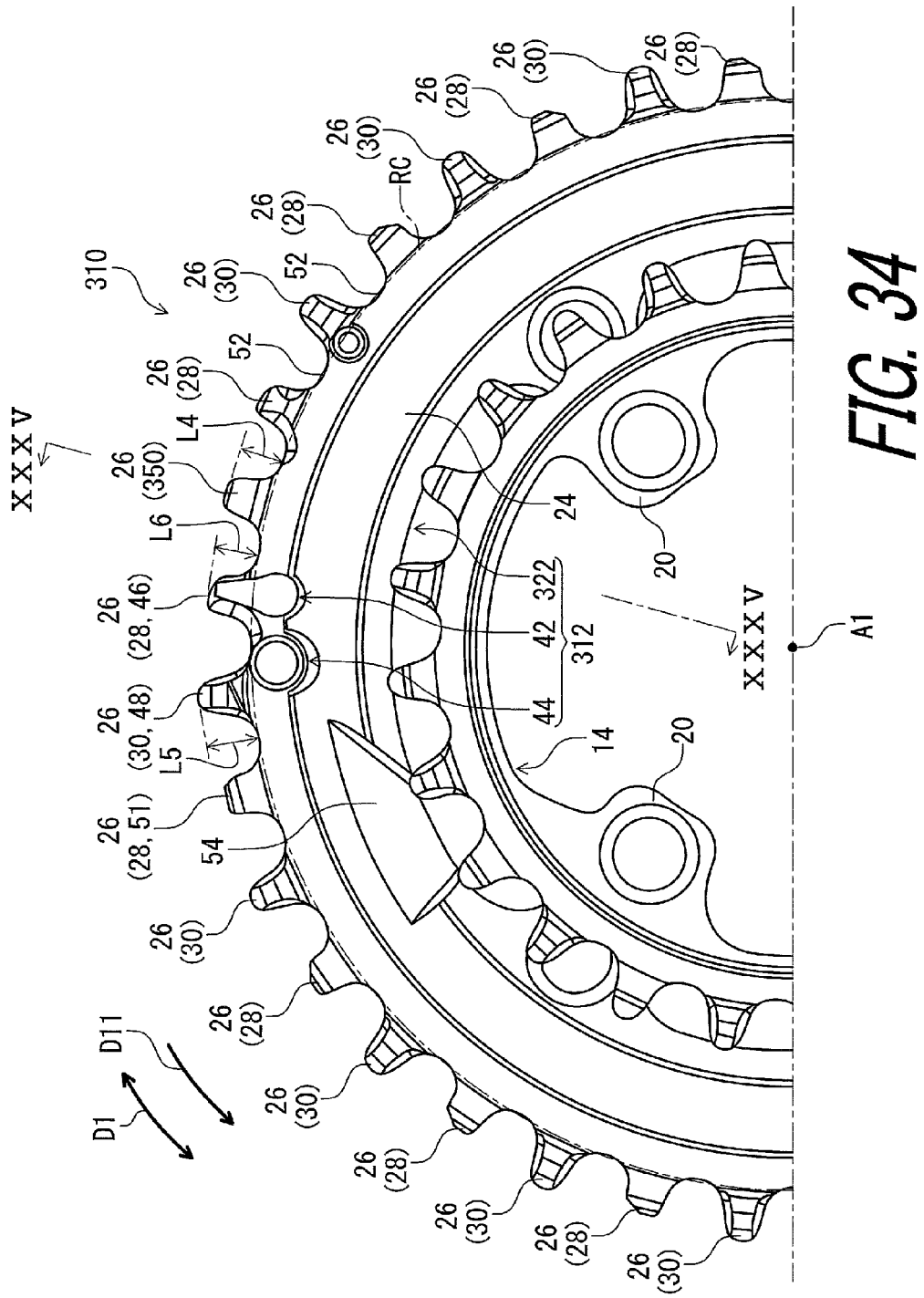
FIG. 34 is a side elevational view of a bicycle sprocket assembly including a bicycle sprocket in accordance with a third embodiment.

As seen in FIG. 34, the bicycle sprocket 312 comprises a sprocket element 322, the first shifting facilitation projection 42, and the second shifting facilitation projection 44. The sprocket element 322 has substantially the same structure as that of the sprocket element 22 of the first embodiment. In the sprocket element 322, the plurality of sprocket teeth 26 includes a receiving tooth 350 adjacent to the first adjacent tooth 46 without another tooth between the receiving tooth 350 and the first adjacent tooth 46 in the circumferential direction D1. The receiving tooth 350 is provided on an upstream side of the first adjacent tooth 46 in the rotational direction D11. The receiving tooth 350 has substantially the same structure as that of the receiving tooth 50 of the first embodiment.

Figure 35:
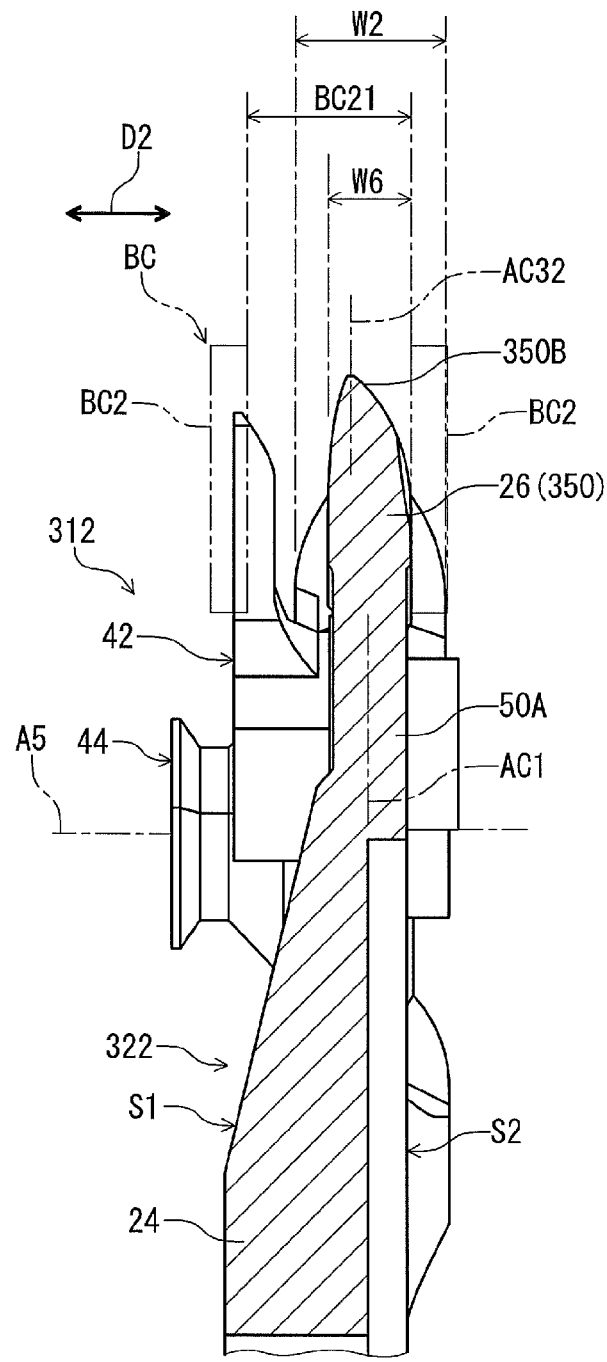
FIG. 35 is a partial cross-sectional view of the bicycle sprocket assembly taken along line XXXV-XXXV of FIG. 34 (the upshifting operation).

As seen in FIG. 35, the receiving tooth 350 includes the tooth root 50A and a tooth tip 350B. The tooth tip 350B is provided radially outward of the tooth root 50A with respect to the rotational center axis A1. The tooth tip 350B has a second axial center AC32 defined in the axial direction D2. The second axial center AC32 is offset from the first axial center AC1 in the axial direction D2. In this embodiment, the tooth tip 350B is a radially outermost surface of the receiving tooth 350.

The second axial center AC32 is closer to the at least one shifting facilitation projection 42 and/or 44 than the first axial center AC1 in the axial direction D2. In this embodiment, the second axial center AC32 is closer to the first shifting facilitation projection 42 than the first axial center AC1 in the axial direction D2. Specifically, the second axial center AC32 is closer to the protruding part 42B of the first shifting facilitation projection 42 than the first axial center AC1 in the axial direction D2. If the second axial center AC32 is disposed closer to one of the shifting facilitation projections 42 and 44 than the first axial center AC1, it is possible to omit the one of the shifting facilitation projections 42 and 44 from the bicycle sprocket 312 for the upshifting operation. Preferably, in such a configuration, the first shifting facilitation projection 42 can be omitted. However, it is preferable that the bicycle sprocket 312 includes both of the first and second shifting facilitation projections 42 and 44 for better upshifting operation.

With the bicycle sprocket 312, it is possible to obtain substantially the same effects as those of the bicycle sprocket 12 of the first embodiment.

Furthermore, the second axial center AC32 is offset from the first axial center AC1 in the axial direction D2. Accordingly, it is possible to certainly receive the bicycle chain BC with the receiving tooth 350, improving the first shifting operation (e.g., the upshifting operation).

The second axial center AC32 is closer to the at least one shifting facilitation projection 42 and/or 44 than the first axial center AC1 in the axial direction D2. Accordingly, it is possible to more certainly receive the bicycle chain BC with the receiving tooth 350, improving the first shifting operation.

In this embodiment, the second axial center AC32 is closer to the at least one shifting facilitation projection 42 and/or 44 than the first axial center AC1 in the axial direction D2. However the second axial center AC32 can be farther from the at least one shifting facilitation projection 42 and/or 44 than the first axial center AC1 in the axial direction D2, if needed and/or desired.

Fourth Embodiment

A bicycle sprocket assembly 410 including a bicycle sprocket 412 in accordance with a fourth embodiment will be described below referring to FIGS. 36 to 38. The bicycle sprocket 412 has the same structure and/or configuration as those of the bicycle sprocket 12 except for a third shifting facilitation projection. Thus, elements having substantially the same function as those in the above embodiments will be numbered the same here, and will not be described and/or illustrated again in detail here for the sake of brevity.

Figure 36:
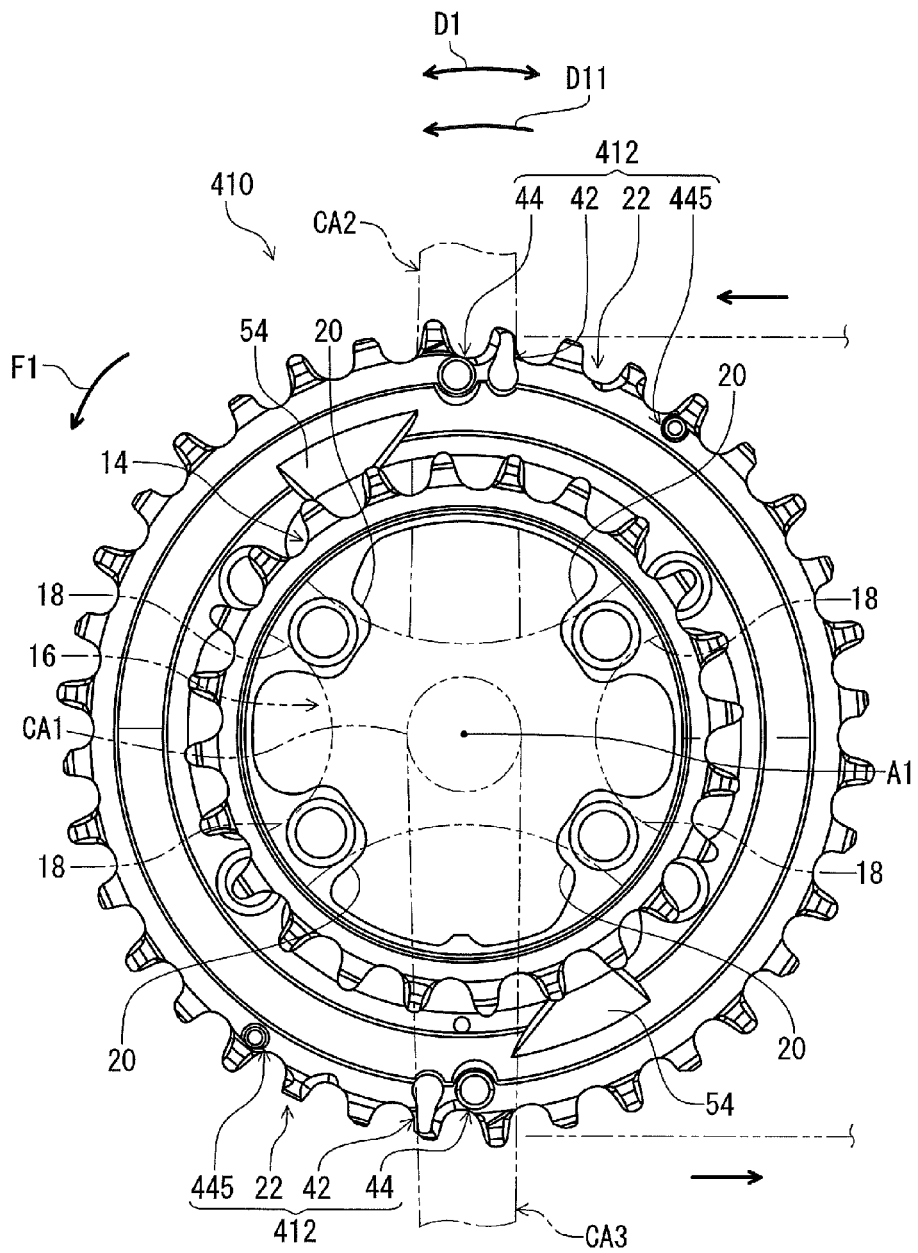
FIG. 36 is a side elevational view of a bicycle sprocket assembly including a bicycle sprocket in accordance with a fourth embodiment.
Figure 37:
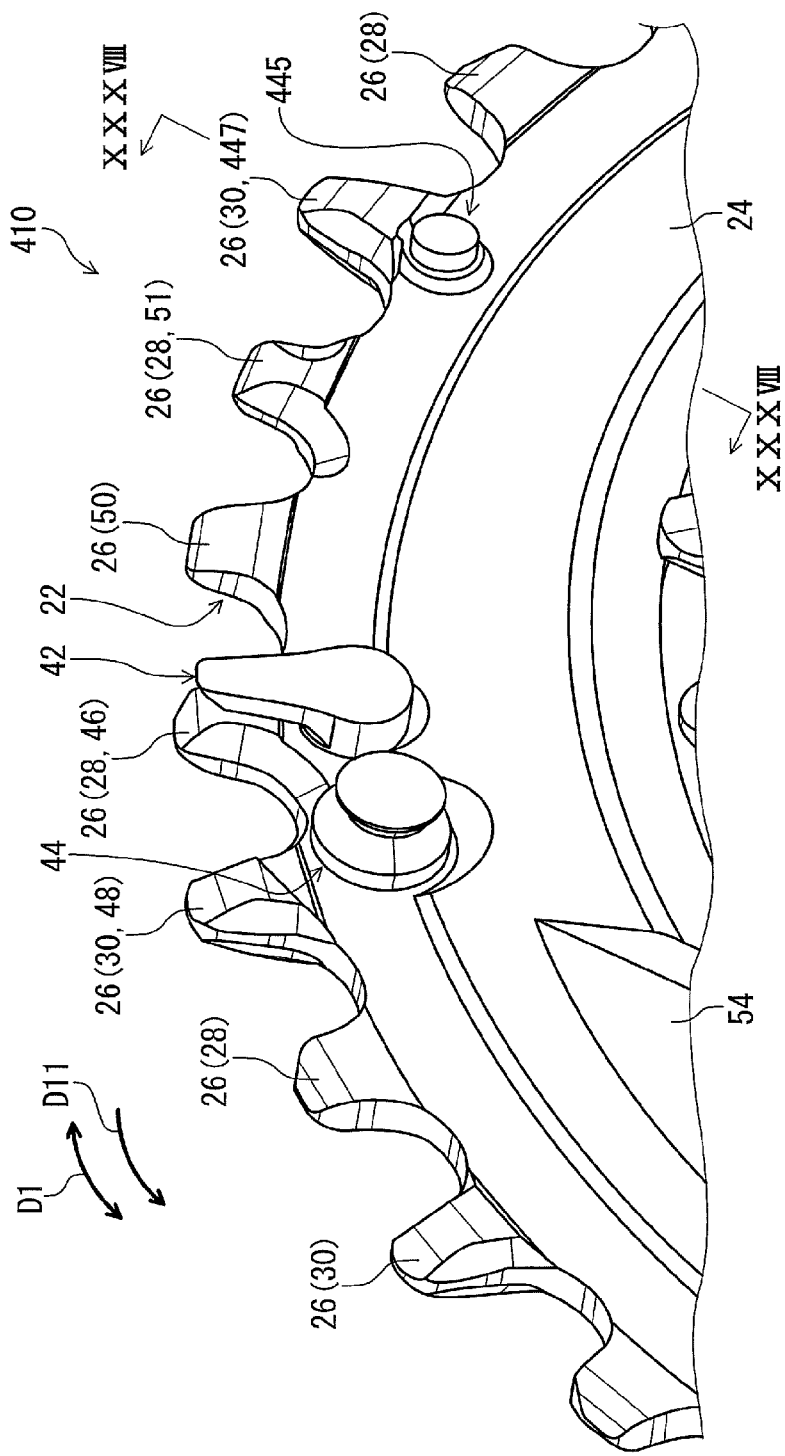
FIG. 37 is a partial perspective view of the bicycle sprocket assembly illustrated in FIG. 36.
Figure 38:
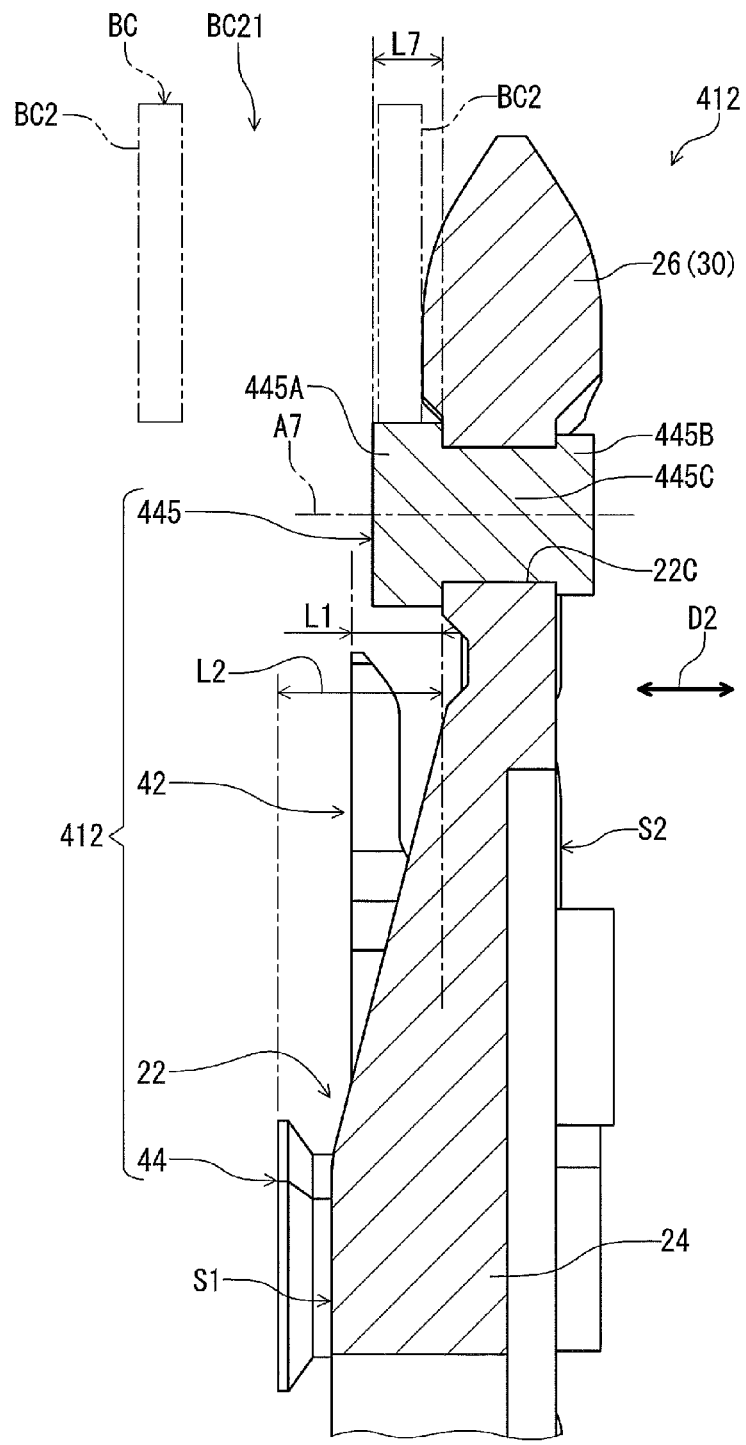
FIG. 38 is a partial cross-sectional view of the bicycle sprocket assembly taken along line XXXVIII-XXXVIII of FIG. 37 (the downshifting operation).

As seen in FIGS. 36 to 38, the bicycle sprocket 412 comprises the sprocket element 22, the first shifting facilitation projection 42, the second shifting facilitation projection 44, and a third shifting facilitation projection 445. Unlike the first embodiment, the second shifting facilitation projection 44 does not engage with the bicycle chain BC when the bicycle chain BC is shifted from the bicycle sprocket 12 toward the smaller sprocket 14. In this embodiment, the third shifting facilitation projection 445 is coupled to the sprocket element 22 to engage with the bicycle chain BC when the bicycle chain BC is shifted from the bicycle sprocket 12 toward the smaller sprocket 14.

As seen in FIG. 37, the plurality of sprocket teeth 26 includes a third adjacent tooth 447. The at least one second tooth 30 includes the third adjacent tooth 447 closest to the third shifting facilitation projection 445 among the plurality of sprocket teeth 26. In the illustrated embodiment, the derailing tooth 51 is disposed between the first adjacent tooth 46 and the third adjacent tooth 447 in the circumferential direction D1. The derailing tooth 51 is disposed between the receiving tooth 50 and the third adjacent tooth 447 in the circumferential direction D1. The third shifting facilitation projection 445 is provided on an upstream side of the first shifting facilitation projection 42 in the rotational direction D11. The third adjacent tooth 447 is provided on an upstream side of the derailing tooth 51 in the rotational direction D11 to be adjacent to the derailing tooth 51 without another tooth between the third adjacent tooth 447 and the derailing tooth 51. The derailing tooth 51 is provided between the first adjacent tooth 46 and the third shifting facilitation projection 445 in the circumferential direction D1 (in the rotational direction D11).

As seen in FIG. 38, the third shifting facilitation projection 445 has a third axial length L7 defined from the sprocket element 22 in the axial direction D2 parallel to the rotational center axis A1. The third axial length L7 is smaller than the first axial length L1 and the second axial length L2. In this embodiment, the third axial length L7 is defined from the first axial end 28A (FIG. 19) of the first tooth 28 (the first adjacent tooth 46) in the axial direction D2.

The third shifting facilitation projection 445 has a third center axis A7 extends in the axial direction D2. While the third center axis A7 of the third shifting facilitation projection 445 is parallel to the axial direction D2 in this embodiment, the third center axis A7 can be non-parallel to the axial direction D2. The third shifting facilitation projection 445 includes a third base body 445A, a third head part 445B, and a third connecting part 445C. The third base body 445A is disposed on the first axial surface S1. The third base body 445A is contactable with the outer link plate BC2 of the bicycle chain BC. The third head part 445B is disposed on the second axial surface S2. The third connecting part 445C connects the third head part 445B to the third base body 445A and extends through a third attachment hole 22C of the sprocket element 22. The third base body 445A has an outer diameter larger than an outer diameter of the third connecting part 445C. The third head part 445B has an outer diameter larger than the outer diameter of the third connecting part 445C. The third base body 445A, the third head part 445B, and the third connecting part 445C constitute a rivet.

However, the third shifting facilitation projection 445 can be coupled to the sprocket element 22 with other coupling structures.

With the bicycle sprocket 412, it is possible to obtain substantially the same effects as those of the bicycle sprocket 12 of the first embodiment.

In the present application, it is possible to at least partly combine the structures described in the above embodiments with each other. For example, in a bicycle sprocket 512 of a bicycle sprocket assembly 510 illustrated in FIG. 39, the third shifting facilitation projection 445 can be applied to the bicycle sprocket 312 of the third embodiment.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
   a sprocket element including
      a rotational center axis,
      a sprocket body including a radially outer periphery disposed about the rotational center axis, and
      a plurality of sprocket teeth arranged on the radially outer periphery;
   a first shifting facilitation projection coupled to the sprocket element to engage with an inner link plate of a bicycle chain when the bicycle chain is shifted from a smaller sprocket to the bicycle sprocket; and
   a second shifting facilitation projection coupled to the sprocket element to engage with an outer link plate of the bicycle chain when the bicycle chain is shifted from the smaller sprocket to the bicycle sprocket.

2. The bicycle sprocket according to claim 1, wherein
   the second shifting facilitation projection is provided on a downstream side of the first shifting facilitation projection in a rotational direction in which the bicycle sprocket rotates during pedaling without another shifting facilitation projection between the first shifting facilitation projection and the second shifting facilitation projection in the rotational direction.

3. The bicycle sprocket according to claim 1, wherein the first shifting facilitation projection is spaced apart from the second shifting facilitation projection at a first pitch in a circumferential direction defined about the rotational center axis, and
the first pitch is substantially equal to a chain pitch of the bicycle chain.

4. The bicycle sprocket according to claim 3, wherein the plurality of sprocket teeth includes
a first adjacent tooth, and
a second adjacent tooth adjacent to the first adjacent tooth without another tooth in a circumferential direction defined about the rotational center axis,
the first adjacent tooth is closest to the first shifting facilitation projection among the plurality of sprocket teeth, and
the second adjacent tooth is closest to the second shifting facilitation projection among the plurality of sprocket teeth.

5. The bicycle sprocket according to claim 4, wherein the plurality of sprocket teeth includes a receiving tooth adjacent to the first adjacent tooth without another tooth between the receiving tooth and the first adjacent tooth in the circumferential direction,
the receiving tooth is provided on an upstream side of the first adjacent tooth in a rotational direction in which the bicycle sprocket rotates during pedaling,
the receiving tooth includes
a tooth root coupled to the radially outer periphery of the sprocket body, the tooth root having a first axial center defined in an axial direction parallel to the rotational center axis, and
a tooth tip provided radially outward of the tooth root with respect to the rotational center axis, the tooth tip having a second axial center defined in the axial direction, and
the second axial center is provided at an axial position equal to an axial position of the first axial center in the axial direction.

6. The bicycle sprocket according to claim 4, wherein the plurality of sprocket teeth includes a receiving tooth adjacent to the first adjacent tooth without another tooth between the receiving tooth and the first adjacent tooth in the circumferential direction,
the receiving tooth is provided on an upstream side of the first adjacent tooth in a rotational direction in which the bicycle sprocket rotates during pedaling,
the receiving tooth includes
a tooth root coupled to the radially outer periphery of the sprocket body, the tooth root having a first axial center defined in an axial direction parallel to the rotational center axis, and
a tooth tip provided radially outward of the tooth root with respect to the rotational center axis, the tooth tip having a second axial center defined in the axial direction, and
the second axial center is offset from the first axial center in the axial direction.

7. The bicycle sprocket according to claim 6, wherein the second axial center is closer to the first shifting facilitation projection than the first axial center in the axial direction.

8. The bicycle sprocket according to claim 1, wherein the first shifting facilitation projection has a first axial length defined from the sprocket element in an axial direction parallel to the rotational center axis,
the second shifting facilitation projection has a second axial length defined from the sprocket element in the axial direction, and
the first axial length is smaller than the second axial length.

9. The bicycle sprocket according to claim 1, wherein the first shifting facilitation projection includes
a first coupling body coupled to the sprocket element, and
a protruding part extending radially outward from the first coupling body with respect to the rotational center axis.

10. The bicycle sprocket according to claim 9, wherein the protruding part is spaced apart from the sprocket element in an axial direction parallel to the rotational center axis.

11. The bicycle sprocket according to claim 10, wherein the plurality of sprocket teeth includes a first adjacent tooth closest to the first shifting facilitation projection among the plurality of sprocket teeth, and
a maximum axial distance defined between the protruding part and the first adjacent tooth in the axial direction is larger than an axial width of the inner link plate.

12. The bicycle sprocket according to claim 11, wherein the first shifting facilitation projection is disposed to keep a clearance at least one of between the protruding part and the inner link plate in the axial direction and between the first adjacent tooth and the inner link plate in the axial direction during pedaling.

13. The bicycle sprocket according to claim 11, wherein the maximum axial distance is in a range of 0.5 mm to 4.0 mm.

14. The bicycle sprocket according to claim 13, wherein the maximum axial distance is equal to or larger than 1.0 mm.

15. The bicycle sprocket according to claim 13, wherein the maximum axial distance is equal to or smaller than 3.8 mm.

16. The bicycle sprocket according to claim 13, wherein the maximum axial distance is in a range of 1.0 mm to 2.0 mm.

17. The bicycle sprocket according to claim 9, wherein the protruding part includes
a radially inner end coupled to the first coupling body,
a radially outer end provided radially outward of the radially inner end with respect to the rotational center axis, and
a first inclined surface facing the sprocket element in the axial direction, the first inclined surface being inclined to gradually approach the sprocket element in the axial direction from the radially outer end toward the radially inner end.

18. The bicycle sprocket according to claim 17, wherein the second shifting facilitation projection includes a second inclined surface facing toward an opposite side of the sprocket element in the axial direction, and
the second inclined surface is inclined to gradually approach the sprocket element in the axial direction from a radially inner side to a radially outer side with respect to the rotational center axis.

19. The bicycle sprocket according to claim 9, wherein
the protruding part is disposed to at least partly overlap with one of the plurality of sprocket teeth when viewed from an axial direction parallel to the rotational center axis.

20. The bicycle sprocket according to claim 1, wherein
the plurality of sprocket teeth include
at least one first tooth having a first chain engaging width, and
at least one second tooth having a second chain engaging width,
the first chain engaging width is smaller than an inner link space defined between an opposed pair of inner link plates of the bicycle chain, and
the second chain engaging width is larger than the inner link space and is smaller than an outer link space defined between an opposed pair of outer link plates of the bicycle chain.

21. The bicycle sprocket according to claim 20, wherein
the at least one first tooth includes a first adjacent tooth closest to the first shifting facilitation projection among the plurality of sprocket teeth.

22. The bicycle sprocket according to claim 21, wherein
the at least one second tooth includes a second adjacent tooth closest to the second shifting facilitation projection among the plurality of sprocket teeth.

23. The bicycle sprocket according to claim 21, wherein
the plurality of sprocket teeth includes a receiving tooth adjacent to the first adjacent tooth without another tooth between the receiving tooth and the first adjacent tooth in a circumferential direction defined about the rotational center axis,
the receiving tooth is provided on an upstream side of the first adjacent tooth in a rotational direction in which the bicycle sprocket rotates during pedaling, and
the receiving tooth has an axial width smaller than the second chain engaging width.

24. The bicycle sprocket according to claim 22, wherein
the plurality of sprocket teeth includes a receiving tooth adjacent to the first adjacent tooth without another tooth between the receiving tooth and the first adjacent tooth in a circumferential direction defined about the rotational center axis,
the receiving tooth is provided on an upstream side of the first adjacent tooth in a rotational direction in which the bicycle sprocket rotates during pedaling, and
the receiving tooth has a radial length smaller than a radial length of the second adjacent tooth.

25. The bicycle sprocket according to claim 1, wherein
the second shifting facilitation projection is coupled to the sprocket element to engage with the bicycle chain when the bicycle chain is shifted from the bicycle sprocket to the smaller sprocket.

26. The bicycle sprocket according to claim 1, wherein
the first shifting facilitation projection is disposed not to be inserted between an opposed pair of link plates of the bicycle chain when the bicycle chain is shifted from the bicycle sprocket to the smaller sprocket.

27. A bicycle sprocket comprising:
a sprocket element including
a rotational center axis,
a sprocket body including a radially outer periphery disposed about the rotational center axis, and
a plurality of sprocket teeth arranged on the radially outer periphery; and
a first shifting facilitation projection coupled to the sprocket element, the first shifting facilitation projection including
a first coupling body coupled to the sprocket element, and
a protruding part extending radially outward from the first coupling body with respect to the rotational center axis;
the plurality of sprocket teeth including
a first adjacent tooth closest to the first shifting facilitation projection among the plurality of sprocket teeth, and
a receiving tooth adjacent to the first adjacent tooth without another tooth between the receiving tooth and the first adjacent tooth in a circumferential direction defined about the rotational center axis, the receiving tooth being provided on an upstream side of the first adjacent tooth in a rotational direction in which the bicycle sprocket rotates during pedaling; and
a maximum axial distance defined between the protruding part and the first adjacent tooth in an axial direction parallel to the rotational center axis being in a range of 0.5 mm to 4.0 mm.

28. The bicycle sprocket according to claim 27, wherein
the maximum axial distance is equal to or larger than 1.0 mm.

29. The bicycle sprocket according to claim 27, wherein
the maximum axial distance is equal to or smaller than 3.8 mm.

30. The bicycle sprocket according to claim 27, wherein
the maximum axial distance is in a range of 1.0 mm to 2.0 mm.

31. The bicycle sprocket according to claim 27, wherein
the receiving tooth includes
a tooth root coupled to the radially outer periphery of the sprocket body, the tooth root having a first axial center defined in the axial direction, and
a tooth tip provided radially outward of the tooth root with respect to the rotational center axis, the tooth tip having a second axial center defined in the axial direction, and
the second axial center is provided at an axial position equal to an axial position of the first axial center in the axial direction.

32. The bicycle sprocket according to claim 27, wherein
the receiving tooth includes
a tooth root coupled to the radially outer periphery of the sprocket body, the tooth root having a first axial center defined in the axial direction, and
a tooth tip provided radially outward of the tooth root with respect to the rotational center axis, the tooth tip having a second axial center defined in the axial direction, and
the second axial center is offset from the first axial center in the axial direction.

33. The bicycle sprocket according to claim 32, wherein
the second axial center is closer to the first shifting facilitation projection than the first axial center in the axial direction.

34. The bicycle sprocket according to claim 27, wherein
the first shifting facilitation projection is disposed to keep a clearance at least one of between the protruding part and an inner link plate of a bicycle chain in the axial direction and between the first adjacent tooth and the inner link plate in the axial direction during pedaling.

35. The bicycle sprocket according to claim 27, wherein the protruding part includes
a radially inner end coupled to the first coupling body,
a radially outer end provided radially outward of the radially inner end with respect to the rotational center axis, and
a first inclined surface facing the sprocket element in the axial direction, the first inclined surface being inclined to approach the sprocket element in the axial direction from the radially outer end toward the radially inner end.

36. The bicycle sprocket according to claim 35, further comprising:
a second shifting facilitation projection coupled to the sprocket element, wherein
the second shifting facilitation projection includes a second inclined surface facing toward an opposite side of the sprocket element in the axial direction, and
the second inclined surface is inclined to gradually approach the sprocket element in the axial direction from a radially inner side to a radially outer side with respect to the rotational center axis.

37. The bicycle sprocket according to claim 27, wherein the protruding part is disposed to at least partly overlap with one of the plurality of sprocket teeth when viewed from the axial direction.

38. The bicycle sprocket according to claim 27, wherein the plurality of sprocket teeth include
at least one first tooth having a first chain engaging width, and
at least one second tooth having a second chain engaging width,
the first chain engaging width is smaller than an inner link space defined between an opposed pair of inner link plates of a bicycle chain, and
the second chain engaging width is larger than the inner link space and is smaller than an outer link space defined between an opposed pair of outer link plates of the bicycle chain.

39. The bicycle sprocket according to claim 38, wherein the at least one first tooth includes the first adjacent tooth closest to the first shifting facilitation projection among the plurality of sprocket teeth.

40. The bicycle sprocket according to claim 39, further comprising:
a second shifting facilitation projection coupled to the sprocket element, wherein
the at least one second tooth includes a second adjacent tooth closest to the second shifting facilitation projection among the plurality of sprocket teeth.

41. The bicycle sprocket according to claim 38, wherein the receiving tooth has an axial width smaller than the second chain engaging width.

42. The bicycle sprocket according to claim 40, wherein the receiving tooth has a radial length smaller than a radial length of the second adjacent tooth.

43. The bicycle sprocket according to claim 27, wherein the first shifting facilitation projection is disposed not to be inserted between an opposed pair of link plates of a bicycle chain when the bicycle chain is shifted from the bicycle sprocket to the smaller sprocket.

44. A bicycle sprocket comprising:
a sprocket element including
a rotational center axis,
a sprocket body including a radially outer periphery disposed about the rotational center axis,
a plurality of sprocket teeth arranged on the radially outer periphery; and
at least one shifting facilitation projection coupled to the sprocket element to engage with a link plate of a bicycle chain when the bicycle chain is shifted from a smaller sprocket to the bicycle sprocket,
the plurality of sprocket teeth including
at least one first tooth having a first chain engaging width, and
at least one second tooth having a second chain engaging width,
the first chain engaging width being smaller than an inner link space defined between an opposed pair of inner link plates of the bicycle chain,
the second chain engaging width being larger than the inner link space and being smaller than an outer link space defined between an opposed pair of outer link plates of the bicycle chain,
the plurality of sprocket teeth including a receiving tooth configured to first engage with the bicycle chain when the bicycle chain is shifted from the smaller sprocket to the bicycle sprocket, the receiving tooth being provided on an upstream side of the at least one shifting facilitation projection in a rotational direction in which the bicycle sprocket rotates during pedaling,
the receiving tooth including
a tooth root coupled to the radially outer periphery of the sprocket body, the tooth root having a first axial center defined in an axial direction parallel to the rotational center axis, and
a tooth tip provided radially outward of the tooth root with respect to the rotational center axis, the tooth tip having a second axial center defined in the axial direction,
the second axial center being offset from the first axial center in the axial direction, and
the second axial center is farther from the at least one shifting facilitation projection than the first axial center in the axial direction.

45. The bicycle sprocket according to claim 44, wherein the receiving tooth has a radial length smaller than a radial length of the at least one second tooth.

* * * * *